US011036782B2

(12) United States Patent
Padmanabhan et al.

(10) Patent No.: US 11,036,782 B2
(45) Date of Patent: *Jun. 15, 2021

(54) GENERATING AND UPDATING EVENT-BASED PLAYBACK EXPERIENCES

(71) Applicant: Microsoft Technology Licensing, LLC, Redmond, WA (US)

(72) Inventors: Udiyan Padmanabhan, Seattle, WA (US); William Messing, Seattle, WA (US); Joseph H. Matthews, III, Woodinville, WA (US); Martin Shetter, Bellevue, WA (US); Tatiana Gershanovich, Redmond, WA (US); Michael J. Ricker, Issaquah, WA (US); Jannes Paul Peters, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 596 days.

This patent is subject to a terminal disclaimer.

(21) Appl. No.: 14/930,353

(22) Filed: Nov. 2, 2015

(65) Prior Publication Data

US 2016/0057188 A1 Feb. 25, 2016

Related U.S. Application Data

(63) Continuation of application No. 13/292,998, filed on Nov. 9, 2011.

(51) Int. Cl.
*G06F 17/00* (2019.01)
*G06F 16/48* (2019.01)
(Continued)

(52) U.S. Cl.
CPC ......... *G06F 16/48* (2019.01); *G06K 9/00288* (2013.01); *G06K 9/6217* (2013.01);
(Continued)

(58) Field of Classification Search
CPC ........ G06F 17/24; G06F 16/48; G06F 40/103; H04L 65/403; H04N 21/4126; H04N 21/4223
(Continued)

(56) References Cited

U.S. PATENT DOCUMENTS 6,877,134 B1 * 4/2005 Fuller ..................... G06F 16/58
715/202
7,469,283 B2 12/2008 Eyal et al.
(Continued)

FOREIGN PATENT DOCUMENTS

CN 102017661 4/2011
JP 2010-529816 8/2010
(Continued)

OTHER PUBLICATIONS

Madirakshi, Detecting Recurring Themes in Personal Media Collections, 2011 Fifth IEEE International Conference on Semantic Computing (Year: 2011).*

(Continued)

*Primary Examiner* — Stephen S Hong
*Assistant Examiner* — Matthew J Ludwig
(74) *Attorney, Agent, or Firm* — Klarquist Sparkman, LLP

(57) ABSTRACT

Exemplary methods, apparatus, and systems are disclosed for capturing, organizing, sharing, and/or displaying media. For example, using embodiments of the disclosed technology, a unified playback and browsing experience for a collection of media can be created automatically. For instance, heuristics and metadata can be used to assemble and add narratives to the media data. Furthermore, this representation of media can recompose itself dynamically as more media is added to the collection. While a collection may use a single user's content, sometimes media that is (Continued)

desirable to include in the collection is captured by friends and/or others at the same event. In certain embodiments, media content related to the event can be automatically collected and shared among selected groups. Further, in some embodiments, new media can be automatically incorporated into a media collection associated with the event, and the playback experience dynamically updated.

20 Claims, 23 Drawing Sheets

(51) Int. Cl.
| | |
|---|---|
| H04N 21/41 | (2011.01) |
| H04N 21/422 | (2011.01) |
| H04N 21/4223 | (2011.01) |
| H04N 21/458 | (2011.01) |
| H04N 21/47 | (2011.01) |
| H04N 21/472 | (2011.01) |
| H04N 21/4788 | (2011.01) |
| H04N 21/81 | (2011.01) |
| H04N 21/84 | (2011.01) |
| G06K 9/00 | (2006.01) |
| G06K 9/62 | (2006.01) |
| G11B 27/031 | (2006.01) |
| H04L 29/06 | (2006.01) |
| H04L 29/08 | (2006.01) |

(52) U.S. Cl.
CPC .......... *G11B 27/031* (2013.01); *H04L 65/403* (2013.01); *H04L 65/4084* (2013.01); *H04L 67/18* (2013.01); *H04N 21/4126* (2013.01); *H04N 21/422* (2013.01); *H04N 21/4223* (2013.01); *H04N 21/42202* (2013.01); *H04N 21/4586* (2013.01); *H04N 21/47* (2013.01); *H04N 21/472* (2013.01); *H04N 21/4788* (2013.01); *H04N 21/8126* (2013.01); *H04N 21/84* (2013.01)

(58) Field of Classification Search
USPC .......................................... 715/201, 203, 204
See application file for complete search history.

(56) References Cited

U.S. PATENT DOCUMENTS

| | | | |
|---|---|---|---|
| 8,078,665 B2 | 12/2011 | Poder et al. | |
| 8,250,040 B2* | 8/2012 | Murphy | G06F 11/1451 707/662 |
| 8,270,684 B2* | 9/2012 | Kiyohara | G06F 17/30029 382/118 |
| 8,380,810 B2* | 2/2013 | Sathish | H04W 4/21 709/217 |
| 8,645,485 B1 | 2/2014 | Yadid et al. | |
| 9,143,601 B2 | 9/2015 | Padmanabhan et al. | |
| 9,342,817 B2* | 5/2016 | Elliott | G06Q 10/101 |
| 9,959,350 B1* | 5/2018 | Goldman | G06F 16/9024 |
| 2005/0102381 A1* | 5/2005 | Jiang | H04W 12/088 709/220 |
| 2005/0188399 A1 | 8/2005 | Tischer | |
| 2006/0271691 A1 | 11/2006 | Jacobs et al. | |
| 2006/0280427 A1* | 12/2006 | Snowdon | H04N 1/00132 386/223 |
| 2007/0078878 A1* | 4/2007 | Knable | G09B 5/06 |
| 2007/0124325 A1* | 5/2007 | Moore | G06F 16/48 |
| 2007/0286463 A1 | 12/2007 | Ritzau et al. | |
| 2007/0291323 A1 | 12/2007 | Roncal | |
| 2008/0215984 A1* | 9/2008 | Manico | G06F 16/48 715/730 |
| 2008/0307311 A1 | 12/2008 | Eyal | |
| 2008/0319844 A1* | 12/2008 | Hua | G06Q 30/02 705/14.73 |
| 2009/0094518 A1* | 4/2009 | Lawther | G06F 3/04817 715/716 |
| 2009/0144786 A1 | 6/2009 | Branam et al. | |
| 2009/0153678 A1* | 6/2009 | Nonaka | G06F 3/017 348/208.4 |
| 2009/0199093 A1* | 8/2009 | Chakravarty | G06F 16/58 715/273 |
| 2009/0248602 A1* | 10/2009 | Frazier | G06Q 30/02 706/46 |
| 2009/0279794 A1* | 11/2009 | Brucher | G06F 16/51 382/225 |
| 2009/0316056 A1* | 12/2009 | Rosencwaig | G06F 1/1656 348/836 |
| 2009/0319472 A1* | 12/2009 | Jain | G11B 27/105 |
| 2010/0029326 A1 | 2/2010 | Bergstrom et al. | |
| 2010/0124378 A1* | 5/2010 | Das | G06F 16/285 382/225 |
| 2010/0250190 A1* | 9/2010 | Zhang | G06F 16/48 702/181 |
| 2010/0259641 A1* | 10/2010 | Fujimoto | G11B 27/105 348/231.3 |
| 2010/0277611 A1 | 11/2010 | Holt et al. | |
| 2010/0333129 A1 | 12/2010 | Alhadeff et al. | |
| 2011/0066743 A1 | 3/2011 | Hurley et al. | |
| 2011/0077861 A1* | 3/2011 | Arrasvuori | H04W 4/02 701/408 |
| 2011/0126155 A1 | 5/2011 | Krishnaraj et al. | |
| 2011/0161423 A1* | 6/2011 | Pratt | G06Q 10/06 709/205 |
| 2011/0202430 A1 | 8/2011 | Narayanan et al. | |
| 2011/0205399 A1* | 8/2011 | Gao | G11B 27/034 348/231.99 |
| 2011/0211737 A1 | 9/2011 | Krupka et al. | |
| 2011/0214148 A1 | 9/2011 | Gossweiler, III et al. | |
| 2011/0314030 A1* | 12/2011 | Burba | G06F 17/30867 707/749 |
| 2012/0045093 A1 | 2/2012 | Salminen et al. | |
| 2012/0077522 A1 | 3/2012 | Mate et al. | |
| 2012/0158935 A1 | 6/2012 | Kishimoto et al. | |
| 2012/0226663 A1 | 9/2012 | Valdez Kline et al. | |
| 2012/0284623 A1 | 11/2012 | Soderstrom | |
| 2013/0117365 A1 | 5/2013 | Padmanabhan et al. | |
| 2013/0117692 A1 | 5/2013 | Padmanabhan et al. | |
| 2013/0141439 A1* | 6/2013 | Kryzhanovsky | G06T 13/80 345/473 |
| 2015/0382167 A1 | 12/2015 | Padmanabhan et al. | |

FOREIGN PATENT DOCUMENTS

| | | |
|---|---|---|
| JP | 2011-008638 | 1/2011 |
| JP | 2011-512597 | 4/2011 |
| KR | 10-2008-0092792 | 10/2008 |
| KR | 10-2009-0111589 | 10/2009 |
| WO | WO 2007/113462 | 10/2007 |

OTHER PUBLICATIONS

Notice on Grant of Patent dated Dec. 9, 2016, from Chinese Patent Application No. 201210445178.8, 4 pp.
Examination Report dated Jan. 8, 2015, from European Patent Application No. 12847648.8, 15 pp.
Final Office Action dated Feb. 21, 2014, from U.S. Appl. No. 13/292,997, 29 pp.
Final Office Action dated Jan. 6, 2015, from U.S. Appl. No. 13/292,997, 19 pp.
Final Office Action dated Mar. 26, 2014, from U.S. Appl. No. 13/292,998, 17 pp.
Final Office Action dated Jul. 26, 2018, from U.S. Appl. No. 14/850,124, 29 pp.
Final Office Action dated Apr. 5, 2018, from U.S. Appl. No. 14/850,124, 32 pp.
International Search Report and Written Opinion dated Mar. 12, 2013, from International Patent Application No. PCT/US2012/063762, 9 pp.

(56) References Cited

OTHER PUBLICATIONS

Notice on the First Office Action and Search Report dated Oct. 27, 2014, from Chinese Patent Application No. 201210444953.8, 16 pp.
Notice on the Second Office Action and Search Report dated Jun. 30, 2015, from Chinese Patent Application No. 201210444953.8, 21 pp.
Office Action dated Jul. 14, 2014, from U.S. Appl. No. 13/292,997, 29 pp.
Office Action dated Aug. 15, 2013, from U.S. Appl. No. 13/292,997, 20 pp.
Office Action dated Sep. 4, 2013, from U.S. Appl. No. 13/292,998, 13 pp.
Office Action dated Jul. 27, 2016, from U.S. Appl. No. 14/850,124, 27 pp.
Office Action dated Jan. 2, 2018, from U.S. Appl. No. 14/850,124, 32 pp.
Preliminary Report on Patentability dated May 22, 2014, from International Patent Application No. PCT/US2012/063762, 6 pp.
Supplementary European Search Report dated Dec. 16, 2014, from European Patent Application No. 12847648.8, 3 pp.
Brust, "Event-based photo sharing—problems and solutions," downloaded from www.submityourarticle.com/articles/Dean-Brust-2366/photo-sharing-18516.php, 3 pp. (document marked Aug. 17, 2007).
Burgener et al., "Assisted Metadata Propagation: Visualizing Contextual Metadata to Reveal Groupings," 21 pp. (document not dated, downloaded Dec. 14, 2010).
"Clixtr," downloaded from en.wikipedia.org/wiki/Clixtr, 2 pp. (Jan. 26, 2010).
International Search Report dated May 8, 2013, from International Patent Application No. PCT/US2012/064009, 3 pp.
Notice on the First Office Action and Search Report dated Feb. 4, 2015, from Chinese Patent Application No. 201210445178.8, 14 pp.
Notice on the Second Office Action dated Oct. 10, 2015, from Chinese Patent Application No. 201210445178.8, 10 pp.
Written Opinion dated May 8, 2013, from International Patent Application No. PCT/US2012/064009, 5 pp.
Notice on the Third Office Action dated Apr. 13, 2016, from Chinese Patent Application No. 201210445178.8, 6 pp.

* cited by examiner

GENERATING AND UPDATING EVENT-BASED PLAYBACK EXPERIENCES

CROSS REFERENCE TO RELATED APPLICATIONS

This application is a continuation of U.S. patent application Ser. No. 13/292,998, filed Nov. 9, 2011, entitled "Generating and Updating Event-Based Playback Experiences," which is hereby incorporated by reference.

FIELD

The present disclosure describes methods, systems, and apparatus for grouping, playing back, and sharing digital media among users of computing devices, such as mobile computing devices.

BACKGROUND

Mobile computing devices (such as smartphones, handheld computers, and touchscreen tablet computers) are becoming increasingly more popular and offer an expanding array of capabilities. For example, today's mobile devices typically have the ability to remotely access the Internet, access a user's email and/or social network accounts, capture images or video using built-in cameras, capture audio using one or more built-in microphones, and store large amounts of user information. The user information may include, for example, personal information such as photos, videos, messages, emails, and/or contact information for friends and acquaintances. As a result of their compact design, mobile devices are often carried by users throughout their day, both while at home and while travelling. The rich variety of media capturing capabilities on a typical mobile device and their compact design has made mobile devices well-suited for memorializing events in a user's life, whether the events are of a personal or business nature. Typically, however, in order to share a photo, video, or other media file with another person, the user of a mobile device must engage in a cumbersome process of manually accessing individual media and sending it to a manually selected recipient.

SUMMARY

Exemplary embodiments of systems, methods, and apparatus for capturing, organizing, sharing, and/or displaying event-based media collections are described herein. For example, using embodiments of the disclosed technology, a unified playback and browsing experience for a collection of media can be created automatically. For instance, heuristics and metadata can be used to assemble and add narratives to the media data. Furthermore, this new representation of media can recompose itself dynamically as more media is added to the collection. While a collection may use a single user's content, sometimes media that is desirable to include in the collection is captured by friends, family, and/or others present at the same event. Using embodiments of the disclosed technology, media content related to the event can be automatically collected and shared among selected groups of friends, family, or attendees at an event. Further, any new media can be automatically incorporated into the media collection (or album) associated with the event, and the playback experience can be dynamically updated to include the new media into the playback experience. Further, once the media collections are created and played back, people typically enjoy sharing them with their friends and family, and sometimes the entire world. Furthermore, viewers of the media will often want to add a comment or their own thoughts and feelings about the media collection using paradigms like comments, "likes", and tags of people. Using certain embodiments of the disclosed technology, this data can be automatically curated and included in the playback experience.

Among the embodiments disclosed herein is an exemplary computer-implemented method comprising receiving a first instance of digital media, the first instance of digital media including location and time data for the first instance of digital media; receiving a second instance of digital media, the second instance of digital media including location and time data for the second instance of digital media; clustering the first instance of digital media and the second instance of digital media into an event-related group of digital media for an event based at least in part on the location and time data for the first instance of digital media and on the location and time data for the second instance of digital media; receiving an indication of a selection of a media-sharing settings from among a plurality of available media-sharing settings; determining a set of one or more recipients for the event-related group of digital media based at least in part on the indication of the selection; and outputting the event-related group of digital media for viewing by the set of one or more recipients. The digital media can comprise one or more of digital image data, digital video data, or digital audio data. In certain implementations, the plurality of available media-sharing settings comprises two or more of a setting for sharing with users uploading media from the event, a setting for sharing with recipients identified as friends from a list of friends, a setting for sharing with recipients identified as friends from a list of friends who are identified as also being at the event, a setting for sharing with recipients identified as friends from a list of friends or identified as friends of the recipients identified as friends, or a setting for sharing with recipients individually selected by a user. In some implementations, the outputting the group of digital media comprises transmitting the event-related group of digital media to one or more of the set of one or more recipients. In certain implementations, the outputting of the group of digital media comprises transmitting the event-related group of digital media to a social network server along with data indicating permissions for viewing the event-related group of digital media. In some implementations, the determining the set of one or more recipients comprises identifying one or more subjects in the first instance of the digital media or in the second instance of the digital media (the identifying the one or more subjects being performed using data accessed from one or more social network servers, facial recognition, or both data accessed from one or more social network servers and facial recognition); and including the identified one or more subjects among the set of one or more recipients. In certain implementations, the method further comprises analyzing the first instance of digital media and the second instance of digital media to determine supplemental presentation data that is displayed to a user when the first instance of digital media and the second instance of digital media are displayed to the set of one or more recipients (the supplemental presentation data comprising one of a title for the first instance of the digital media, a title for the second instance of the digital media, an indication of a user who created the first instance of the digital media, or an indication of a user who created the second instance of the digital media). In some implementations, the first instance of digital media is received from a mobile device operated by a first user and the second instance of digital media is received from a mobile device operated by a second user different than the first user. In other implementations, the first instance of digital media and the second instance of digital media are received from a single mobile device. In certain implementations, the method further comprises receiving a third instance of digital media and updating the event-related group of digital media to include the third instance of digital media. The third instance of digital media can be received from one of the recipients, and can comprise data indicating a comment to one of the first instance of digital media data or the second instance of digital media data. In particular implementations, the method is performed by a mobile device. In some implementations, the receiving the first instance of digital media or the receiving the second instance of digital media is initiated by the capturing of digital media at a mobile device without further input by a user.

Another exemplary method disclosed herein comprises receiving digital media data, the digital media data comprising digital image data or digital video data; identifying one or more persons in the digital media using a facial recognition technique; evaluating whether the one or more identified persons are members of a list of acceptable recipients for the digital media; and outputting the digital media for viewing by the one or more identified persons if the one or more identified persons are determined to be members of the list of acceptable recipients. In certain implementations, the identifying comprises accessing social network data from a social network server and determining the identity of the one or more persons based at least in part on the social network data. The social network data can comprise, for example, image tag data and social network image data, the image tag data identifying one or more persons in the social network image data.

Another exemplary embodiment disclosed herein is a system comprising a memory or storage device storing a program; a processing unit operable to execute the program. In this embodiment, execution of the program causes the processing unit to input a first instance of digital media, the first instance of digital media including location and time data for the first instance of digital media; input a second instance of digital media, the second instance of digital media including location and time data for the second instance of digital media; evaluate the location and time data for the first instance of digital media and the location and time data for the second instance of digital media to determine whether the first instance of digital media and the second instance media were created within a geographic location or outside of a geographic location; and determine whether to cluster the first instance of digital media and the second instance of digital media into an event-related group of digital media for an event by determining whether the location and time data for the second instance of digital media is within an event boundary of the location and time data for the first instance of digital media, the event boundary applied being selected from among multiple available event boundaries, the event boundary applied further being a first event boundary if the first instance of digital media and the second instance media were created within the geographic location or a second event boundary if the first instance of digital media and the second instance media were created outside of the geographic location. In certain implementations said execution of the program further causes the processing unit to cluster the first instance of digital media and the second instance of digital media into the event-related group of digital media if the second event boundary is applied and not to cluster the first instance of digital media and the second instance of digital media into the event-related group of digital media if the first event boundary is applied. In some implementations, each of the multiple available event boundaries comprises a time period criteria and a location criteria. For example, the geographic location can correspond to an area around a user's home, and the time period criteria and the location criteria for the first event boundary can be more constrained than the time period criteria and the location criteria for the second event boundary. In certain implementations, said execution of the program further causes the processing unit to receive an indication of a selection of an event-sharing media setting from among a plurality of event-sharing media settings; determine a set of one or more recipients for the event-related group of digital media based at least in part on the indication of the selection; and output the group of digital media for viewing by the set of one or more recipients.

Another exemplary method disclosed herein comprises receiving instances of digital media generated by a plurality of mobile device users, each instance of digital media comprising data indicating a time and location at which the respective instance of digital media was generated; automatically creating groups of digital media related by time and location from the received instances of digital media, the groups including a first group of digital media and a second group of digital media, the first group of digital media being different than the second group of digital media but comprising one or more common instances of digital media; automatically notifying a first group of one or more recipients that the first group of digital media is available for viewing; and automatically notifying a second group of one or more recipients that the second group of digital media is available for viewing. In certain implementations, the first group of one or more recipients comprises one or more recipients that are different than the second group of one or more recipients. In some implementations, the method further comprises receiving respective media-sharing settings from each of the mobile device users determining the first group of one or more recipients and the second group of one or more recipients based at least in part on the respective media-sharing settings. In certain implementations, at least one of the media-sharing settings received is a setting for sharing with individuals identified in a social network database stored on a social network server, and the method further comprises accessing the social network database in order to include the individuals in the first group of one or more recipients or in the second group of one or more recipients. The accessing the social network can be automatically performed using an application programming interface associated with the social network. In some implementations, at least one of the media-sharing settings received is a setting for sharing with individuals who are identified as being members of a list of acceptable recipients for the digital media and who are further identified as being at an event with one or more of the plurality of mobile device, and the method further comprises identifying one or more individuals who are members of a list of acceptable recipients for the digital media and who are at the event with the one or more of the plurality of mobile device users. For example, the identifying can comprise accessing a social network account; receiving data from the social network account indicating that a selected individual is at the event; determining that the selected individual is also on the list of acceptable recipients for the digital media; and adding the selected individual to the first group of one or more recipients or to the second group of one or more recipients. In certain implementations, the identifying can comprise performing facial recognition on one or more of the instances of digital media, and thereby recognizing that a selected individual is present in the one or more of the instances of digital media; determining that the selected individual is also on the list of acceptable recipients for the digital media; and adding the selected individual to the first group of one or more recipients or to the second group of one or more recipients. The identifying can further comprise accessing a social network account and receiving data from the social network account, the data comprising image data for one or more individuals and data indicating identities of the one or more individuals; and the facial recognition can be performed using the data received from the social network. In other implementations, the identifying comprises receiving an instance of digital media from a selected individual, the time and location data being within an event boundary for one of the groups of digital media; determining that the selected individual is also on the list of acceptable recipients for the digital media; and adding the selected individual to the first group of one or more recipients or the second group of one or more recipients. In certain implementations, at least one of the media-sharing settings received is a setting for sharing with individuals manually selected by a user, and the method further comprises receiving data indicating the individuals manually selected by a user and adding the manually selected individuals to the first group of one or more recipients or the second group of one or more recipients.

Another exemplary method disclosed herein comprises causing one or more media-sharing settings screens to be displayed on a display of a device, the one or more media-sharing settings screens allowing a user to select one or more media-sharing settings from among a plurality of media-sharing settings, the media-sharing settings including at least a setting for sharing a collection of digital media with recipients identified in a contact list stored locally on the device or with recipients identified in a contact list stored remotely. In certain implementations, the method further comprises receiving one or more media-sharing setting selections from a user; identifying one or more recipients using the received media-sharing setting selections; and causing a collection of digital media to be available for viewing by the one or more recipients. In some implementations, the contact list stored remotely is a contact list stored on a social network server. In certain implementations, the one or more media-sharing settings screens include at least one screen identifying one or more possible social network accounts from which the contact list stored on the social network server can be accessed. In certain implementations, the one or more media-sharing settings screens further allow a user to select whether the selected recipients for sharing the digital media have permission to further contribute to the collection of media.

Another exemplary embodiment disclosed herein is a system comprising a memory or storage device storing a program; a touchscreen display device; and a processing unit operable to execute the program. In this embodiment, execution of the program causes the processing unit to cause one or more media-sharing settings screens to be displayed on the display device, the one or more media-sharing settings screens allowing a user to select one or more media-sharing settings from among a plurality of media-sharing settings, the media-sharing settings including at least a setting for sharing a collection of digital media with recipients identified in a contact list stored locally on the device or with recipients identified in a contact list stored remotely; receive one or more media-sharing setting selections from a user, the one or more media-sharing setting selections having been selected from the one or more media-sharing settings screens; analyze a plurality of instances of digital media, the digital media comprising time and location information indicating a time and location at which respective instances of the digital were generated; create a cluster of digital media related by location and time based at least in part on the analysis; determine one or more recipients for the cluster of digital media based at least in part on the one or more media-sharing setting selections selected by the user; and output the cluster of digital media to the one or more recipients. In certain implementations, the contact list stored remotely is a contact list stored on a social network server. In some implementations, the one or more media-sharing settings screens include at least one screen identifying for selection one or more possible social network accounts from which the contact list stored on the social network server can be accessed. In certain implementations, the one or more media-sharing settings screens further allow a user to select whether one or more of the selected recipients have permission to further contribute to the collection of media.

A further exemplary method disclosed herein comprises receiving instances of digital media; generating a group of digital media related by time and location from the received instances of digital media; generating playback data for presenting the group of digital media, the playback data comprising data for controlling a presentation of the group of digital media; and outputting the group of digital media and the playback data such that one or more recipients are able to view the presentation of the group of digital media as controlled by the playback data. In certain implementations, the method further comprises receiving a further instance of digital media from one of the recipients and automatically updating the group of digital media and the playback data to incorporate the further instance of digital media. The method can further comprise outputting data for the further instance such that the one or more recipients are able to view the further instance. The outputting can be performed without outputting data for all of the digital media in the group of digital media. In some implementation, the method further comprises notifying one or more of the recipients of the updated group of digital media. In certain implementations, the receiving the further instance comprises periodically accessing a social network account; identifying the further instance of digital media from among new comments posted at the social network account; and downloading the further instance of digital media. In other implementations, the receiving the further instance comprises receiving a notification from a social network server that a comment associated with the group of digital media has been posted; identifying the further instance of digital media from among comments posted at the social network account, the further instance of digital media corresponding to the comment for which the notification was received; and downloading the further instance of digital media. In certain implementations, the digital media comprises one or more of digital image data, digital video data, or digital audio data. In some implementations, the playback data comprises data for defining an appearance of the group of digital media when it is viewed by the one or more recipients, the presentation data comprising one or more of background graphics data, font data, title data, or audio data. In certain implementations, the received instances of digital media are received from a plurality of mobile device users. The one or more recipients can include the plurality of mobile device users and the receiving the further instance can comprise receiving the further instance from one of the plurality of mobile device users. In some implementations, the further instance of digital media comprises data indicating a comment to a selected one of the instances of digital media in the group of digital media, and the automatically updating comprises automatically updating the playback data so that the comment appears together with the selected one of the instances of digital media. In certain implementations, the further instance of digital media comprises data indicating a comment to a selected one of the instances of digital media in the group of digital media, the selected one of the instances having been generated by a user, and the method further comprises notifying the user of the comment and allowing the user to determine whether to update the group of digital media and the playback data with the comment. In some implementations, the outputting the updated group of digital media and the updated playback data comprises outputting the updated group of digital media and the updated playback data such that the one or more recipients are able to view an updated presentation of the updated group of digital media as controlled by the updated playback data. In certain implementations, the outputting the group of digital media and the playback data comprises transmitting the group of digital media and the playback data to the one or more recipients, or transmitting the group of digital media and the playback data to a social network server. In some implementations, the outputting the group of digital media and the playback data comprises outputting a data object that combines the group of digital media and the playback data. In certain implementations, the method further comprises allowing a user to select which of the one or more recipients have permission to further contribute to the group of digital media; receiving selections from the user of which of the one or more recipients have permission to further contribute to the group of digital media; and outputting data indicating the user's selections of which of the one or more recipients have permission to further contribute to the group of digital media together with the group of digital media and the playback data.

Another exemplary method disclosed herein comprises receiving instances of digital media; automatically generating a group of digital media related by time and location from the received instances of digital media; outputting the group of digital media such that one or more recipients are able to view a presentation of the group of digital media; receiving a comment from one of the one or more recipients, the comment being responsive to one of the instances of the digital media in the group of digital media; allowing the user to view the comment and to indicate whether to update the group of digital media with the comment; and updating the group of digital media to incorporate the comment into the group of digital media if the user indicates to update the group of digital media. In certain implementations, the receiving comprises accessing a social network account and retrieving the comment from the social network account. In some implementations, the updating comprises generating data for displaying the comment together with the one of the instances of the digital instances to which the comment is responsive. In certain implementations, the method further comprises outputting an update to the group of digital media, the update comprising data for displaying the comment but not data for all of the digital media in the group of digital media. In some implementations, the method further comprises outputting an updated version of the group of digital media, the updated version including the comment. In certain implementations, the method further comprises allowing a user to select which recipients have permission to make a comment to the group of digital media; receiving an indication from the user of a selected one or more recipients who have permission to make a comment; and outputting data indicating the selected one or more recipients.

Another exemplary embodiment disclosed herein is a system comprising a memory or storage device storing a program; and a processing unit operable to execute the program. In this embodiment, execution of the program causes the processing unit to receive instances of digital media; generate a group of digital media related by time and location from the received instances of digital media, the generating comprising determining that the instances of digital media in the group of digital media satisfy a time and location threshold; generate playback data for controlling a presentation of the group of digital media; allow a user to modify the instances of digital media in the group of digital media; allow a user to select one or more recipients for the modified group of digital media; and output the modified group of digital media. In certain implementations, the system further comprises a touchscreen display device and said execution of the program causes the processing unit to allow the user to delete or add instances of digital media to the group of digital media via a graphic user interface displayed on the touchscreen display. In some implementations, the playback data comprises one or more of background graphics data, font data, title data, or audio data used in the presentation of the group of digital media, and said execution of the program causes the processing unit to allow the user to modify the playback data. In certain implementations, the system further comprises an image capture device, and the received instances of digital media are instances of digital media captured by the image capture device.

A further exemplary method disclosed herein comprises receiving instances of digital media, at least some of the instances of digital media comprising location and time data; creating a group of digital media related by time and location from the received instances of digital media; analyzing the digital media in the group of digital media to determine a theme for the group of the digital media; and generating presentation data for use when the group of digital media is viewed by a user, the presentation data including one or more of background graphics data, font data, or audio data and that is associated with the determined theme for the group of the digital media. In some implementations, the analyzing comprises determining a name of a location at which one or more instances of the digital media were captured; and selecting a theme for the group of the digital media based at least in part on the name of the location. For example, the determining the name of the location can comprise requesting location name information from a location-based service for at least one instance of the one or more instances of the digital media. In certain implementations, the analyzing comprises performing facial recognition on one or more instances of the digital media; and selecting a theme for the group of the digital media based at least in part on results from the facial recognition. For example, the facial recognition can indicate that one or more instances of the digital media include children as subjects in the digital media, and the selecting the theme can comprise selecting a theme designed for children. In some implementations, the analyzing comprises determining a name of a location at which one or more instances of the digital media were captured; and selecting a theme for the group of the digital media based at least in part on the name of the location. In certain implementations, the analyzing comprises performing object recognition on one or more instances of the digital media and selecting a theme for the group of the digital media based at least in part on results from the object recognition. In some implementations, the analyzing comprises determining a name of a location at which one or more instances of the digital media were captured and generating a title screen based at least in part on the name of the location. In certain implementations, the method further comprises outputting the group of digital media digital and the presentation data for viewing by one or more recipients. The one or more recipients can be manually selected by a user or selected based on one or more media-sharing settings that establish guidelines for automatically selecting the one or more recipients.

Another exemplary method disclosed herein comprises receiving instances of digital media from a plurality of mobile device users, each of the instances of digital media comprising time and location data; automatically creating a group of digital media related by time and location from the received instances of digital media; analyzing content of the digital media in the group; and automatically modifying the group of digital media based on the analyzing. In some implementations, the group of digital media comprises multiple instances of digital image data; the analyzing comprises analyzing image quality of the multiple instances of digital image data; and the modifying comprises excluding one or more of the multiple instances of digital image data from the group of digital media based on the analyzing, the excluded one or more of the multiple instances of digital image data having lower image quality than a remainder of the multiple instances of digital image data. In certain implementations, the group of digital media comprises multiple instances of digital image data; the analyzing comprises analyzing image content of the multiple instances of digital image data to determine two or more instances of digital image data having identical or substantially identical content; and the modifying comprises excluding one or more of the instances of digital image data having identical or substantially identical content. In some implementations, the digital media comprises digital video data; the analyzing comprises analyzing image quality of frames in the digital video data; and the modifying comprises automatically editing the digital video data to exclude one or more frames of the digital video data based on the analyzing, the excluded one or more frames having lower image quality than a remainder of the frames. In certain implementations, the analyzing the image quality of the frames comprises identifying frames where camera motion causes image blurring. In some implementations, the digital media comprises digital audio data; the group of digital media comprises multiple instances of digital audio data; the analyzing comprises analyzing an audio volume in the multiple instances of digital audio data; and the modifying comprises normalizing the audio volume in the multiple instances of digital audio data.

Another exemplary embodiment disclosed herein is a system comprising a memory or storage device storing a program; an image capture device; and a processing unit operable to execute the program. In this embodiment, execution of the program causes the processing unit to receive multiple instances of digital image media captured by the image capture device; automatically create a group of digital media related by time and location from the received instances of digital image media; evaluate content of the digital media in the group; and automatically modify the group of digital media based on the evaluation. In certain implementations, said execution of the program causes the processing unit to evaluate image quality of multiple instances of digital image data in the group of digital media and exclude one or more of the multiple instances of digital image data from the group of digital media, the excluded one or more of the multiple instances of digital image data having lower image quality than a remainder of the multiple instances of digital image data. In some implementations, said execution of the program causes the processing unit to generate presentation data for use when the group of digital media is viewed by a user, the presentation data including one or more of background graphics data, font data, or audio data that is used when the group of digital media is viewed by the user; and store the group of digital media and the presentation data. In certain implementations, the storing comprises storing the group of digital media locally on the memory or storage device, or storing the group of digital media remotely on a remote storage device.

The described techniques and tools can be implemented separately, or in various combinations with each other. As will be described more fully below, the described techniques and tools can be implemented by a variety of hardware devices having or being connected to an image, video, or audio capture device, including mobile devices (such as cell phones, smartphones, personal digital assistants ("PDAs"), handheld computers, touchscreen tablet computers, laptop computers, portable media players, or personal entertainment systems) as well as other computing devices (such as desktop computers, smart TVs, or entertainment consoles). Further, any of the disclosed methods can be implemented using software comprising computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executable by a computer (e.g., any suitable computer or image processor embedded in a device, such as a laptop computer, entertainment console, net book, web book, tablet computing device, smartphone, or other mobile computing device). Such software can be executed, for example, on a single local computer or in a network environment (e.g., via the Internet, a wide-area network, a local-area network, a client-server network (such as a cloud computing network), or other such network) using one or more network computers. Additionally, any of the intermediate or final data created and used during implementation of the disclosed methods or systems can also be stored on one or more computer-readable media (e.g., non-transitory computer-readable media) and are considered to be within the scope of the disclosed technology.

This summary is provided to introduce a selection of concepts in a simplified form that are further described below. This summary is not intended to identify key features or essential features of the claimed subject matter, nor is it intended to be used as an aid in determining the scope of the claimed subject matter. Additional features and advantages of the disclosed technology will be made apparent from the following detailed description of embodiments that proceeds with reference to the accompanying drawings.

DETAILED DESCRIPTION

I. General Considerations

Figure 1:
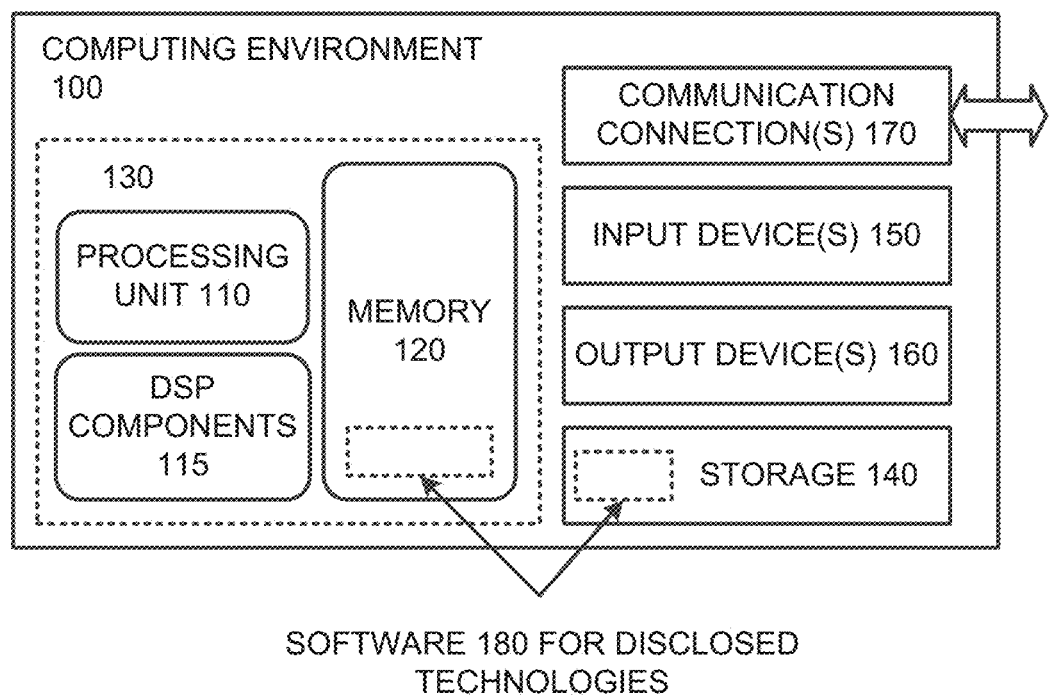
FIG. 1 is a schematic block diagram of an exemplary computing environment in which embodiments of the disclosed technology can be implemented.

Disclosed below are representative embodiments of methods, apparatus, and systems for generating and sharing media among a plurality of computing devices users, such as mobile device users. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used alone or in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Furthermore, as used herein, the term "and/or" means any one item or combination of items in the phrase.

Any of the disclosed methods can be implemented using software comprising computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer or image processor embedded in a device, such as a cell phone, smartphone, PDA, handheld computer, touchscreen tablet computer, laptop computer, portable media player, personal entertainment system, or other mobile computing device). Such software can be executed, for example, on a single local computer or in a network environment (e.g., via the Internet, a wide-area network, a local-area network, a client-server network (such as a cloud computing network), or other such network) using one or more network computers (e.g., a network server). Additionally, any of the intermediate or final data created and used during implementation of the disclosed methods or systems can also be stored on one or more computer-readable media (e.g., non-transitory computer-readable media) and are considered to be within the scope of the disclosed technology. Furthermore, any of the software-based embodiments can be uploaded, downloaded, or remotely accessed through a suitable communication means. Such suitable communication means include, for example, the Internet, the World Wide Web, an intranet, software applications, cable (e.g., fiber optic cable), magnetic communications, electromagnetic communications (e.g., RF, microwave, and infrared communications), electronic communications, or other such communication means.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, HTML5, or any other suitable programming language. Likewise, the disclosed technology is not limited to any particular computer or type of hardware. Exemplary computing environments suitable for performing any of the disclosed software-based methods are introduced below.

The disclosed methods can also be implemented using specialized computing hardware configured to perform any of the disclosed methods. For example, the disclosed methods can be implemented by an integrated circuit (e.g., an application specific integrated circuit ("ASIC") (such as an ASIC digital signal process unit ("DSP"), a graphics processing unit ("GPU"), or a programmable logic device ("PLD"), such as a field programmable gate array ("FPGA")) specially designed or configured to implement any of the disclosed methods.

The disclosed techniques can be used in a variety of usage and computation scenarios, including photo or video capturing and sharing on a mobile device, stand-alone desktop computer, network client computer, or server computer. Further, various parts of the disclosed media sharing techniques can be performed in parallel or cooperatively on multiple computing devices, such as in a client/server, network "cloud" service, or peer computing arrangement, among others. Accordingly, it should be recognized that the techniques can be realized using a variety of different electronic and computing devices, including both end use consumer-operated devices as well as server computers that may provide the techniques as part of a service offered to customers.

A. Example Computing Environments

FIG. 1 illustrates a generalized example of a suitable computing device environment or computing hardware environment 100 in which embodiments of the disclosed technology can be implemented. The computing hardware environment 100 is not intended to suggest any limitation as to the scope of use or functionality of the disclosed technology, as the technology can be implemented in diverse general-purpose or special-purpose computing environments. The disclosed technology may also be practiced in distributed computing environments where tasks are performed by remote processing devices that are linked through a communications network (e.g., a cloud computing network). In a distributed computing environment, program modules may be located in both local and remote memory storage devices.

With reference to FIG. 1, the computing hardware environment 100 includes at least one processing unit 110 and memory 120. In FIG. 1, this most basic configuration 130 is included within a dashed line. The processing unit 110 executes computer-executable instructions. In a multi-processor system, multiple processing units execute computer-executable instructions to increase processing power. The memory 120 can be volatile memory (e.g., registers, cache, RAM, DRAM, SRAM), non-volatile memory (e.g., ROM, EEPROM, flash memory), or some combination of the two. The memory 120 can store software 180 for implementing one or more of the media sharing techniques disclosed herein. For example, the memory 120 can store software 180 for implementing any of the disclosed methods.

In addition to the central processing unit 110, the computing environment can include other processing resources, such as digital signal processing DSP or multimedia components 115. The DSP components 115 can include resources that can be used as part of the facial recognition and/or media sharing techniques disclosed herein. For example, the DSP components can include multimedia DSP ASIC units, GPU shader units, a multicore CPU, advanced multimedia instruction sets for the CPU, or the like.

The computing hardware environment can have additional features. For example, the computing hardware environment 100 includes a storage device 140, one or more input devices 150, one or more output devices 160, and one or more communication connections 170. An interconnection mechanism (not shown) such as a bus, controller, or network interconnects the components of the computing hardware environment 100. Typically, operating system software (not shown) provides an operating environment for other software executing in the computing hardware environment 100, and coordinates activities of the components of the computing hardware environment 100.

The storage device 140 is a type of non-volatile memory and can be removable or non-removable. The storage device 140 includes, for instance, non-transitory computer readable media such as magnetic disks (e.g., hard drives), magnetic tapes, optical storage media (e.g., CD-ROMs or DVDs), or any other tangible non-transitory storage medium that can be used to store information and which can be accessed within or by the computing hardware environment 100. The storage device 140 can also store the software 180 for implementing any of the described techniques.

The input device(s) 150 can be a touch input device such as a keyboard, mouse, touchscreen, pen, trackball, a voice input device, a scanning device, or another device that provides input to the computing environment 100 (e.g., an image capturing device, video capturing device, or audio capturing device). The output device(s) 160 can be a display device, touchscreen, printer, speaker, or another device that provides output from the computing environment 100. Further, any of the input or output devices can include embedded components that operate or otherwise use embedded software.

The communication connection(s) 170 enable communication over a communication medium to another computing entity. The communication medium conveys information such as computer-executable instructions, and any of the intermediate or final data used in implementing embodiments of the disclosed technology. By way of example, and not limitation, communication media include wired or wireless techniques implemented with an electrical, optical, RF, infrared, acoustic, or other carrier.

The various methods disclosed herein (e.g., any of the disclosed media-sharing and/or facial recognition techniques) can be described in the general context of computer-executable instructions stored on one or more computer-readable storage media (e.g., tangible non-transitory computer-readable storage media such as memory 120 and storage 140). As should be readily understood, the terms "computer-readable storage media" or "non-transitory computer-readable media" include the media for storage of data and program instructions such as memory 120 and storage 140, and not modulated data signals alone.

The various methods disclosed herein can also be described in the general context of computer-executable instructions, such as those included in program modules, being executed by a processor in a computing environment. Generally, program modules include routines, programs, libraries, objects, classes, components, data structures, and/or other such software elements that perform particular tasks or implement particular abstract data types. The functionality of the program modules may be combined or split between program modules as desired in various embodiments. Any of the disclosed methods can also be performed using a distributed computing environment (e.g., a client-server network, cloud computing environment, wide area network, or local area network).

Further, the facial recognition and/or media-sharing embodiments disclosed herein can be implemented either as a separate, stand-alone application or integrated with the operating system of the computing device. For example, any of the disclosed embodiments can be implemented as part of the login authentication system controlled by the operating system.

B. Example Mobile Devices

Figure 2:
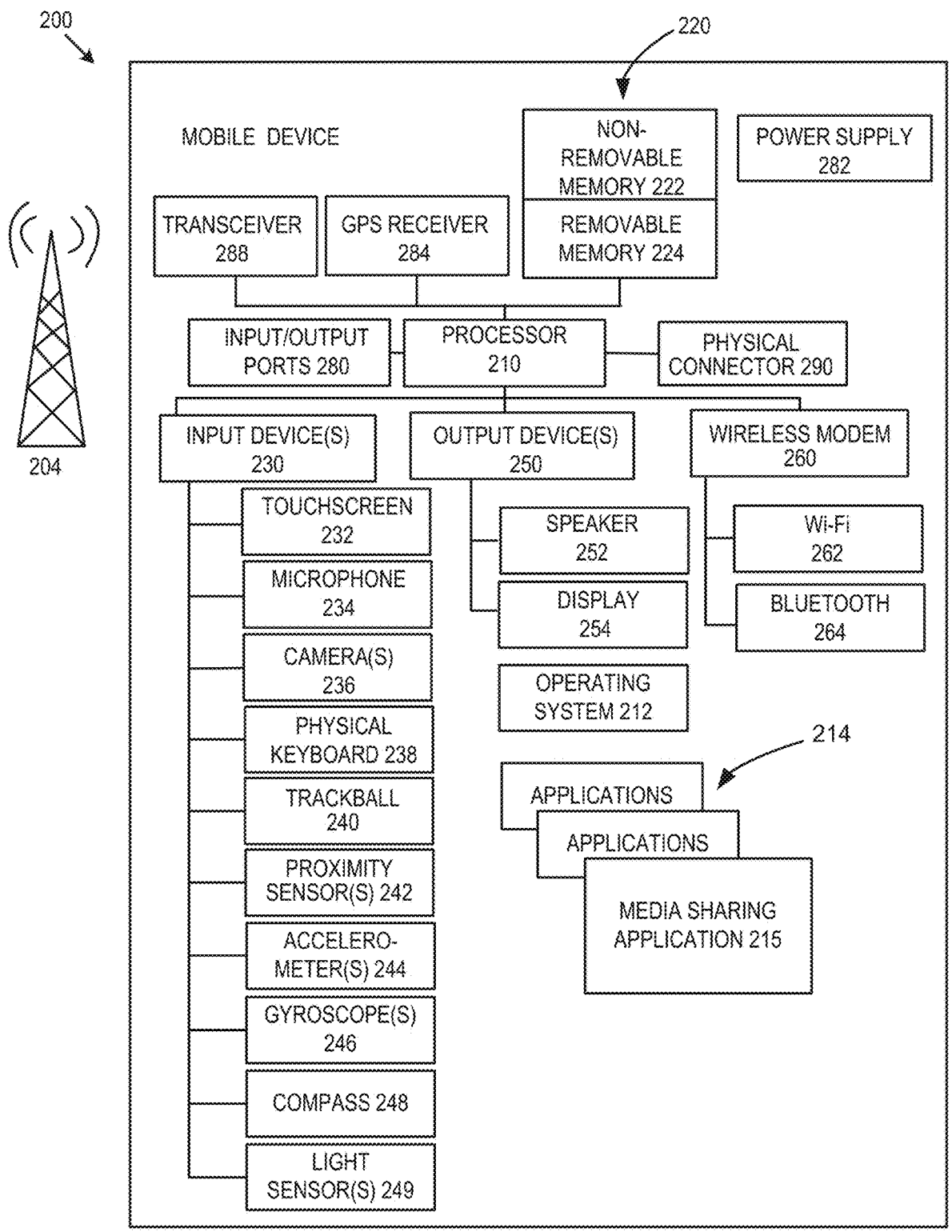
FIG. 2 is a schematic block diagram of an exemplary mobile device environment in which embodiments of the disclosed technology can be implemented.

FIG. 2 is a schematic block diagram depicting a detailed example of a mobile computing device 200 capable of implementing the tools and techniques described herein. The mobile device 200 includes a variety of optional hardware and software components. In general, a component in the mobile device can communicate with any other component of the device, although not all connections are shown, for ease of illustration. The mobile device can be any of a variety of computing devices (e.g., a cell phone, smartphone, handheld computer, laptop computer, notebook computer, tablet computer media player, PDA, entertainment console, smart TV, desktop computer, camera, video camera, or other such devices) and can allow wireless two-way communications with one or more mobile communications networks 204, such as a Wi-Fi, cellular, or satellite network.

The illustrated mobile device 200 includes a controller or processor 210 (e.g., signal processor, microprocessor, ASIC, or other control and processing logic circuitry) for performing such tasks as signal coding, data processing, input/output processing, power control, and/or other functions. An operating system 212 controls the allocation and usage of the components and support for one or more application programs 214, such as a media-sharing tool 215 that implements one or more of the innovative features described herein. The application programs can further include common mobile computing applications (e.g., telephony applications, email applications, calendars, contact managers, web browsers, social network applications, messaging applications), or any other computing application.

The illustrated mobile device 200 includes memory 220. Memory 220 can include non-removable memory 222 and/or removable memory 224. The non-removable memory 222 can include RAM, ROM, flash memory, a hard disk, or other well-known memory storage technologies. The removable memory 224 can include Flash memory or a Subscriber Identity Module ("SIM") card, which is well known in Global System for Mobile Communications ("GSM") communication systems, or other well-known memory storage technologies, such as "smart cards." The memory 220 can be used for storing data and/or code for running the operating system 212 and the applications 214. Example data can include web pages, text, images, sound files, video data, or other data sets to be sent to and/or received from one or more network servers or other devices via one or more wired or wireless networks. The memory 220 can be used to store a subscriber identifier, such as an International Mobile Subscriber Identity ("IMSI"), and an equipment identifier, such as an International Mobile Equipment Identifier ("IMEI"). Such identifiers can be transmitted to a network server to identify users and equipment.

The mobile device 200 can support one or more input devices 230, such as a touchscreen 232 (e.g., capable of capturing finger tap inputs, finger gesture inputs, multi-touch finger tap inputs, multi-touch finger gesture inputs, or keystroke inputs for a virtual keyboard or keypad), microphone 234 (e.g., capable of capturing voice input), one or more cameras 236 (e.g., capable of capturing still pictures and/or video), physical keyboard 238, trackball 240, one or more proximity sensors 242, one or more accelerometers 244, one or more gyroscopes 246, compass 248, one or more light sensors 249, and/or buttons. The mobile device 200 can further support one or more output devices 250, such as a speaker 252 and a display 254. Other possible output devices (not shown) can include piezoelectric or other haptic output devices. Some devices can serve more than one input/output function. For example, touchscreen 232 and display 254 can be combined in a single input/output touchscreen.

The mobile device 200 can provide one or more natural user interfaces ("NUIs"). For example, the operating system 212 or applications 214 can comprise speech-recognition software as part of a voice user interface that allows a user to operate the device 200 via voice commands.

A wireless modem 260 can be coupled to one or more antennas (e.g., transceiver 288) and can support two-way communications between the processor 210 and external devices, as is well understood in the art. The modem 260 is shown generically and can include, for example, a cellular modem for communicating at long range with the mobile communication network 204, a Bluetooth-compatible modem 264, or a Wi-Fi-compatible modem 262 for communicating at short range with an external Bluetooth-equipped device or a local wireless data network or router. The wireless modem 260 is typically configured for communication with one or more cellular networks, such as a GSM network for data and voice communications within a single cellular network, between cellular networks, or between the mobile device and a public switched telephone network ("PSTN").

The mobile device can further include at least one input/output port 280, a power supply 282, a satellite navigation system receiver 284, such as a Global Positioning System ("GPS") receiver, a transceiver 288 (for wirelessly transmitting analog or digital signals) and/or a physical connector 290, which can be a USB port, IEEE 1394 (FireWire) port, and/or RS-232 port. The illustrated components are not required or all-inclusive, as any of the components shown can be deleted and other components can be added.

The mobile device 200 can be part of an implementation environment in which various types of services are provided by a computing "cloud." For example, the cloud can comprise a collection of computing devices, which may be located centrally or distributed, that provide cloud-based services to various types of users and devices connected via a network such as the Internet. Some tasks (e.g., processing user input and presenting a user interface) can be performed on local computing devices (e.g., connected devices) while other tasks (e.g., performing media analysis or facial recognition for an image or video transmitted from the local computing device) can be performed in the cloud.

Although FIG. 2 illustrates a mobile device 200, more generally, the techniques and solutions described herein can be implemented with devices having other screen or image capturing capabilities, such as a desktop computer, a television screen, or device connected to a television (e.g., a set-top box, gaming console, or sensor connected to a gaming console). Services can be provided by the cloud through service providers or through other providers of online services.

Figure 3A:
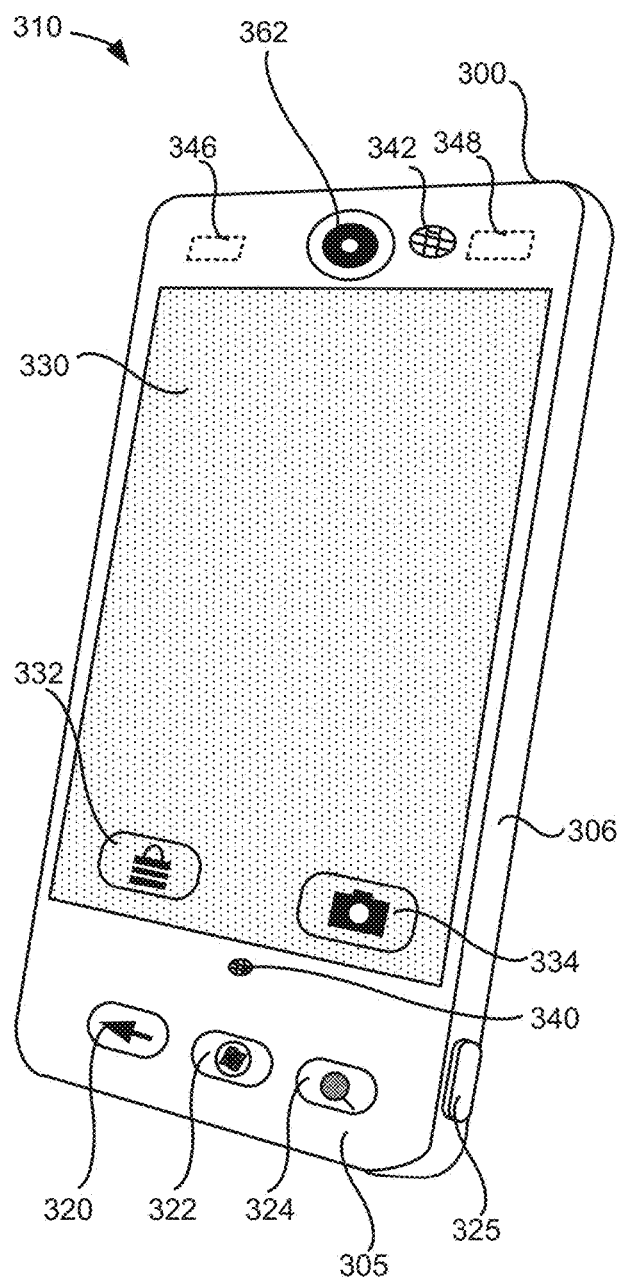
FIGS. 3A and 3B illustrate a generalized example of a mobile device suitable for implementing embodiments of the disclosed technology.
Figure 3B:
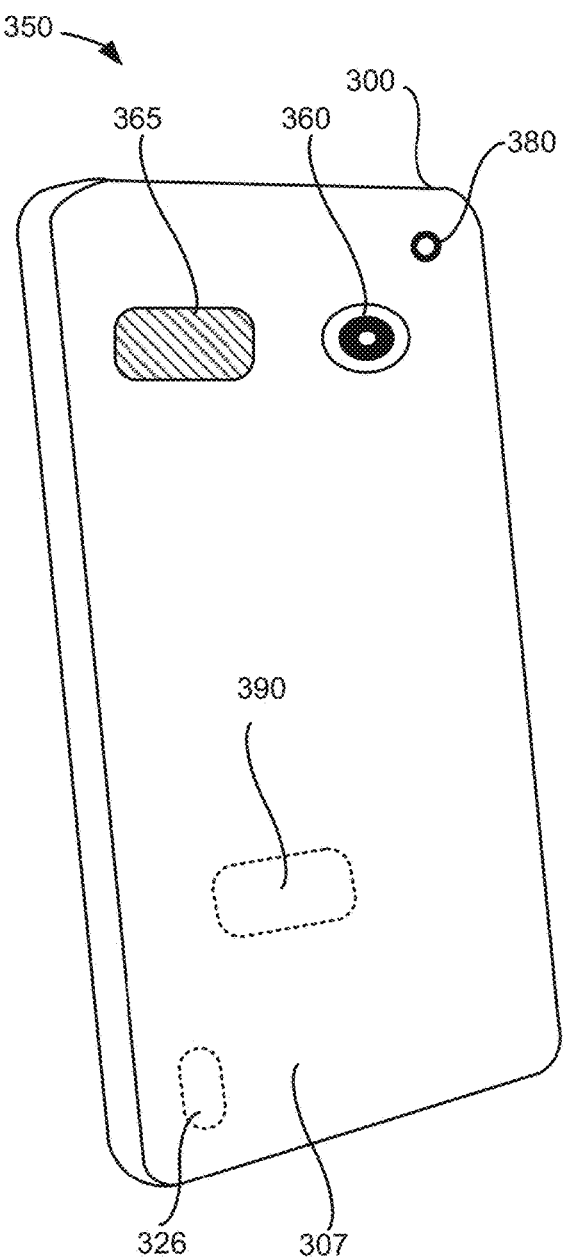

FIG. 3A depicts a front view 310 of the body of an example mobile device 300, while FIG. 3B depicts a rear view 350 of the mobile device. As shown, the mobile device 300 includes several hardware buttons, including a "back" button 320, a home button 322, a search button 324, and a camera shutter (image-capture) button 325. Also depicted is a touchscreen display 330, which is shown displaying a touchscreen unlock button 332, and a touchscreen camera shutter button 334.

The mobile device 300 includes a microphone 340 and speaker 342, along with two proximity sensors 346 and 348, situated below the surface of the mobile device. In some examples, a single, or three or more, proximity sensors can be used. Any suitable proximity sensor(s) can be employed.

The front face of the example mobile device 300 further includes a front camera 362. The camera 362 can be used to capture images or video with an image sensor embedded in the device 300 behind a lens. The image sensor can comprise, for example, a CMOS-based sensor, CCD (charge-coupled device) sensor, or other suitable technology.

In certain embodiments, the camera shutter button 325 of the mobile device 300 is a dedicated dual-action camera shutter button, with the ability to detect "half-press" and "full-press" as distinct, separate actions. As is readily understood to those of skill in the art, a half-press refers to the partial actuation of a button or other control, while a full-press refers to a further actuation of the button or control past a determined limit. In some examples, the dual action camera shutter button 325 is associated with the following attributes. When a half-press is detected, input data is received with the mobile device that is associated with auto-focus functionality. When a full-press is detected, input data is received that is associated with camera invocation and image capture. Various button debounce times can be used for detecting a full-press, a half-press, or both. In other examples, a single-action camera button can be used.

While the camera shutter button 325 is shown located on a side surface 306 of the mobile device 300, in other examples, a camera shutter button can be positioned at alternate locations. For example, the camera shutter button 325 can be located at location 326 (on a rear surface 307), respectively, of the mobile device.

Turning to the rear view 350 shown in FIG. 3B, the example mobile device 300 includes a rear camera lens 360 and an electronic flash 365. In some examples, there is no flash present in the mobile device 300. The rear camera 360 can be configured to capture an image or video with an image sensor embedded in the device behind a lens. The image sensor can be, for example, a CMOS-based sensor, CCD (charge-coupled device) sensor, or other suitable technology.

The individual components (e.g., the hardware buttons 320, 322, 324, and 325, microphone 340, speaker 342, touchscreen display 330, camera lens 360 and flash 365) can be coupled to a mobile device chassis (not shown), which is connected to internal components of the mobile device 300, for example: one or more processors, a piezoelectric actuator, a power supply, and a modem.

As shown, software 390 for implementing embodiments of the described techniques can be stored on computer-readable storage media in the mobile device 300.

C. Example Network Environments

Figure 4:
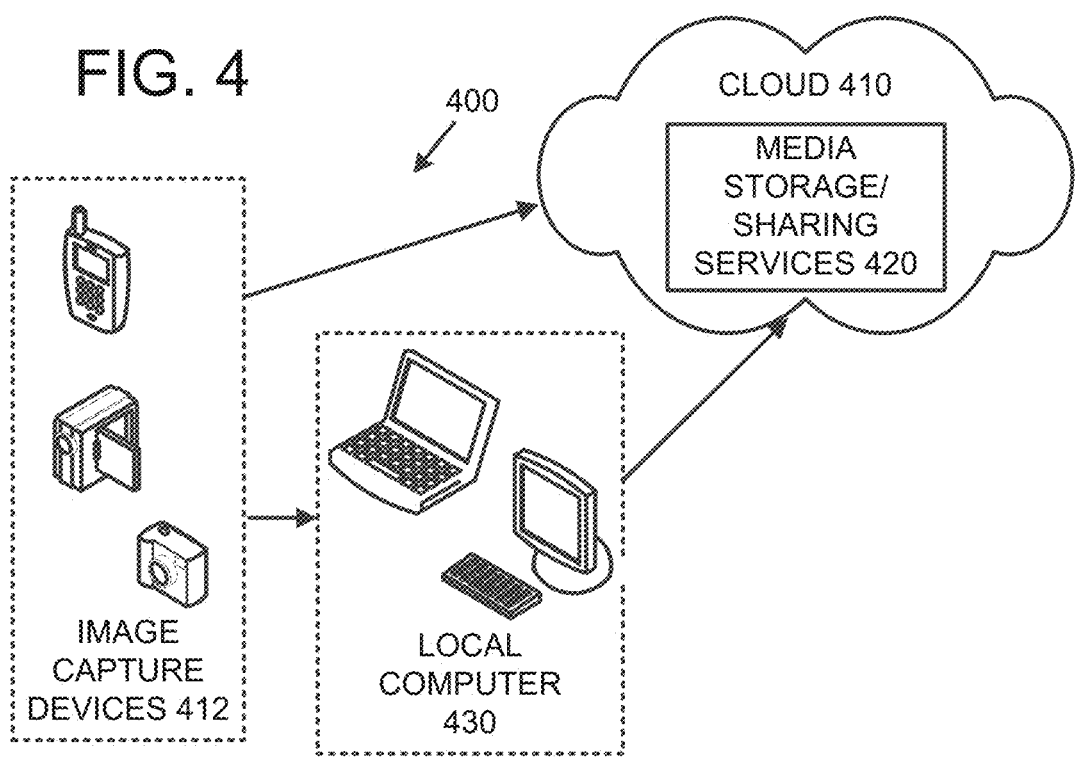
FIGS. 4 and 5 are schematic block diagrams illustrating generalized examples of suitable implementation environments in which one or more aspects of the disclosed techniques are performed by a computing cloud coupled to a computing device.
Figure 5:
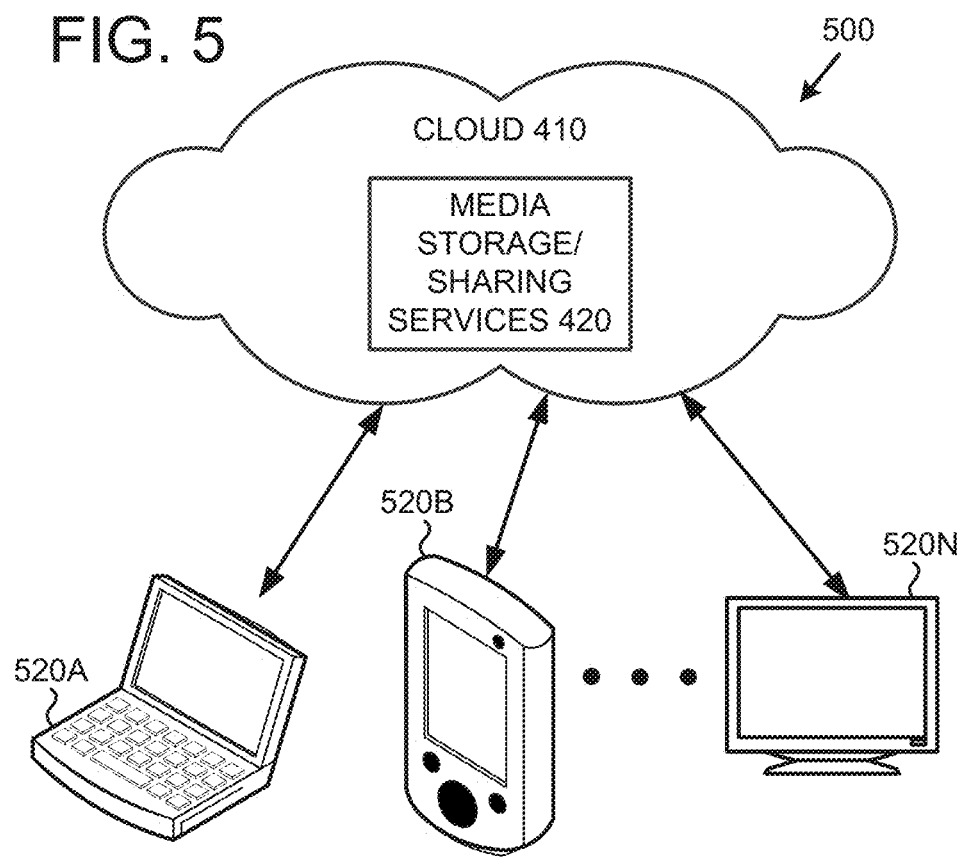

FIGS. 4 and 5 illustrate generalized examples of networking environments 400 and 500 for cloud computing in which the media-sharing and/or facial recognition techniques described herein can be practiced. In example environment 400, the cloud 410 provides services 420 (such as media-sharing, facial recognition, or social networking services, among other examples) for user computing devices. Services can be provided in the cloud 410 through cloud computing service providers, or through other providers of online services. For example, the cloud-based services 420 can include media processing and sharing services that uses any of the techniques disclosed, a media storage service, a social networking site, or other services via which user-sourced media are stored and distributed to connected devices.

The user may use various image or video capture devices 412 to capture one or more images or video. The user can upload the one or more digital images to the service 420 on the cloud 410 either directly (e.g., using a data transmission service of a telecommunications network) or by first transferring the one or more images to a local computer 430, such as a personal computer, mobile device, or other network-connected computing device.

As shown in example environment 500 in FIG. 5, cloud 410 can also be used to provide services that include embodiments of the disclosed media-sharing techniques to connected computer devices that have a variety of screen display sizes 520A-N. Connected device 520A represents a device with a mid-size display screen, such as may be available on a personal computer, a laptop, or other like network-connected device. Connected device 520B represents a device with a display screen configured to be highly portable (e.g., a small size screen). For example, connected device 520B could be a smartphone, personal digital assistant, tablet computer, portable entertainment system, media player, or the like. Connected device 520N represents a connected device with a large viewing screen. For example, connected device 520N could be a television screen (e.g., a smart television) or another device that provides image output to a television or an image projector (e.g., a set-top box or gaming console), or other devices with like image display output. The connected devices 520A-N can further include image-capturing hardware. For example, the connected device 520B can be a mobile device with one or more image sensors, and the connected device 520N can be a television coupled to an entertainment console having an accessory that includes one or more image sensors.

In the illustrated cloud-computing network environments 400 and 500, any of the techniques disclosed herein can be implemented at least in part by cloud 410. In one example scenario, an embodiment of the disclosed media-sharing techniques is implemented in software on the local computer 430, one of the local image capture devices 412 (e.g., smartphone, personal digital assistant, tablet computer, or the like), and/or connected devices 520A-N. In another scenario, an embodiment of the disclosed media-sharing techniques is implemented in the cloud, and applied to media as they are uploaded to and stored in the cloud. In this scenario, the media-sharing technique can be performed using media stored in the cloud as well.

II. Example Media-Sharing Tools and Techniques

A. Introduction to the Disclosed Technology

Since the advent of the digital still-image camera, people have been accumulating digital media about their lives. With the advent of the smartphone, which typically combines a camera and a computer in a mobile device, these digital media collections are now growing rapidly. Further, digital media can be augmented with various types of metadata. But there has been limited progress on how this digital media is organized and consumed.

To make a media collection more clearly associated with a memory or a narrative of a memory, the digital media is desirably titled and organized according to something that is relevant to the user (e.g., "at the Statue of Liberty in New York on Jan. 15, 2011"). Such meaningful narratives have traditionally been created by human curation, which is time-consuming and tedious. Embodiments of the disclosed technology simplify and automate the creation of digital media collections.

Further, once a meaningful collection of digital media is created, the media is typically consumed in a limited number of ways. For example, photos from a digital media collection can be displayed as a grid of pictures or individual videos. The photos or videos can then be individually enlarged or played back upon selection by a user. In an alternative method, rote slideshows of the collection are displayed, or a movie is displayed only after careful user selection of specific representative pictures from the collections, clips of video, and perhaps some music to give the narrative color. These methods of consuming digital media, however, have several disadvantages. For example, none of these methods includes the convenience of browsing together with the richness of narratives (e.g., movie-style narratives). Further, making a movie from a media collection is a tedious, time-consuming manual process. For example, manually making a movie involves picking the desired pictures and/or clips of videos, leveling the sounds, adding music for ambience, and finally adding title screens and endings. Moreover, such movies are static objects. If the collection changes, the movie has to be remade again.

Using embodiments of the disclosed technology, a unified playback and browsing experience for a collection of media is created automatically. For instance, heuristics and metadata can be used to assemble and add narratives to the media data. Furthermore, this new representation of media can recompose itself dynamically as more media is added to the collection.

While a collection may use a single user's content, sometimes media that is desirable to include in the collection is captured by friends and/or family present at the same event. Typically, this media is only available to a user if the friend or family member shares it with the user by manually sending the media (e.g., via a multimedia messaging service ("MMS")). Using embodiments of the disclosed technology, however, media content related to the event can be automatically collected and shared among selected groups of friends or attendees at an event. Further, any new media can be automatically incorporated into a media collection (or album) associated with the event, and the playback experience can be dynamically updated to include the new media into the playback experience.

Further, once the media collections are created and played back, people typically enjoy sharing them with their friends and family, and sometimes the entire world. Furthermore, viewers of the media will often want to add a comment or their own thoughts and feelings about the media collection using paradigms like comments, "likes", and tags of people. Traditionally, this type of supplemental social data is treated independent of the media collection. Using certain embodiments of the disclosed technology, this data is automatically curated and included in the playback experience.

Figure 6:
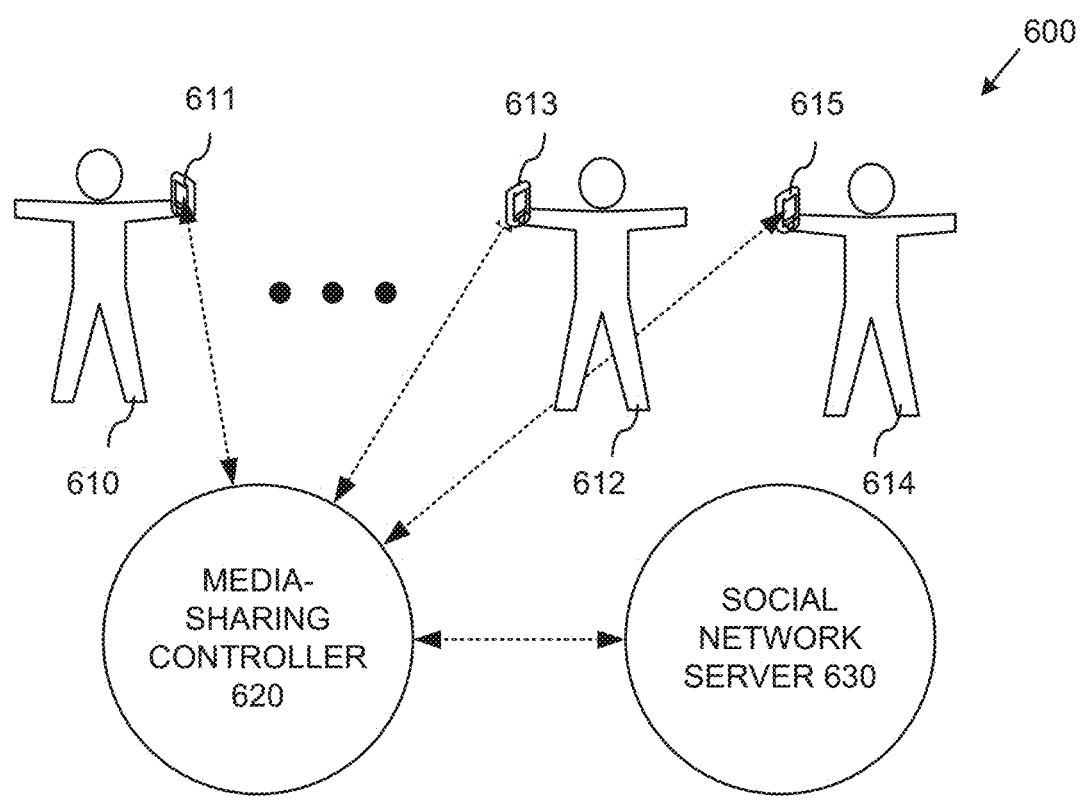
FIG. 6 is a schematic block diagram illustrating example users of a media-sharing system according to exemplary embodiments of the disclosed technology.

FIG. 6 is a schematic block diagram 600 illustrating example users of a media-sharing system according to exemplary embodiments of the disclosed technology. In particular, users 610, 612, 614 are shown, each having a respective mobile device 611, 613, 615 (such as cell phones, smartphones, personal digital assistants ("PDAs"), handheld computers, touchscreen tablet computers, laptop computers, portable media players, personal entertainment systems, or other such mobile devices) which are capable of capturing digital media (e.g., images, video, audio, or other such media). In the illustrated embodiment, the mobile devices are configured to communicate with a media-sharing controller 620, which is typically a remotely located server but can also be a controller implemented locally by one of the mobile devices. In the situation where the media-sharing controller is a remotely located server, the server can be accessed using the wireless modem and communication network associated with the mobile device (e.g., the wireless modem 260 and communication network 204). In the illustrated embodiment, the media-sharing controller 620 is configured for two-way communication with the mobile devices 611, 613, 615. Further, in the illustrated embodiment, the media-sharing controller 620 is configured to communicate with and access data from one or more social network servers 630 (e.g., over a public network, such as the Internet).

The social network servers 630 can be servers operated by any of a wide variety of social network providers (e.g., Facebook®, LinkedIn®, and the like) and generally comprise servers that store information about users that are connected to one another by one or more interdependencies (e.g., friends, business relationship, family, and the like). Although some of the user information stored by a social network server is private, some portion of user information is typically public information (e.g., a basic profile of the user that includes a user's name, picture, and general information). Additionally, in some instances, a user's private information can be accessed by using the user's login and password information. The information available from a user's social network account can be expansive and can include one or more lists of friends, current location information (e.g., whether the user has "checked in" to a particular locale), additional images of the user or the user's friends. Further, with advancements in facial recognition technology, the available information can include facial recognition information (e.g., metatags in user photos indicating the identity of people in the photo or facial recognition data (such as feature descriptor data) that is indicative of the unique features or identity of a person in an image). Depending on the privacy setting established by the user, at least some of this information may be available publicly. A user who wishes to allow access to his or her social network account for purposes of aiding the media-sharing controller can provide login and password information through an appropriate settings screen. This information can then be stored by the media-sharing controller. A user's private or public social network information can be searched and accessed by communicating with the social network server, typically using an application programming interface ("API") provided by the social network operator (e.g., the Graph API on the Facebook Platform).

In the illustrated embodiment, the media-sharing controller 620 performs operations associated with a media-sharing application or method. For example, and in high-level terms, the media-sharing controller 620 can receive media from a plurality of users (or just from the local user), determine relationships between two or more of the users (e.g., according to user-selected criteria), and transmit subsets (or clusters) of the media to one or more users based on the determined relationships.

As noted, it should be understood that the media-sharing controller need not be implemented by a remote server, as any one or more of the operations performed by the media-sharing controller can be performed locally by any of the mobile devices, or in another distributed computing environment (e.g., a cloud computing environment). For instance, the clustering of media into events and further according to user-selected relationships can be performed locally at the mobile device itself.

Figure 7:
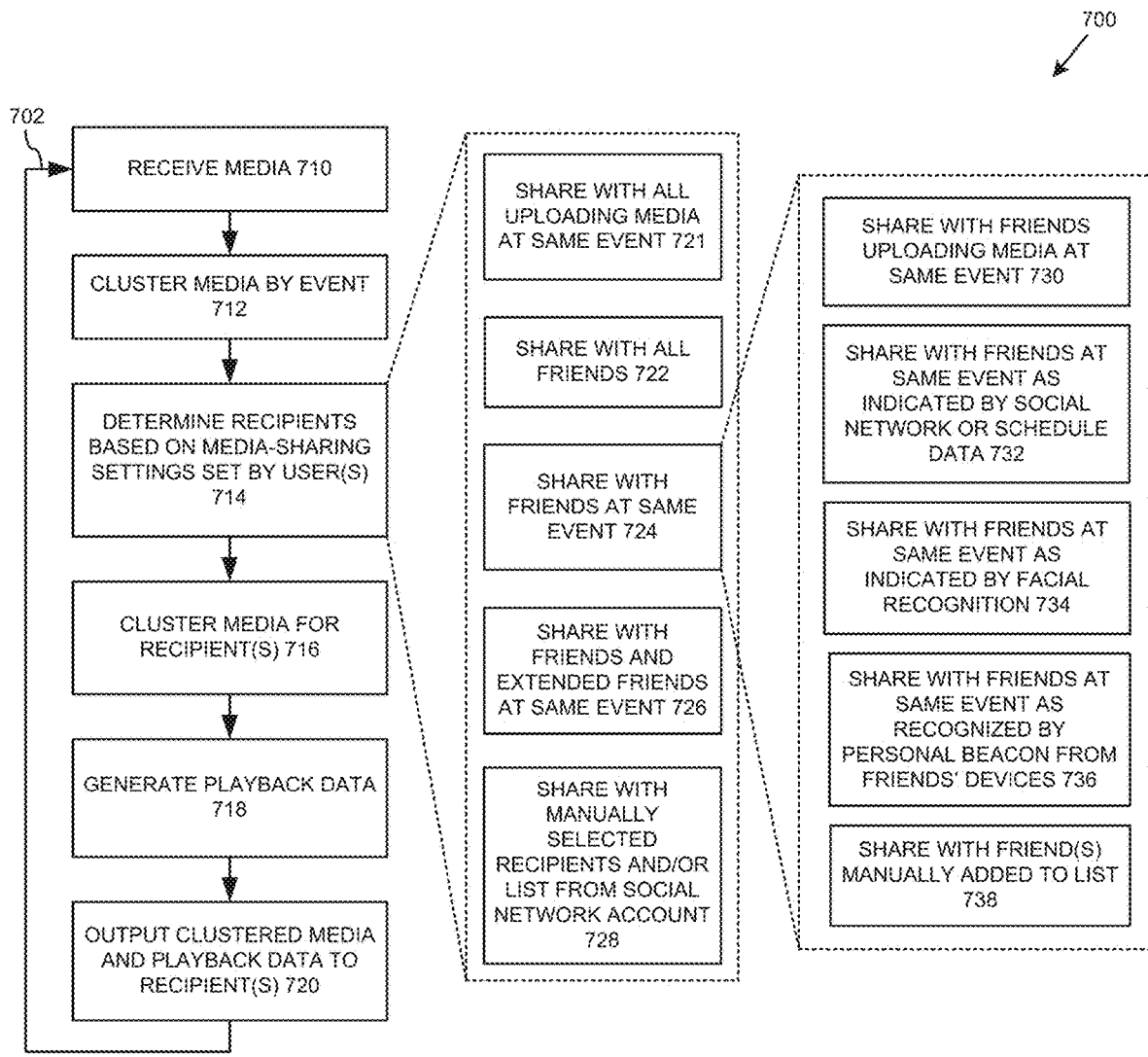
FIG. 7 is a flow chart illustrating exemplary methods for performing media-sharing according to the disclosed technology.

FIG. 7 is a flow chart of an exemplary method 700 for performing media sharing. The exemplary method 700 can be performed by a media-sharing controller, which can be implemented in whole or in part locally at a user's mobile device or by a remotely located server. Any of the method acts can be performed alone or in any combination or subcombination with one another.

At 710, one or more instances of digital media are received. For example, the one or more instances of digital media can comprise image data, video data, audio data, or other digital media data. The one or more instances of digital media can be received from a plurality of users (e.g., users executing a common media-sharing application). For example, the digital media can be received from mobile devices implementing a media-sharing application that causes recently captured media to be uploaded to a media-sharing controller after being captured by the mobile device. The media received can include or otherwise be associated with supplemental data that indicates the identity of the user generating the media (e.g., based on account information or identity information associated with the mobile device), the location of the mobile device when the media was generated, and/or the time at which the media was generated. For example, by using GPS data and time data available at the mobile device at the time an image is captured, an image uploaded to the media-sharing server can include data indicating the longitude and latitude (and, in some cases, the altitude), as well as the time at which the image or video was captured. Such geographic information is sometimes referred to herein as a "geotag" for an instance of media.

At 712, the received media is clustered by event. In general, clustering media by event involves recognizing that two or more instances of media were captured at a location and time sufficiently related in geographic location and time that it can be inferred that the instances of media were captured at the same "event". For example, a first photo taken at a wedding and a second photo taken minutes later at or nearby the location of the first photo can be determined to be sufficiently related to one another that they can be identified and clustered as belonging to the same event. Exemplary methods for evaluating and clustering media by event are described below in Section II.B.

At 714, one or more recipients for the clustered event-related media are determined. For example, the recipients can be determined from media-sharing settings set by a user uploading media. The user settings can be sent by a user at any time and stored by the media-sharing controller until changes are made. Alternatively, the user settings can be sent from a user and received at the media-sharing controller each time media is transmitted by the user or each time a new event is established by the user. The exemplary media-sharing settings illustrated in FIG. 7 are described below in Section II.C.

At 716, the clustered event-related media is further clustered into recipient-specific clusters. For example, the event-related media can be clustered based on the media-sharing settings received from one or more users, resulting in one or more event-related clusters of media that are specific for each individual recipient. The clustering of recipient-specific event media is described in more detail in Section II.C below.

At 718, playback data (sometimes referred to as presentation data) is generated for the recipient-specific clusters. In certain embodiments, the playback data includes one or more of data indicating titles for the video, image, or audio data; data indicating an order of the media; data indicating a slideshow speed; data indicating commentary associated with the video, image, or audio data; data about how and where to display the titles and/or commentary; data indicating a font selection and appearance; data about background colors and shapes; data about music; thematic data; and/or other such presentation data. The playback data is used together with the other data to create a unique playback experience for the user when viewed. Exemplary embodiments for generating suitable media playback experiences are discussed below in Section II.D.

At 720, the recipient-specific clustered media from 716 and the playback data from 718 are output for viewing by the one or more recipient(s) determined at 714 (e.g., by transmitting the data to one or more recipients, transmitting the data to a website allowing access to the clustered media, or otherwise making the media available for access and viewing). The information output at 720 can include the playback data generated at 718, data for representing the media from 716 (e.g., a suitable compressed or uncompressed media file) as well as data for identifying the user(s) who are sharing the media and other supplemental metadata (e.g., tags or additional information for supplementing the media). In other embodiments, a single media playback file for the collection of media can be generated for the collection of media (e.g., a video file that presents the playback experience or other data object that combines the collection of media and the playback data) and output at 720. In particular implementations, the information output at 720 can be data suitable for presentation using Microsoft's Silverlight player, HTML data (e.g., HTML 5 data), data for a Flash player, data for a X3D player, or data for any other suitable media viewing player. The data output at 720 can be transmitted to the recipient, or can be made available for viewing by the recipient (e.g., at a web site associated with the media-sharing application, at a user's social network website, or via a media-sharing application that the recipient can run on their computing device). For instance, a file for presenting the playback experience can be posted to a user's social network web page (e.g., by using an appropriate API for the social network). A notification that the collection is ready for viewing or that the collection has been updated (e.g., when a new instance of media is added or when a new comment is added) can be automatically sent to the authorized recipient.

As shown by arrow 702 in the illustrated embodiment, the process 700 can be automatically repeated as new media is received, resulting in a media grouping, playback, and sharing system that operates continuously and automatically as new media is received. When the clustered media is updated with new media, an entire representation of the updated clusters together with updated playback data can be output or a representation of just the new material can be output. The new material can then be added to the media previously received by the recipients. When a recipient views the updated media, the recipient can select to view only the new data since the last time the clustered media was viewed.

Furthermore, the process 700 can operate with default settings for determining how to cluster events and which sharing settings to use, or can operate with one or more settings manually selected by the users.

B. Clustering Event-Related Media

This section describes various embodiments for determining when media is part of the same event. Any of the disclosed embodiments can be used, for example, to determine how to cluster media by event (e.g., at process block 712 of FIG. 7).

Figure 8:
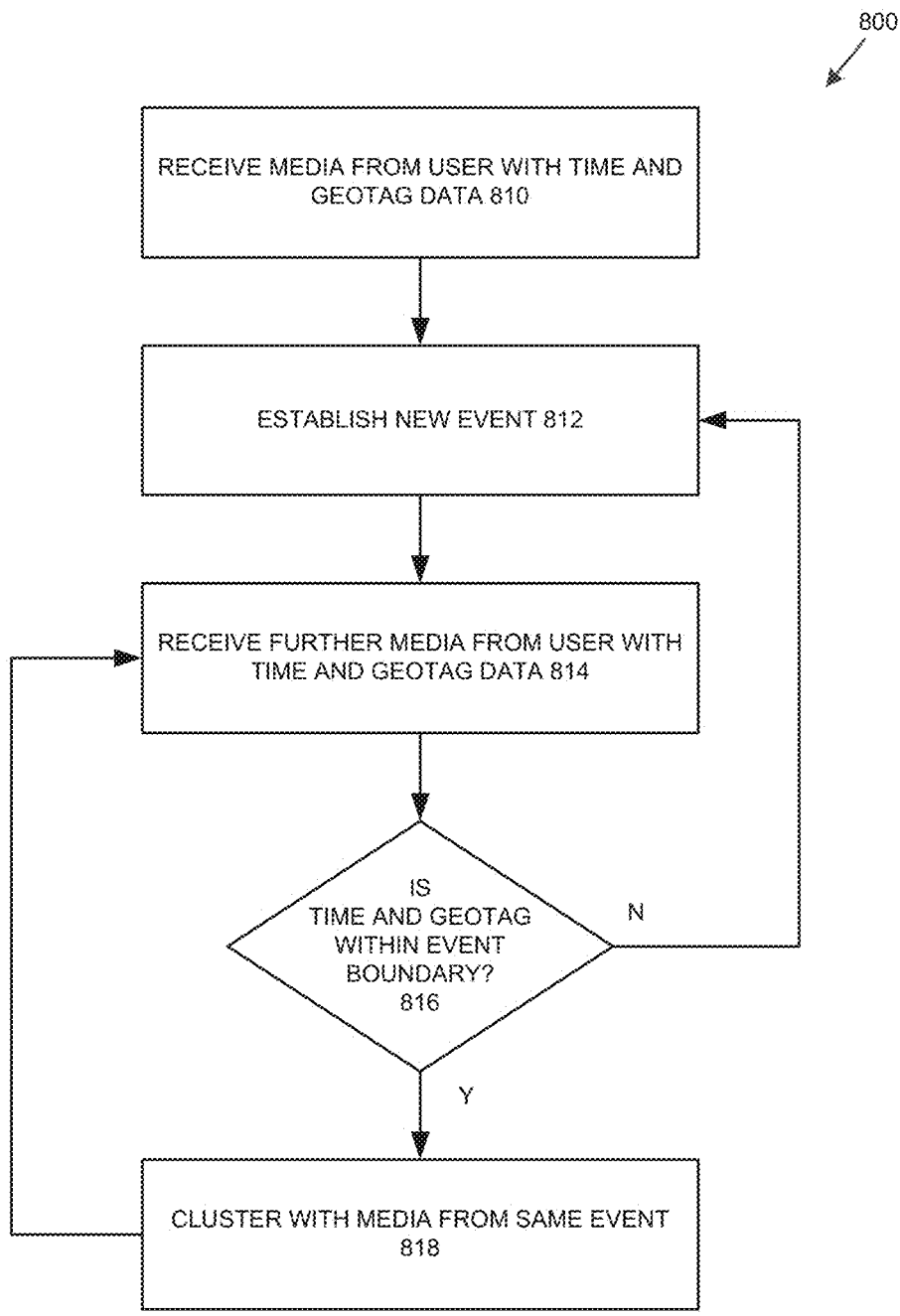
FIG. 8 is a flow chart of an exemplary method for creating event-related clusters of digital media.

FIG. 8 is a flow chart of an exemplary method 800 for creating event-related clusters of digital media. The exemplary method 800 can be performed in whole or in part locally at a user's mobile device or can be performed by a remotely located server. Any of the method acts can be performed alone or in any combination or subcombination with one another.

At 810, an instance of digital media is received. For example, the instance of digital media can comprise image data, video data, audio data, or other digital media data. In the illustrated embodiment, the instance of digital media includes identity data as well as time and location data. For example, the instance of digital media can include data indicating the identity of the device capturing the data (which can be associated with a particular user), the geographic coordinates of the mobile device at the time when the media was created (e.g., GPS coordinates determined by the GPS receiver 284), and the time at which the media was created. In certain embodiments, before the identity and location data is sent from a user's device and received at 810, the user can be notified that this data may be used and requested to consent to the use of such data for performing method 800. The user's consent can be requested each time an event is established or when an application for performing method 800 is originally used, and can be withdrawn.

At 812, a new event associated with the received instance of digital media is created. The event can be defined by the basic time and location data received with the instance of digital media. In certain embodiments, additional information is included as part of the event data. For example, the name of the location at which the media was created can be determined and included as part of the event data. For instance, the geographic coordinates can be input to a location-based web service that maintains map data and geocoding information (e.g., data correlating geographic location with location name or address) in order to obtain the name of the location. Such services include, for example, Microsoft's MapPoint location-based service. In other embodiments, object recognition software is used to analyze the media, recognize known objects, and include the identity of the object with the event data.

Figure 9:
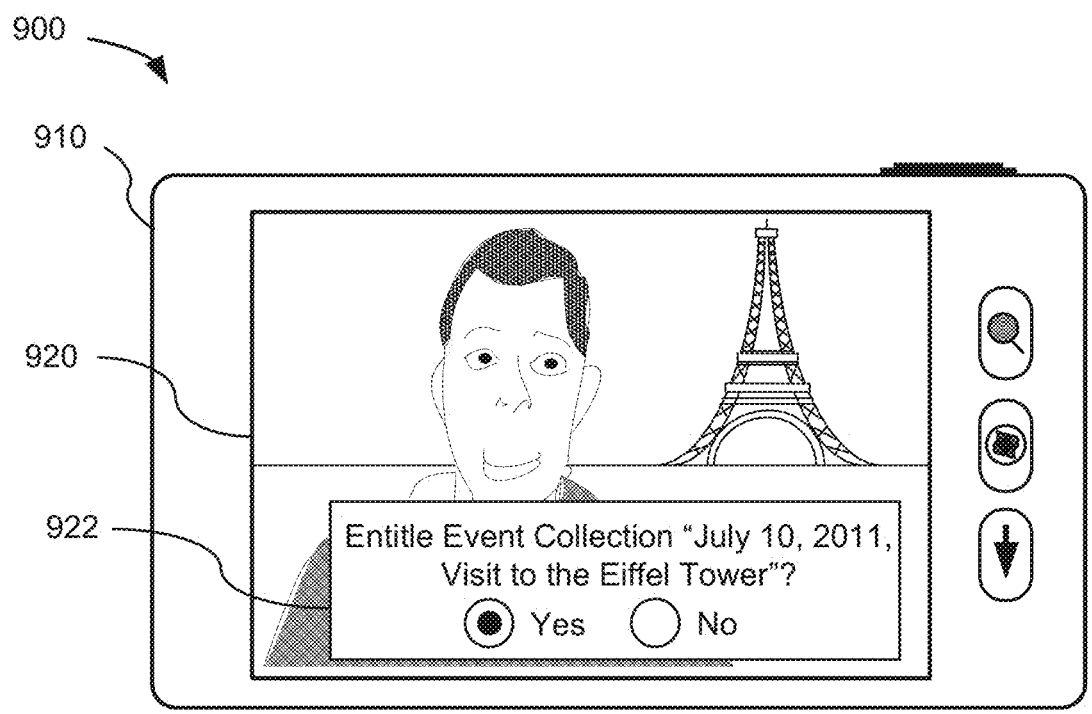
FIG. 9 is a schematic block diagram depicting an exemplary mobile device displaying an event-name confirmation screen.

In certain embodiments, when a particular location is identified, the user can be prompted as to whether the event is to use the location name as part of the event's title. If not, then the user can elect to give the event a different title or use a default title (e.g., a title based on the date and time of the media). FIG. 9 is a schematic block diagram 900 depicting an exemplary mobile device 910 displaying an event-name confirmation screen 920. In the example illustrated, geotag data associated with the media or object recognition results were used to identify the location of the media as being near the Eiffel tower. As a result of the location identification, the user is prompted in box 922 as to whether the event associated with the media is to be entitled "Jul. 10, 2011, visit to the Eiffel Tower", which can be automatically generated using the time information and the location information identified with the media.

In certain embodiments, by using facial detection and facial recognition techniques implemented by the device or by the media-sharing controller, faces of people in the media images can be identified and included as part of the event data. A wide variety of facial detection and facial recognition techniques can be used. Exemplary facial detection and facial recognition techniques include techniques that use embodiments of a Viola-Jones detector. Additional details concerning the Viola-Jones facial detection process and feature descriptor generation processes as can be used in embodiments of the disclosed technology are described in Paul Viola et al., "Robust Real Time Object Detection," Second International Workshop on Statistical and Computational Theories of Vision—Modeling, Learning, Computing, and Sampling (2001), and Z. Cao et al, "Face Recognition with Learning-Based Descriptor," *IEEE CVPR* 2010, pp. 2707-2714 (2010). It should be understood that other feature descriptors or feature descriptor generation techniques can be used in addition to or in place of the identified techniques. For example, techniques based on local binary patterns ("LBPs"), histograms of oriented gradients ("HOGs"), Gabor wavelets, or kernel linear discriminant analysis ("LDA") can be used to compute feature vectors that are compared with corresponding feature vectors from one or more images with known faces in order to perform facial recognition. See, e.g., N. Dalal et al., "Histograms of Oriented Gradients for Human Detection," *Proc. of CVPR*, pp. 886-893 (2005); T. Ojala et al., "Multiresolution Gray-Scale and Rotation Invariant Texture Classification with Local Binary Patterns," *IEEE Trans. on Pattern Analysis and Machine Intelligence*, vol. 24, no. 7, pp. 971-987 (2002); L. Wiskott et al., "Face Recognition by Elastic Bunch Graph Matching," *IEEE Trans. on Pattern Analysis*

*and Machine Intelligence*, vol. 19, no. 7, pp. 775-779 (1997). Further, facial recognition information available from one or more social network databases can be used as part of the facial recognition process. For example, using publicly available APIs from social networking websites, a user's or friend's social network account can be accessed and information associated with the user's or friend's account used to help perform facial recognition. For example, tagged photos in one or more photo albums stored as part of the user's account can be used as reference images for the facial recognition process, or a user's profile photo can be used as a reference image for the facial recognition process.

At 814, a further instance of media is received. The media can be received from the same user as the media received at 810, or, in certain embodiments, can be received from another user. The further instance of digital media can comprise image data, video data, audio data, or other digital media data. In the illustrated embodiment, the further instance of digital media includes identity data and time and location data. For example, the instance of digital media can include data indicating the identity of the device capturing the data (which can be associated with a particular user), the geographic coordinates of the mobile device at the time when the media was created (e.g., GPS coordinates determined by the GPS receiver 284), and the time at which the media was created.

At 816, a determination is made as to whether the further instance of media from 814 is associated with the event established at 812. In an exemplary embodiment, the determination at 816 is made based on the time and location data associated with the further instance of media. Time and location criteria (referred to as the "event boundary") can be established for determining whether the media is to be clustered with other media from an event. For instance, if the further media was captured at a time within a threshold time of the earlier media (e.g., within 5-120 minutes, or within any other time period) and was also captured at a location sufficiently close to the location of the earlier media (e.g., within a certain radius (such as within 20-1000 feet, or within any other distance) or within a boundary as defined by location-based web service), then at 818, the further media can be clustered with the media associated with the event established at 812. For example, the media can be stored in a folder or other partition in a hierarchical file structure such that the media for the event is grouped together and/or the media can be include supplemental data (e.g., a flag, an event identification number, or other identification data) that identifies the further media as being part of the same event as the other media for the event. The method 800 can then continue when a next instance of media is received at 814. If the further instance of media is determined to be outside of the event boundary at 816, then the further media can be considered to be associated with a new event, and the process can continue from 812.

As each new instance of media is clustered with other media from the event, the additional media can be analyzed to determine supplemental data (e.g., using a facial recognition, object recognition, or location recognition technique). This supplemental data can then be associated with the new data and/or associated with event data for the event. For instance, if the further media received at 814 is an image or video, the image or video can be analyzed using a suitable facial detection and recognition technique (e.g., as described above) in order to identify one or more people in the image or video. If people are recognized, then their identity can be saved as supplemental data associated with the media and/or saved as data supplementing the event data. In this way, event data for an event can be created that is dynamically generated and that includes data about the duration of the event (e.g., a start and end time), the location of the event, people at the event, and objects recognized at the event.

As each new instance of media is clustered with other media from the event, the time period and/or location for determining whether media is within the event boundary can be reset automatically. For example, if the time criterion for the event boundary is 30 minutes, then three images captured 25 minutes apart will all be associated with the event. Further, the time and location criteria can be preset criteria, or can be criteria set by the user (e.g., using a settings screen associated with a media-sharing application).

When the method 800 is performed with multiple users capturing media at the same event and when the media-sharing application is enabled (e.g., when the method 800 is performed by a media-sharing controller), then the further media received at 814 can be media from different users. In certain embodiments, when method act 816 is performed, the event boundary evaluated may be for an event established by a different user. In this way, media from different users at the same event can be aggregated and clustered together. As explained below in Section II.B, this clustered media can then be used to create recipient-specific media albums based on sharing settings set by each user.

Figure 10:
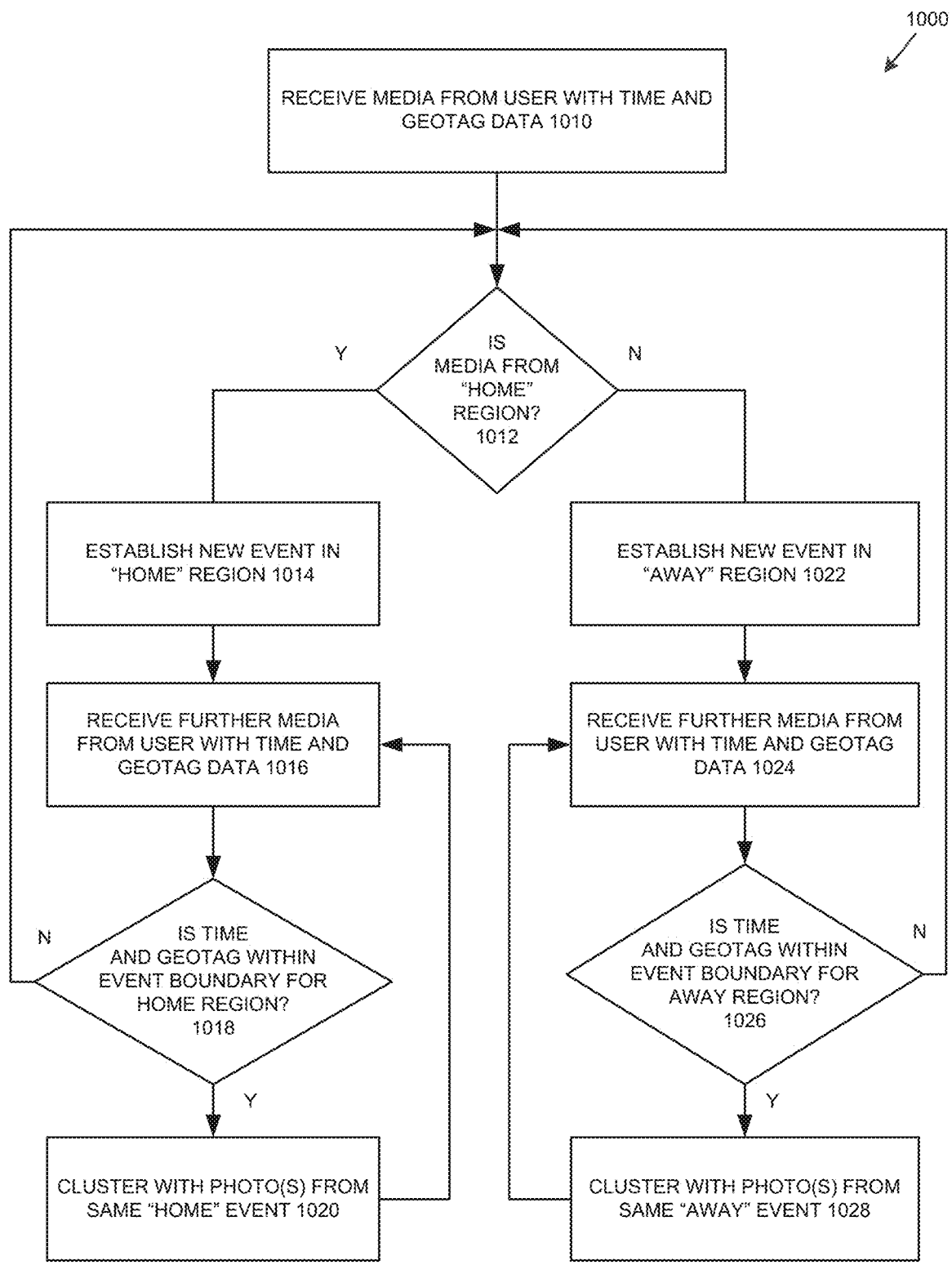
FIG. 10 is a flow chart of another exemplary method for creating event-related clusters of digital media.

FIG. 10 is a flow chart of another exemplary method 1000 for creating event-related clusters of digital media in which the event boundaries are determined at least in part by whether a user is in a home region or outside of the home region (sometimes referred to as the "away region"). For example, the time and location criteria for determining an event can be stricter in a home region than in a region outside of the home region. The exemplary method 1000 can be performed in whole or in part locally at a user's mobile device or can be performed by a remotely located server. Any of the method acts can be performed alone or in any combination or subcombination with one another. Further, the method 1000 can be performed using any of the techniques or features described above with respect to FIG. 8 except as otherwise stated.

At 1010, an instance of digital media is received (e.g., image data, video data, audio data, or other digital media data). In the illustrated embodiment, the instance of digital media includes time and location data (e.g., GPS coordinates).

At 1012, a determination is made as to whether the user is in a home region for the user. For example, the geotag data associated with the media can be analyzed to determine whether the user is in the home region. The boundaries for the home region can be determined using a variety of techniques. For instance, location-based web services (e.g., any of the location-based services described above with respect to FIG. 8) can be used to determine whether the user is in the home region. Or, a user can establish a set of GPS coordinates for his or her home and the home region can be all locations within a certain radial distance from the user's home coordinates (e.g., within 0.1-10 miles or any other distance, which can be predetermined or user selected). In certain embodiments, the home region is set to represent the area where the user typically resides, works, and/or entertains. The home region can be defined, for example, by a so-called "geofence" representing a home region defined by coordinates that correspond to a user's neighborhood, zip code, city, populated region, county, or state. The granularity of the home region can be preset to a default value or set by the user. Further, the granularity of the home region can also depend on the information available and/or the population of the home region (e.g., populated cities can have smaller home regions than less populous rural areas). Still further, the home region can be adaptive. For example, the user's movement patterns can be monitored to determine a home region. For instance, if a user is determined to move between city A and city B for a threshold number of days in a given period of time (e.g., for 10 of 14 days, or any other number of days that can be preset or user determined), then, in certain embodiments, the home region can be automatically expanded to include both city A and city B.

If the media is in the home region, then at 1014 a new event is established for the home region. If the media is not in the home region, then at 1022 a new event is established for the away region. At 1014, and as with the exemplary method 800, supplemental information (e.g., location data, facial recognition data, and the like) can be determined and associated with the event. Further, in certain implementations, the event can be automatically labeled using this information.

At 1016, a further instance of media is received, and at 1018, a determination is made as to whether the further instance of media is associated with the event established at 1014. In an exemplary embodiment, this determination is made based on the time and location data associated with the further media, which is compared against a home region event boundary. The home region event boundary can include time and location criteria as described above in the exemplary method 800.

If the further instance of media is within the event boundary, then at 1020 the further media is clustered with the "home" event established at 1014 and the process continues at 1016 when the next instance of media is received. If the further instance of media is not within the event boundary, then the process returns to 1012.

Returning to 1022, if the media received at 1010 is not in the home region, then at 1022 a new event is established for the away region. At 1022, and as with the exemplary method 800, supplemental information (e.g., location data, facial recognition data, and the like) can be determined and associated with the event. Further, in certain implementations, the event can be automatically labeled using this information.

At 1024, a further instance of media is received, and at 1026, a determination is made as to whether the further instance of media is associated with the event established at 1022. In an exemplary embodiment, this determination is made based on the time and location data associated with the further media, which is compared against an away region event boundary. The away region event boundary can include time and location criteria as described above in the exemplary method 800 but can be different than the event boundary for the home region. For example, in certain embodiments, the away region event boundary is more relaxed than the home region event boundary so that media captured less frequently and at more widely varied locations is grouped as part of the same event. For instance, the time criteria can be 120-1440 minutes (2 hours to 1 day) or any other extended time period. Further, the location criteria can be based on larger location boundaries (e.g., determined using a location-based web service), such as cities, states, or countries, or can be a relatively large distance from the location of the original media for the event (e.g., within 10-200 miles, or any other distance).

In general, the away region criteria are configured to recognize when a user is travelling outside of the home region. In such instances, it is presumed that the user would like the event boundaries to be relaxed because the user is likely travelling for leisure or business, and the media captured during such times are desirably grouped together. Accordingly, in the exemplary embodiment, the event boundaries are designed to cluster more media together.

In certain embodiments, the determination of whether the media is captured in a home region or an away region can be used to determine how the media is shared. For example, a user can select to share media captured outside of a home region with a different or wider group of recipients than media captured inside the home region because it represents media obtained while travelling.

Further, the home and away event boundaries may be set either automatically by a mobile device or manually by the user.

C. Example Sharing Settings and Techniques

Various exemplary embodiments for determining how media captured by one or more users using the disclosed technology are described in this section. Any one or more of the described sharing settings or configurations can be used alone or in combination with one another. For illustrative purposes, embodiments of how media can be shared among users are described in the context of FIG. 7. Recall that at 714 of method 700 in FIG. 7, one or more recipients for the clustered event-related media are determined using media-sharing settings set by one or more users uploading media.

Figure 11:
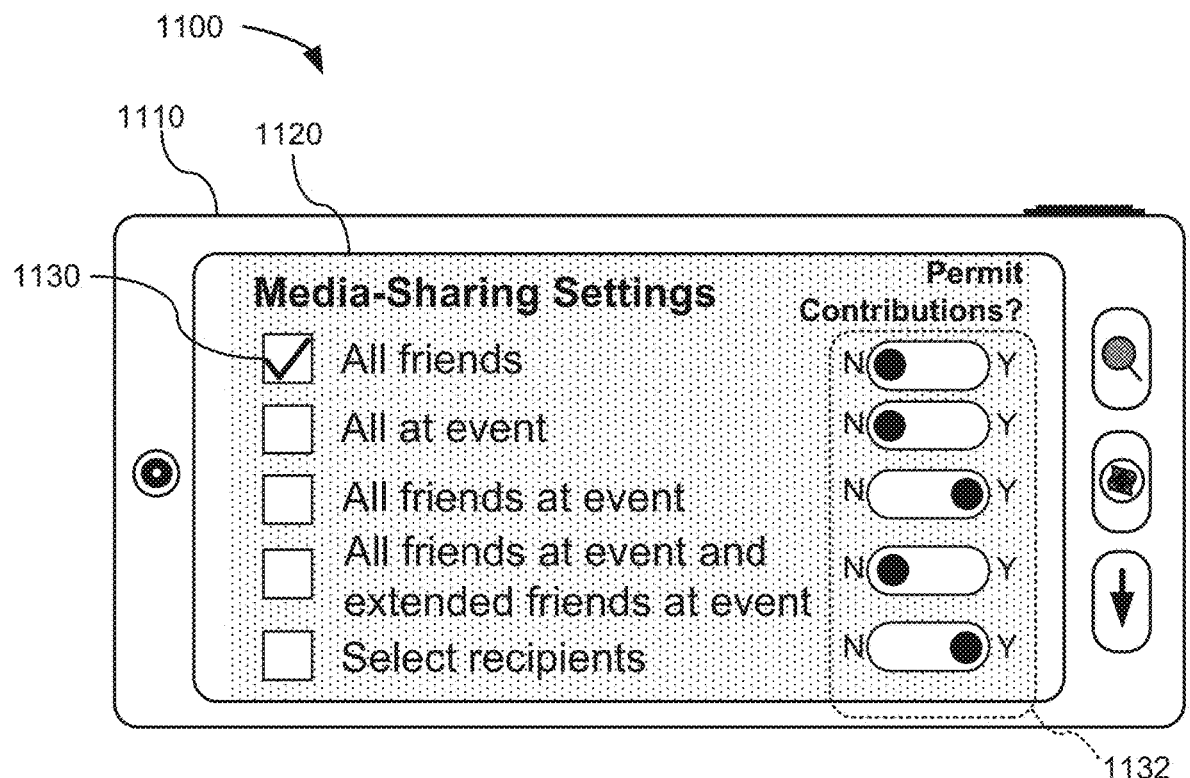
FIG. 11 is a schematic block diagram depicting an exemplary mobile device displaying an exemplary media-sharing settings selection screen.

In the embodiment illustrated in FIG. 7, a number of exemplary sharing settings are illustrated, which can be selected individually or in any combination with one another. In particular, in the illustrated embodiment, one or more of the following sharing settings can be selected: setting 721 for sharing with users uploading media at the same event, setting 722 for sharing with a user's friends, setting 724 for sharing with a user's friends who are at the same event, setting 726 for sharing with a user's friends and extended friends who are at the same event, and setting 728 for sharing with a manually selected list of recipients and/or a manually selected list of contacts form a social network account. In general, the various sharing settings represent a hierarchy of privacy settings that range from sharing media more publicly (e.g., sharing with users uploading media at the same event (setting 721), regardless of whether the other users are known to the user sharing the media) to more private settings (e.g., sharing with a manually selected list of recipients and/or a list from a social network account 728). The media-sharing settings can be selected by a user through a suitable selection screen. For example, FIG. 11 is a schematic block diagram 1100 depicting an exemplary mobile device 1110 displaying an exemplary media-sharing settings selection screen 1120. In the example illustrated, the sharing settings illustrated in FIG. 7 are available for selection by a user, who can select any one or more of the setting by touching the corresponding selector icon (a representative one of which is shown at 1130 for selecting that media be shared with all of the user's friends). Also shown in FIG. 11 are selectors 1132 for selecting whether the media recipients additionally have permission to contribute their own media to the collection (e.g., a comment or supplemental image, video, or audio). If the user sharing media wants strict control over the content of the event collection he or she is creating, the user can elect to not give the recipients permission to further contribute media to the event-related collection of media.

Figure 12:
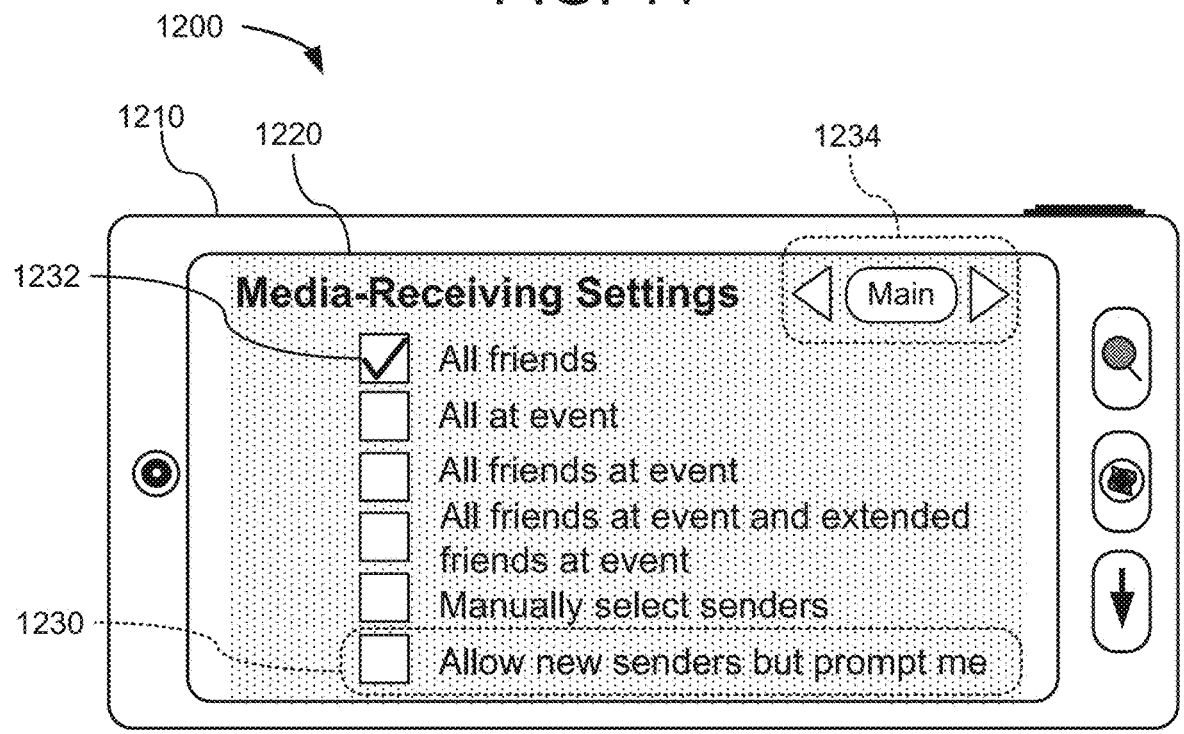
FIG. 12 is a schematic block diagram depicting an exemplary mobile device displaying another exemplary media-receiving settings selection screen.

Media-sharing settings can also be set by a media recipient (e.g., other users at an event or other users known to the media-sharing user) to determine how media shared by others will be received. In general, the sharing settings for receiving media can mirror the settings for sharing media. For example, FIG. 12 is a schematic block diagram 1200 depicting an exemplary mobile device 1210 displaying a media-receiving settings selection screen 1220. In the example illustrated, the sharing settings mostly minor those shown in FIG. 11 but include a setting 1230 that allows for any sender to send media to the user of the device 1210 but creates a prompt for allowing the user to decide whether to receive media from the new user. Any one or more of the settings can be selected by a user by the user touching the corresponding selector icon (a representative one of which is shown at 1232 for selecting that media shared by the user's friends be received). The exemplary media-receiving settings selection screen also includes navigation icons 1234 that can be used to return to a main page for the media-sharing application (not shown), advance to a subsequent page (if available), or return to a previously visited page.

Figure 13:
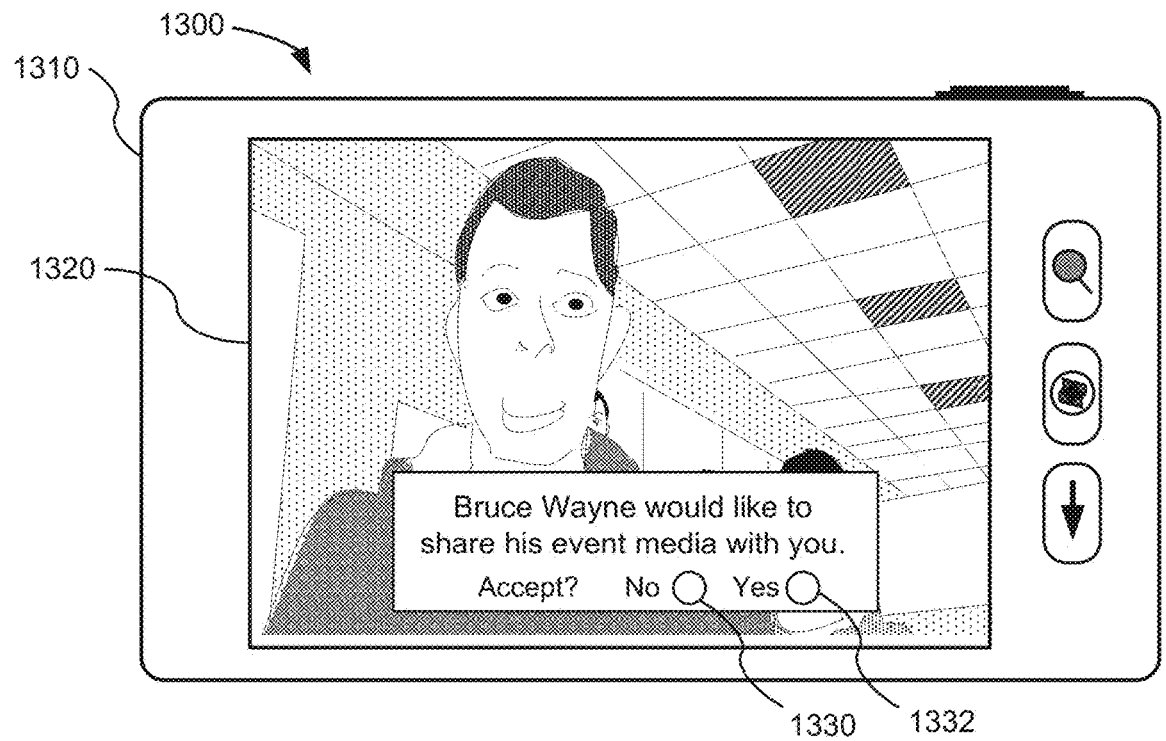
FIG. 13 is a schematic block diagram depicting an exemplary mobile device displaying a media-sharing request screen that can be shown to a user when a setting is selected for requesting that a prompt appear before a new sender is allowed to share his or her media with the recipient.

FIG. 13 is a schematic block diagram 1300 depicting an exemplary mobile device 1310 displaying a media-sharing request screen 1320 that can be shown to a user when the setting 1230 is selected for requesting that a prompt appear before a new sender is allowed to share his or her media with the recipient. In the example illustrated, the screen 1320 prompts a potential recipient of another user's media to determine whether the potential recipient desires to receive media from the other user.

Returning to FIG. 7, the media-sharing settings include setting 721 for sharing the event-related media with others who are also uploading media from the same event to the media-sharing controller 620. With this setting, media is shared with any user uploading from the same event. That is, a user selecting this option will share his or her media with other users, who may be unknown to the user. As an example, if a first user selects this setting and a second user is uploading media from the same event (e.g., as determined by the time and geotag associated with the uploaded media, such as described in connection with method act 816 of FIG. 8), then the second user can be automatically added as a recipient of the first user's media from the event. As explained above, the second user can have the option of not becoming a recipient of the first user's media (e.g., either by being prompted through a media-sharing request screen or by setting an appropriate media-receiving setting).

Figure 14:
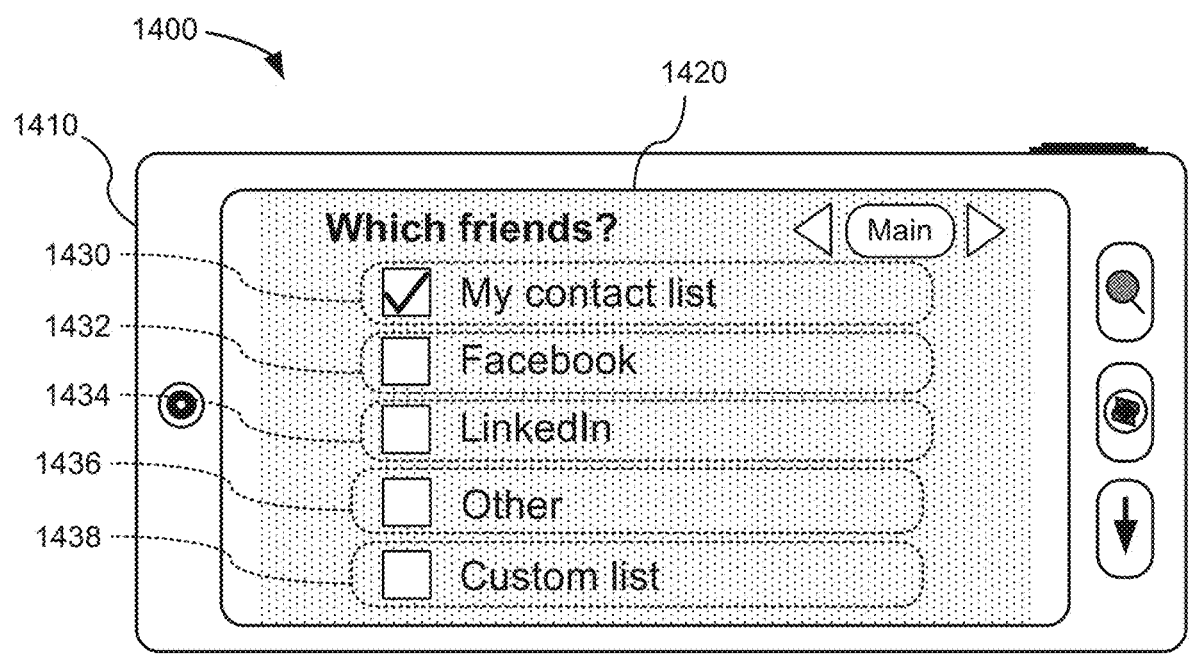
FIG. 14 is a schematic block diagram depicting an exemplary mobile device displaying an exemplary friend-selection screen that can be shown to a user when media is to be shared with friends.

Another exemplary sharing setting from FIG. 7 is setting 722 for sharing media with all friends of a user. For example, the friends of a user can be determined from a contact list stored locally on a user's mobile device or from a list of friends or contacts maintained in a social network database. Using publicly available APIs from social networking websites, for instance, a user's social network account can be accessed and information associated with the user's account can be downloaded and stored. For example, a user's friends list from a social network can be accessed and used to determine which friends of the user the user's event-based media is to be shared with. In certain embodiments, another media-sharing settings screen is provided that allows a user to select which friends are to be selected as recipients when the setting 722 is selected. For example, FIG. 14 is a schematic block diagram 1400 depicting an exemplary mobile device 1410 displaying an exemplary friend-selection screen 1420 that can be shown to a user when media is to be shared with friends (e.g., when using one or more of settings 722, 724, or 726). In the example illustrated, the screen 1420 allows the user to select one or more sources for determining the friends to send the media to, including selection 1430 to use the user's contact list on his or her mobile device; selections 1432 and 1434 for selecting friends from respective social media accounts (e.g., Facebook or LinkedIn), whose friends lists can be accessed using publicly available APIs or other social network interfaces; selection 1436 for selecting friends from another social network website or other source (e.g., files stored on a remote server or stored locally), whose location can be manually entered when this option is selected; and selection 1438 for creating a customized list of friends (e.g., a manually selected list). In certain embodiments, the friends selected by the friend-selection screen 1420 can be separately and independently set for each event. Further, in particular embodiments, the friend-selection settings are applied globally to all event-based media collections made by a user but can optionally be set to customized settings. In certain embodiments, when a social network account is used to provide friend information, additional information can be provided by the user identifying which list of contacts to use if multiple lists are available (e.g., a family list, a business contact list, and so on). By allowing the user to select the friends to which the event-based media is sent and by leveraging the available information from social networking websites, embodiments of the disclosed technology allow the user to quickly, simply, and automatically share life events with friends and colleagues.

Figure 15:
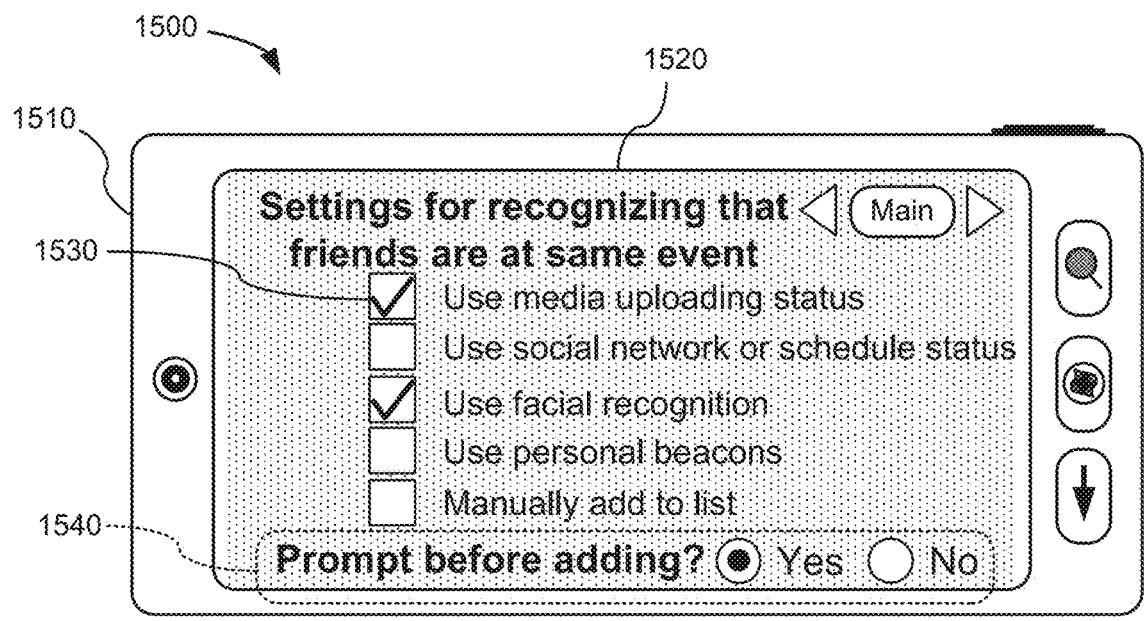
FIG. 15 is a schematic block diagram depicting an exemplary mobile device displaying an exemplary friend-recognition-selection screen.

Another exemplary setting from FIG. 7 is setting 724 for sharing media with all friends at the same event. Setting 724 is similar to setting 722 but further limits the group of friends to only those who are at the same event as the user. There are a variety of techniques that can be used to determine whether a friend is at the same event as the user, any one or more of which can be used in embodiments of the disclosed technology. For example, as illustrated in FIG. 7, the techniques that can possibly be used include one or more of setting 730 for sharing media with friends uploading media at the same event; setting 732 for sharing media with friends at the same event as indicated by social network or schedule data; setting 734 for sharing media with friends at the same event as indicated by facial recognition; setting 736 for sharing media with friends at the same event as recognized by personal beacon information transmitted from a friend's mobile device; and setting 738 for sharing media with a friend manually added to the recipient list. Any one or more of these settings can be set by default. In certain embodiments, any one or more of these settings can be selected by a user through a suitable setting screen. For example, FIG. 15 is a schematic block diagram 1500 depicting an exemplary mobile device 1510 displaying an exemplary friend-recognition-selection screen 1520. In the example illustrated, the sharing settings 730-738 illustrated in FIG. 7 are available for selection by a user, who can select any one or more of the setting by touching the corresponding selector icon (a representative one of which is shown at 1530 for selecting that media be shared with friends at the same event who are also uploading media from the event). The exemplary friend-recognition-selection screen also includes selector icons 1540 for selecting whether a user is to be prompted each time a new friend at the event is recognized in order to determine whether the friend is to be added to the recipient list. For example, when the user selects to be prompted before adding a new recipient, a confirmation screen can be displayed to the user when new friends at the event are recognized.

Figure 16:
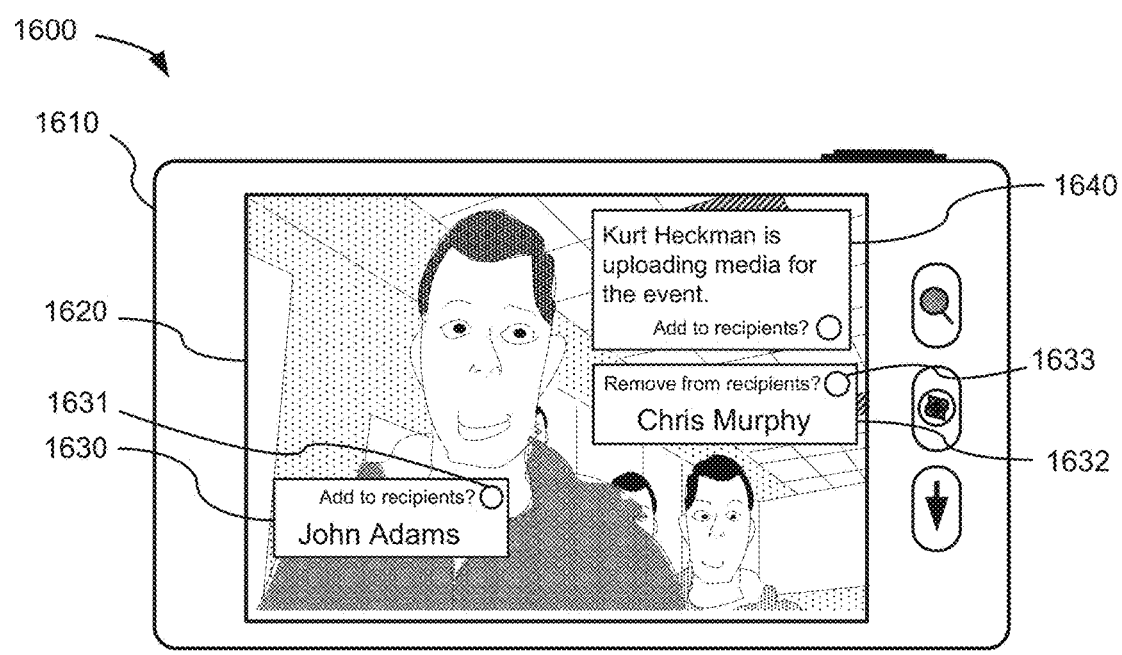
FIG. 16 is a schematic block diagram depicting an exemplary mobile device displaying an exemplary confirmation screen for confirming recipients of a user's collection of digital media.

For example, FIG. 16 is a schematic block diagram 1600 depicting an exemplary mobile device 1610 displaying an exemplary confirmation screen 1620. In the example illustrated, an image of two friends has just been captured and their faces are recognized after application of a suitable facial recognition technique (e.g., any of the facial recognition techniques described above). A first friend ("John Adams") is currently not a recipient of the user's media from the event. Accordingly, a recipient confirmation prompt 1630 is displayed to the user. The user can then confirm the addition of John Adams to the recipient list by selecting the addition confirmation icon 1631. A second friend ("Chris Murphy") is already a recipient of the user's media from the event. In the illustrated embodiment, another recipient confirmation prompt 1632 is displayed to the user asking whether the identified friend is to be removed from the recipient list. The user can then request that Chris Murphy be removed from the recipient list by selecting the removal confirmation icon 1633. In the illustrated embodiment, a prompt 1640 is also displayed indicating that a recognized friend is uploading media to the same event and requesting the user to choose whether or not to add the friend to the recipient list. These prompts can be produced as a result of the user selecting to share with other friends uploading media to the same event (as shown by selection icon 1530), selecting to share with friends recognized by facial recognition, and also selecting to be prompted before recipients are added (as shown by selection option 1540). Additional details concerning embodiments of the settings 730-738 will now be described.

Referring again to FIG. 7, setting 730 is for sharing media with friends who are uploading media at the same event. For instance, the media received by a media-sharing controller (e.g., implemented by a server) can include information about the identity of the user uploading the media, the location at which the media was generated, and the time at which the media was generated. The identity information can then be used to match media received by the server with a user's friends list (e.g., a list determined by friend-selection screen 1420) and the location and/or time information can be used to determine whether the media was from the same event (e.g., as described above at method act 816 of FIG. 8).

Setting 732 is for sharing media with friends at the same event as indicated by social network or schedule data. For example, certain social networks include mechanisms by which users can indicate their current location (e.g., by "checking in" to a location, or by being automatically detected as being at a particular location). This information can be broadcast to other friends or can be made available from the user's home page on the social network. Embodiments of the disclosed technology use this social network metadata to determine whether a friend of a user is at the same event as the user (e.g., by accessing each friend's social network account and/or by accessing the user's social network account to look for location updates sent from his or her friends). Further, many users maintain a calendar or schedule that can be shared with other users (e.g., a Microsoft Outlook calendar) using an appropriate API or other interface mechanism. In certain embodiments of the disclosed technology, the calendar and schedule for a friend of a user can be accessed and evaluated to determine whether the friend is at the same event as the user.

Setting 734 is for sharing media with friends at the same event as indicated using facial recognition. For example, in certain embodiments, when this setting is selected, media will only be shared with friends who are recognized in the images captured by a user at a particular event. For instance, if a user captures a photo of friend A and friend B at a birthday party, and if friend A and B are recognized using facial recognition techniques (e.g., any of the facial recognition techniques described above or otherwise known), then friends A and B can be automatically added as recipients of media captured by the user for the event. In certain embodiments, facial recognition information available from one or more social network databases can be used as part of the facial recognition process. For example, using publicly available APIs from social networking websites, a user's or friend's social network account can be accessed and information associated with the user's or friend's account used to help perform facial recognition. For example, tagged photos in one or more photo albums stored with the user's account can be used as reference images for the facial recognition process, or a friend's profile photo can be used as a reference image for the facial recognition process. Further, information stored locally on the mobile device can be used as part of the facial recognition process. For example, a user's local image library may include tagged photos or other metadata identifying friends. Facial recognition can be performed using this data in addition to social network data or exclusively.

Figure 17:
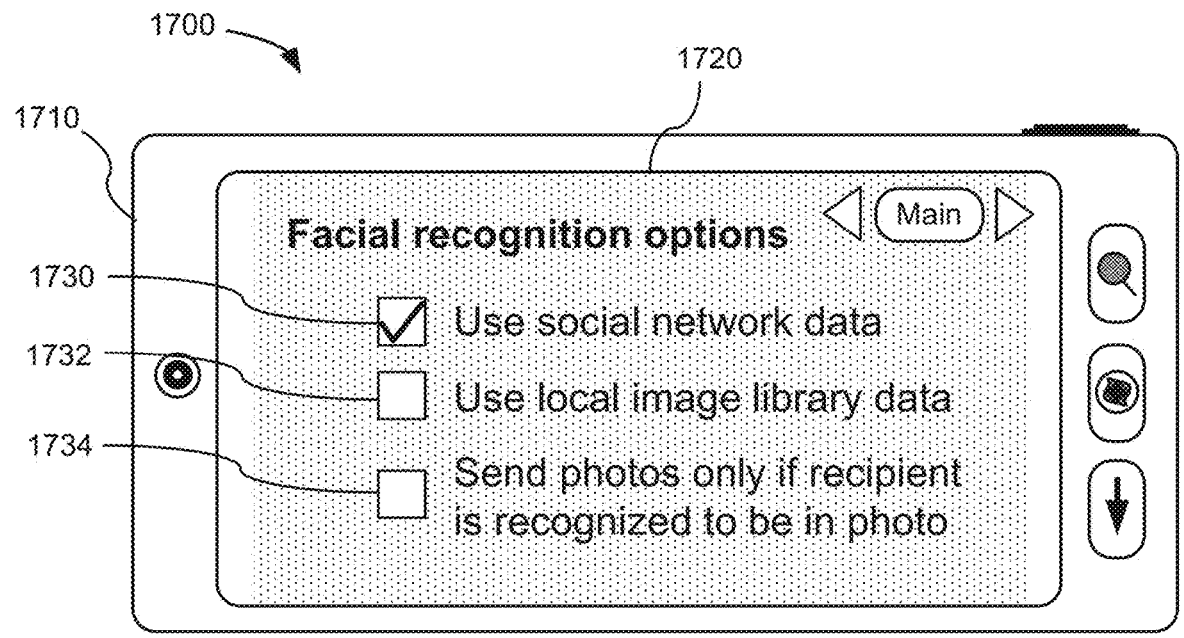
FIG. 17 is a schematic block diagram depicting an exemplary mobile device displaying an exemplary facial-recognition settings selection screen that can be shown to a user when facial recognition is used to help identify recipients.

In certain implementations, the user can select how facial recognition is performed. FIG. 17 is a schematic block diagram 1700 depicting an exemplary mobile device 1710 displaying an exemplary facial-recognition settings selection screen 1720 that can be shown to a user when facial recognition is used to help identify recipients. In the example illustrated, the screen 1720 allows the user to select how facial recognition is to be used. For example, the screen 1720 includes selection icon 1730 for selecting to use facial recognition information from one or more social networks (which can be specifically selected in a further screen) and selection icon 1732 for selecting that local data stored on the mobile device be used for facial recognition. Screen 1720 further includes a selection icon 1734 for indicating that media is to be shared only with those recognized in an image. Using this setting, a further criterion for clustering media is created and media will be shared only with individuals recognized as being in the image, thus creating a highly personalized collection for the recipient.

Setting 736 is for sharing media with one or more friends at the same event who are recognized by virtue of a short-range beacon transmitted from the friends' devices. For example, using Bluetooth, a Wi-Fi signal, or another short-range signal generated and transmitted by a mobile device and identifying the owner or user of the device, it can be determined that one or more friends are in the vicinity of a user. Furthermore, because this determination is made device-to-device (and not based on information provided by the Internet or by a wider-area communications network) this determination can be made without relying on the communication network 204. Thus, if a user is in an area with no network coverage, friends can still be recognized. Similarly, short-range transmissions can be used to share the media captured by a user. In other words, an ad-hoc network can be created locally by a user with nearby friends that is used to share media and does not use a server or other larger network. In particular embodiments, the first user to establish an event can assume the role of the media-sharing controller and perform the operations typically performed by the media-sharing controller.

Setting 738 is for allowing the user to manually add one or more recipients to a list of friends at the event. For example, this setting can be used to individually add friends or others to the list of recipients for the event.

Returning to settings 721-728 of FIG. 7, setting 726 is for sharing media with friends and extended friends at same event. This setting is similar to setting 724 but allows a user's media to be further shared with the friends of a user's friends. In other words, using this setting, the media is shared not only with a user's friends (according to one or more of the settings 730-736) but also with those individuals that are identified by the user's friends as also being authorized to receive the media (e.g., according to one or more of the settings 730-736 selected by each respective friend). This "friends of friends" setting allows the media to be shared with a greater group of people, but may include some individuals that are not directly known by the user.

Figure 18:
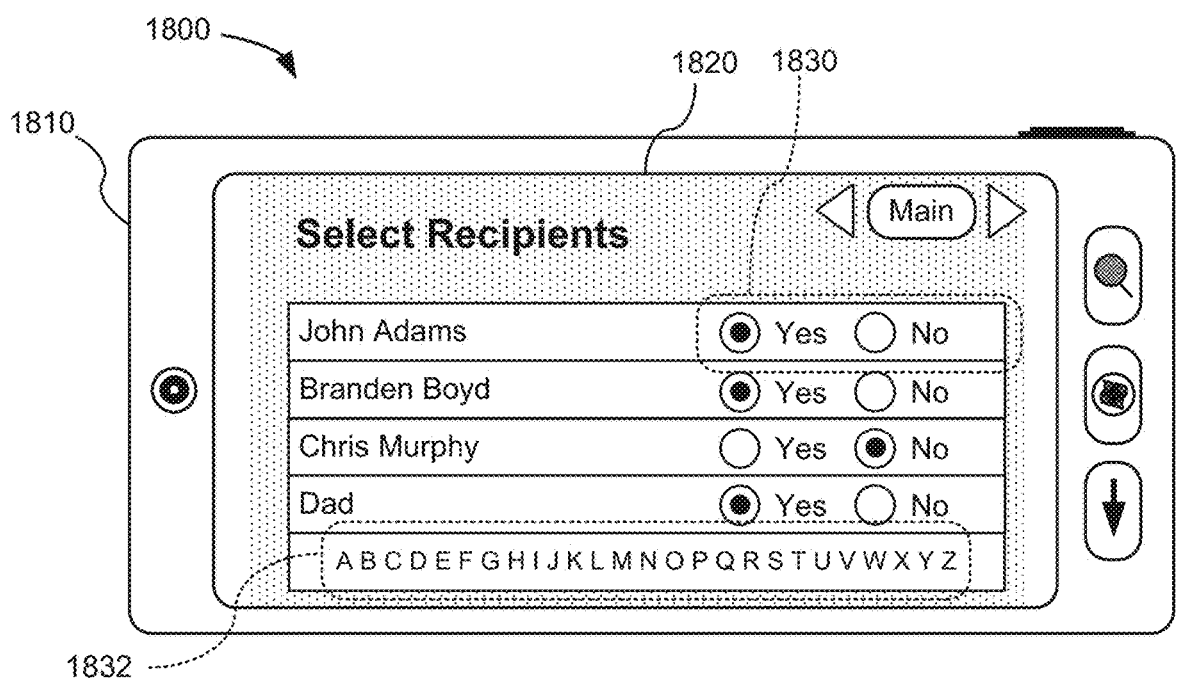
FIG. 18 is a schematic block diagram depicting an exemplary mobile device displaying an exemplary recipient selection screen that can be displayed to a user and used to manually select recipients.

Setting 728 is for sharing media with a manually selected group of recipients. For example, the user can individually input recipients or select recipients from the user's contact list or from a list of friends obtained from one or more social network accounts. For instance, FIG. 18 is a schematic block diagram 1800 depicting an exemplary mobile device 1810 displaying an exemplary recipient selection screen 1820 that can be displayed to a user and used to manually select recipients. In the example illustrated, the screen 1820 allows the user to select one or more individuals from a list (e.g., the locally stored contact list or list of friends or colleagues from a social network database) as recipients. For instance, each individual on the list can include selector icons (e.g., as shown at 1830) for adding the individual to the list. The list can be scrolled through using appropriate touchscreen buttons (such as icon 1832 showing alphabetical characters that can be selected for quickly finding a desired contact) or by recognizing a swiping motion from the user that advances the list alphabetically. Once a recipient list is created, it can be separately displayed to the user (that is, in the absence of the other names in a contact list or friends list) and can include icons next to each recipient for selecting whether to remove the recipient from the list.

Additionally, in certain embodiments of the automatic media sharing techniques, the user is also included as a recipient of the event collection. That is, the user can be automatically included as one of the recipients of the media collection that is generated by the media clustering, curating, and arranging capabilities of the disclosed technology.

It should be understood that a user may also elect not to share media with any other person. For example, a user may wish to use the clustering capabilities of the disclosed technology in order to automatically organize, curate, and/or arrange media into an event collection without sharing the media with any other person. Further, in certain embodiments, the user may elect to create an event collection that he or she can later supplement with further data and edit as he or she desires. Once the event collection is adapted to the user's satisfaction, the collection can then be transmitted or made available to a selected group of friends (e.g., using any of the sharing settings described above). Thus, rather than the media being shared substantially simultaneously with media creation, the media is shared later after viewing and editing by a user.

Figure 27:
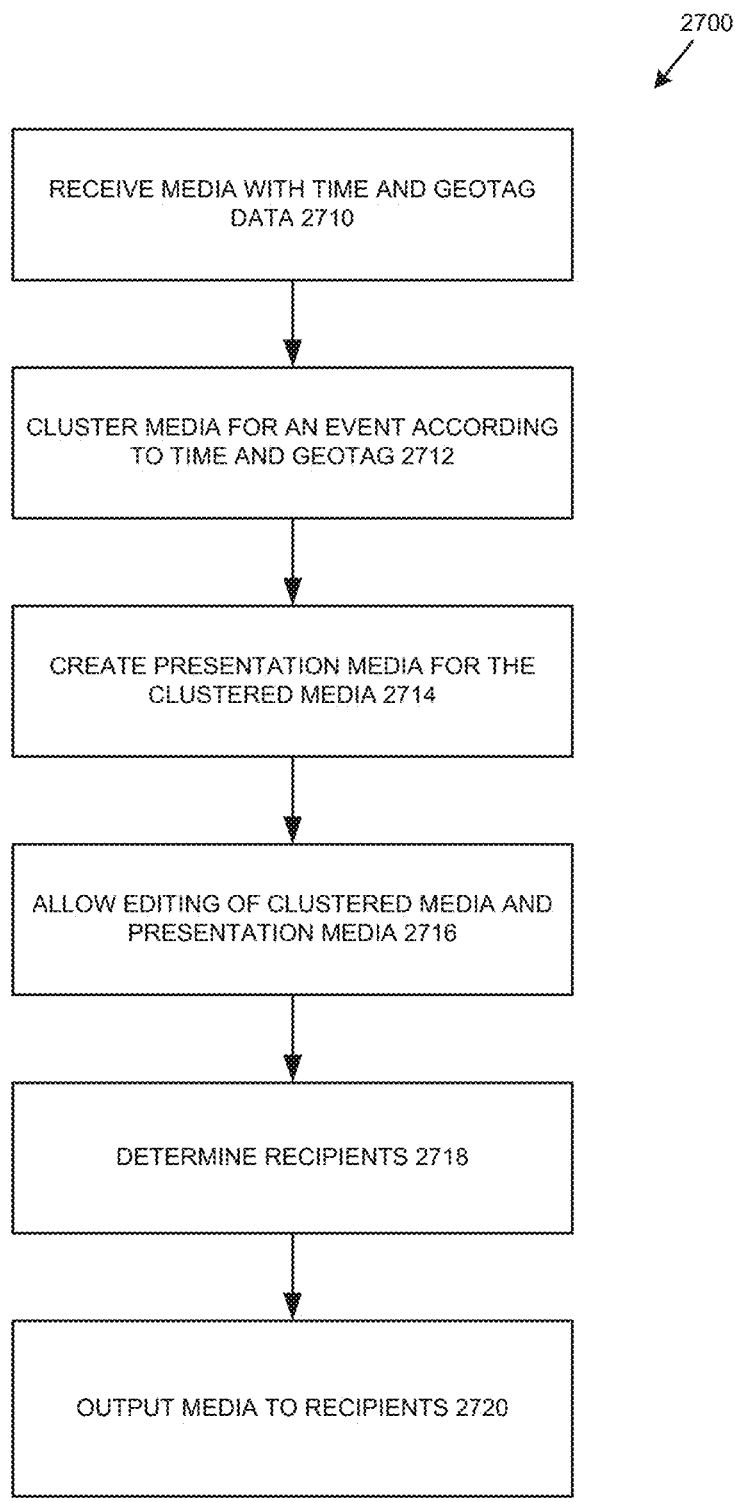
FIG. 27 is a flow chart of another exemplary method for performing media sharing where the collection of media for the event is first generated and viewed by a user before it is shared with others.

FIG. 27 is a flow chart of another exemplary method 2700 for performing media sharing where the collection of media for the event is first generated and viewed by a user (referred to in the discussion below as the "primary user") before it is shared with others. The exemplary method 2700 can be performed by a media-sharing controller, which can be implemented in whole or in part locally at a user's mobile device or by a remotely located server. Any of the method acts can be performed alone or in any combination or subcombination with one another. Further, unless stated otherwise, method acts similar to those described above with respect to FIG. 7 can be performed in any of the manners described in connection with FIG. 7

At 2710, one or more instances of digital media are received. As with FIG. 7, the media can be image data, video data, audio data, or other digital media data, and can be associated with a time and location data. The one or more instances of digital media can be received only from the primary user's device, or, in certain embodiments, can be from a plurality of users (e.g., users executing a common media-sharing application).

At 2712, the received media is clustered by event. Exemplary embodiments for evaluating and clustering media by event include those described above in Section II.B. Further, in embodiments in which the digital media received at 2710 includes media from a plurality of users, the sharing settings of the media can be evaluated to determine whether the primary user has permission to view and share the media with any other user.

At 2714, playback data is generated for the clustered media for an event. In certain embodiments, the playback data includes one or more of data indicating titles for the video, image, or audio data; data indicating an order of the media; data indicating a slideshow speed; data indicating commentary associated with the video, image, or audio data; data about how and where to display commentary; data indicating a font selection and appearance; data about background colors and shapes; data about music; thematic data; and/or other such presentation data. Exemplary embodiments for generating suitable media playback experiences are discussed below in Section II.D.

At 2716, the primary user is allowed to view the playback experience created by the clustered media and the playback data and to edit or modify the data as desired. For example, the playback experience generated at 2714 can be displayed to the user, who can then select to pause the playback at any time and make edits to the media (e.g., by changing the commentary or titles that are presented with the media, by changing the font or theme, by changing the music, by changing the playback speed or transition animations between media (if any)). The user can signal such changes through a variety of mechanisms (e.g., pull down menus, sensing the user double-tapping the portion of the screen that the user desires to edit and presenting the user with change options or a touch screen keyboard for inputting the changes, and other such interfaces). The editing process can also allow for the user to add new media to the collection or add new presentation data. The editing process can also be performed by displaying to the user all or a portion of the collection of media as a series of thumbnail images, each representing an instance of media in the collection, which can then be individually selected for editing. Once the desired edits are made to the collection of media, the changes can be saved.

At 2718, one or more recipients for the edited version of the clustered media and presentation data are determined. For example, the recipients can be determined from media-sharing settings set by the primary user or can be manually by the primary user. Exemplary media-sharing settings that can be used are illustrated in FIG. 7 and described above.

At 2720, the edited versions of the clustered media and presentation data are output (e.g., transmitted to the one or more selected recipients, transmitted to a website that allows the selected recipients to access and view the playback experience, or otherwise made available for access and viewing). The information output at 2720 can include the modified playback data and data for representing the modified collection of media (e.g., a suitable compressed or uncompressed media file) as well as data for identifying the recipients and other supplemental metadata (e.g., tags or additional information for supplementing the media). In other embodiments, a single media playback file for the collection of media can be generated for the collection of media (e.g., a video file that presents the playback experience) and output at 2720. The data output at 2720 can be transmitted to the recipient, or can be made available for viewing by the recipients (e.g., at a web site associated with the media-sharing application, at a user's social network website, or via a media-sharing application that the recipient can run on their computing device). For instance, a file for presenting the playback experience can be posted to the primary user's social network web page (e.g., by using an appropriate API for the social network). A notification that the collection is ready for viewing or that the collection has been updated (e.g., when a new instance of media is added or when a new comment is added) can be sent to the authorized recipients.

Figure 19:
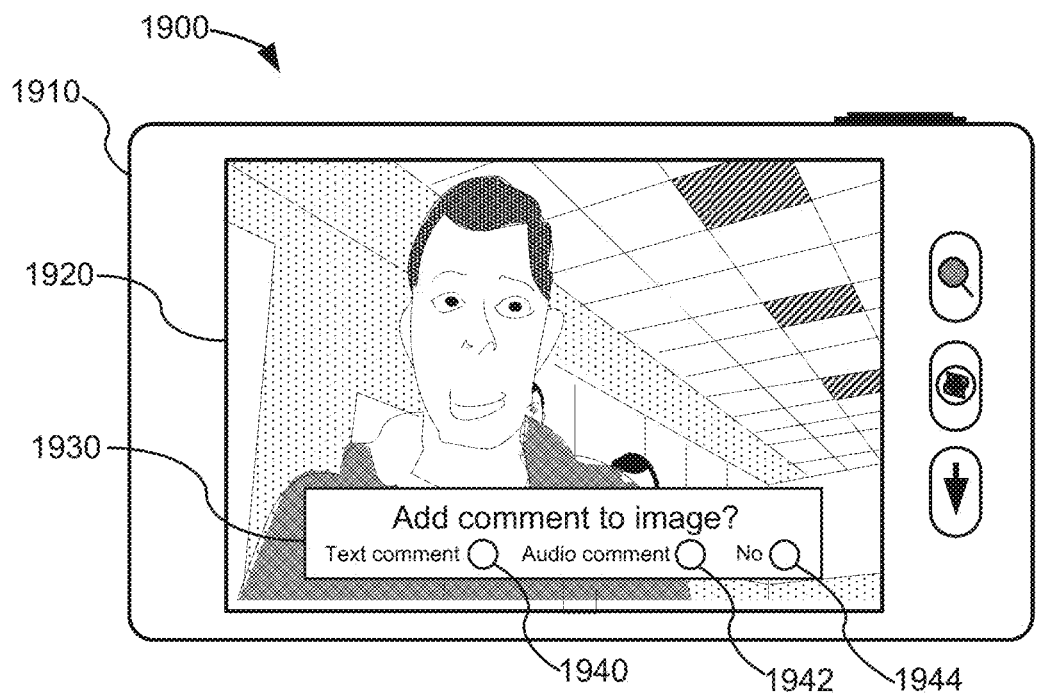
FIG. 19 is a schematic block diagram depicting an exemplary mobile device displaying an exemplary comment request screen.

Further, for any of the embodiments disclosed herein, whenever media is captured or viewed by a recipient, the user or recipient can be given the option of supplementing the media with a comment or other supplemental data. Recipients can be given permission to contribute supplemental data by a user selecting to grant such permissions (e.g., using selectors 1132). When permission is granted, a user or recipient can add a text comment, an audio comment, or other such supplemental media data to the media. For instance, FIG. 19 is a schematic block diagram 1900 depicting an exemplary mobile device 1910 displaying an exemplary comment request screen 1920. In the example illustrated, the screen 1920 appears shortly after an image or video is captured and associated with an event. The screen 1920 includes a prompt 1930 requesting whether the user would like to add a comment. The screen 1920 can disappear after a short period of time (e.g., 3-20 seconds) with no comment unless the user elects one. In the illustrated embodiment, the user can supplement the image with a text comment (by selecting icon 1930), an audio comment (by selecting icon 1932), or no comment (by selecting icon 1934).

Figure 20:
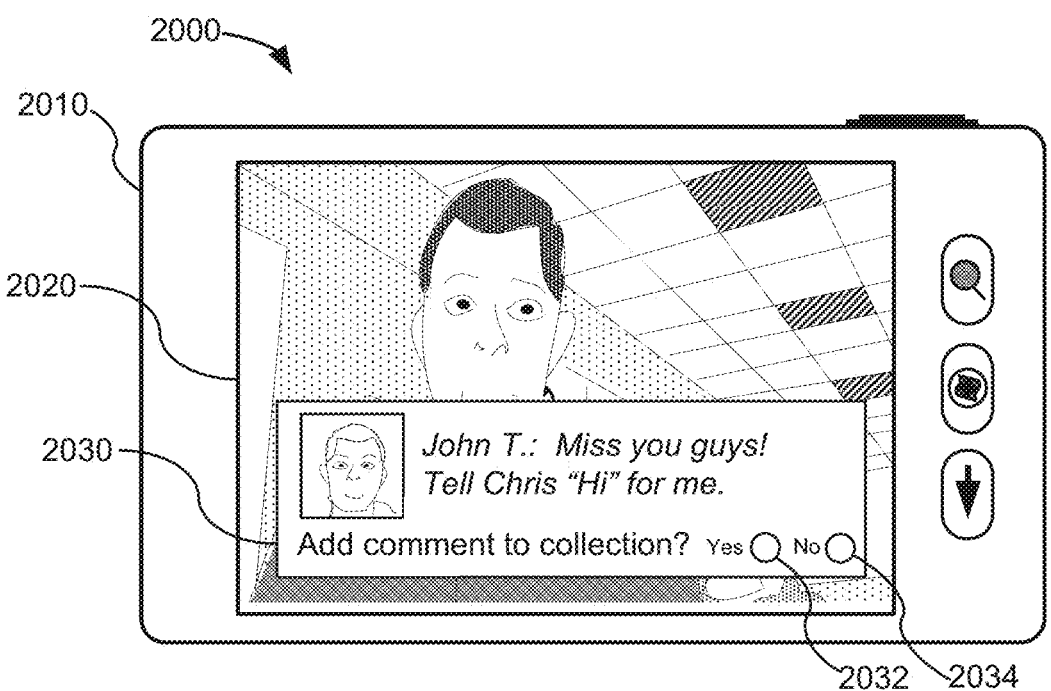
FIG. 20 is a schematic block diagram depicting an exemplary mobile device displaying an exemplary comment acceptance screen.

When a comment or other supplemental data is added, the comment can be automatically added to the collection of media for the event and included as part of the playback experience. In other embodiments, a comment that is added by a recipient can be first sent to the user who created the media, who can then choose to add the comment to the collection of media and to the playback experience (e.g., through a suitable comment approval screen). For instance, FIG. 20 is a schematic block diagram 2000 depicting an exemplary mobile device 2010 displaying an exemplary comment acceptance screen 2020. In the example illustrated, the screen 2020 appears to a user who created a shared instance of media (here, a photo of a subject in a room) after another user has commented on the media (here, a friend named "John T."). The screen 2020 can appear shortly after a user views the image and adds his comment. The screen 2020 displays the media that the comment was added to as well as a box 2030 showing the comment along with an identification of who made the comment. As illustrated, the box 2030 can also include a thumbnail image of the person making the comment. The box 2030 further includes a prompt requesting whether the comment is to be added to the collection of media of event and shared as with the other media. In the illustrated embodiment, the user can select either the "yes" icon 2032 or the "no" icon 2034 as desired. In this way, comments can be previewed and manually selected for insertion into the media collection and playback experience. In further embodiments, a comment that is added by another user is sent only to the user who created the media (and possibly included in the collection of media for that user) but is not sent to other users.

In embodiments in which the playback experience for the collection of media is presented through a social network, the comments provided by the recipients can be recorded through the social network website and stored on a social network server. For example, the comments to a media collection posted by a primary user can be posted on the primary user's social network web page. The comments can be retrieved (e.g., through the use of a suitable API with the social network) and potentially added to the collection of media or to the presentation data. In particular implementations, for example, the social network account can be periodically accessed and searched for new comments related to the playback experience. If new comments related to the playback experience are identified, they can then be downloaded or otherwise retrieved from the social network server and incorporated into the playback experience (e.g., automatically or after user approval). In some implementations, the social network server is configured to send out a notification that a new comment has been received. In such instances, this notification can be used to trigger a process that accesses the social network server and retrieves the new comment. This process can be performed by a user's mobile device (e.g., in conjunction with a social network application that alerts the user of new comments) or by a server (e.g., acting as a proxy for the user). In this fashion, comments posted on a social network related to a shared playback experience can be monitored and used for updating the experience.

As noted, in certain embodiments, a user who generates an instance of media can also select who has permission to contribute supplemental data associated with the instance of media (e.g., a comment). The settings for granting friends or recipients permission to add content or commentary to the media can be set by the user sharing the media and can include any of the recipients described above (e.g., by a user using selectors 1132 illustrated in FIG. 11 or other such selectors). For example, permission for adding media can be granted to recipients of the media who are found to be related to the event (e.g., by user name, social network name, or by facial recognition), friends who were at the event (as determined by any of the criteria described above for identifying friends at the same event), and/or any friend of the user with whom media is shared (as determined by any of the criteria described above).

As friends make additions to the collection, the additions can be monitored by the media-sharing controller (e.g., a media-sharing server). The media-sharing controller can update other copies of the collection of media (or notify the recipients of the collection of media that the collection has been updated) as each new update is received from recipients with permission to update the media or from the original creator of the collection. For example, when the collection of media has been updated, an audio/visual indication on a tile or other graphical element can be displayed to a user of a mobile device or computer indicating that the playback has changed.

Figure 28:
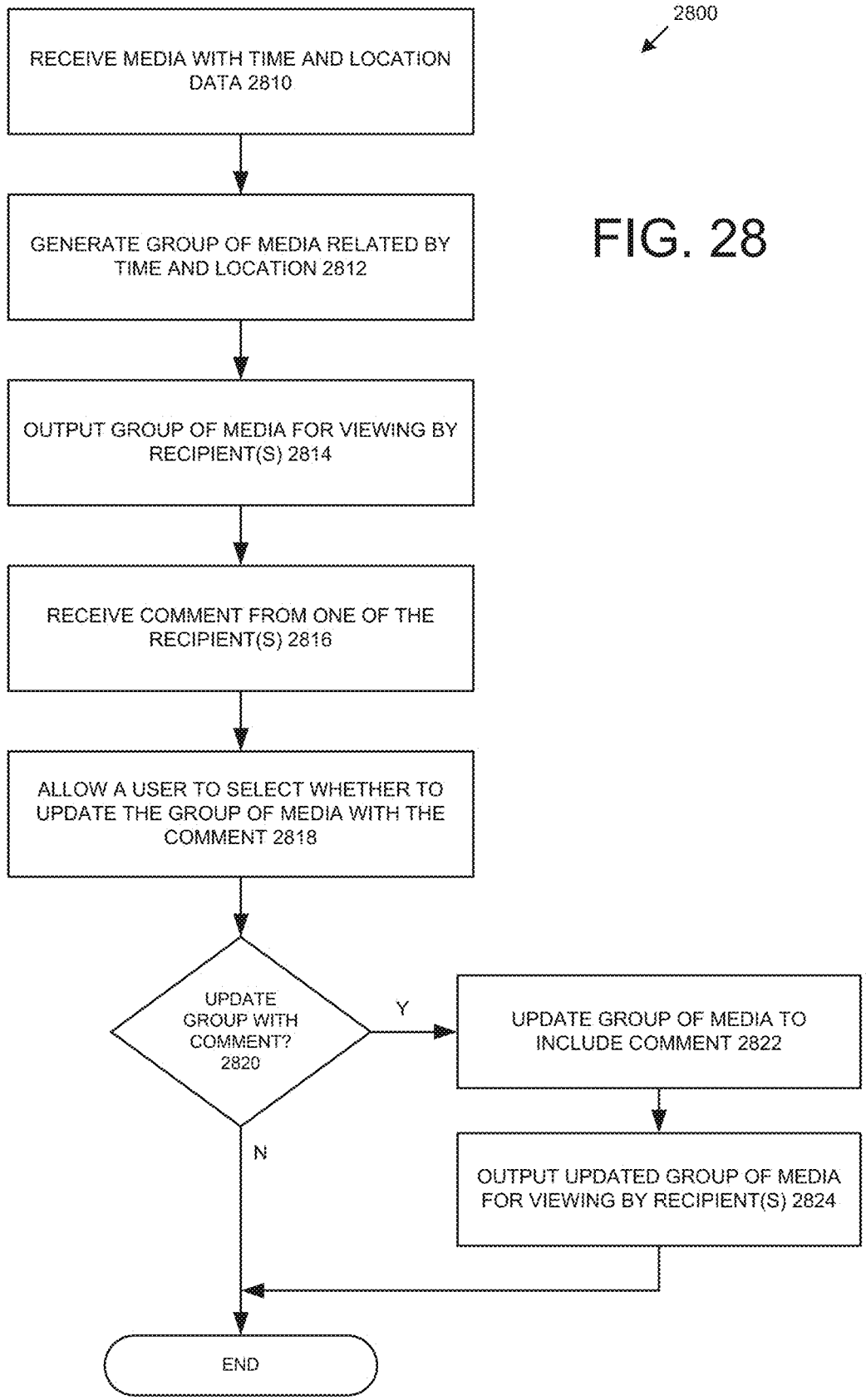
FIG. 28 is a flow chart of an exemplary method for updating media to include comments or other supplemental media from recipients of an original collection of media.

FIG. 28 is a flow chart of an exemplary method 2800 for updating media to include comments or other supplemental media from recipients of an original collection of media. The exemplary method 2800 can be performed by a media-sharing controller, which can be implemented in whole or in part locally at a user's mobile device or by a remotely located server. Any of the method acts can be performed alone or in any combination or subcombination with one another. Further, unless stated otherwise, method acts similar to those described above with respect to FIG. 7 can be performed in any of the manners described in connection with FIG. 7

At 2810, one or more instances of digital media are received. The media can be image data, video data, audio data, or other digital media data, and can be associated with a time and location data. The one or more instances of digital media can be received from a single user or from a plurality of users (e.g., users executing a common media-sharing application).

At 2812, a group of digital media related by time and location is generated from the received instances of digital media. For example, any of the automatic clustering techniques described above can be used.

At 2814, the group of digital media is output such that one or more recipients are able to view a presentation of the group of digital media. For example, the group of digital media can be transmitted to the one or more recipients, transmitted to a website that allows the recipients to access and view the playback experience, or otherwise made available for access and viewing. In certain embodiments, the one or more recipients are determined from one or more media-sharing settings set by the user (e.g., using any one or more of the media-sharing settings described herein). Furthermore, the group of digital media output can be accompanied by data indicating which of the recipients has permission to supplement the media with a comment or other supplemental data.

At 2816, a comment is received from one of the one or more recipients, where the comment is associated with and responsive to one of the instances of the digital media in the group of digital media. As explained above, the comment can be transmitted from the commenting recipient to the media-sharing controller or can be accessed from a social network account.

At 2818, a user is allowed to view the comment and to indicate whether to update the group of digital media with the comment. For example, the comment can be displayed to the user who generated media along with a copy of the media and a request for the user to select whether to add the comment or not (e.g., using a suitable comment approval screen, such as screen 2020 in FIG. 20).

At 2820, the user's response is received and, if the user selects to add the comment, the group of digital media and the playback data are updated at 2822 to incorporate the comment and the updated data is output at 2824. Otherwise, the group of digital media and the playback data remain unmodified.

At 2822, the group of digital media can be updated so that the comment is presented as an overlay to the associated instance of media. Further, in some embodiments, the instance of media can first be displayed without the comment and then with the comment. An example of an instance of image media that includes a comment is shown in screen 2420 of FIG. 24.

At 2824, the updated data can be output by outputting an entire representation of the group of digital media (together with any presentation data or supplemental data) or by outputting a representation of the new material that is then used to update the group of data previously received by the recipients. When the recipient views the group of data, they can elect to view only new data since the last time the group of data was viewed.

Further embodiments and variations of how commentary can be introduced and displayed as part of the playback experience are described below in Section III.D.

Figure 21A:
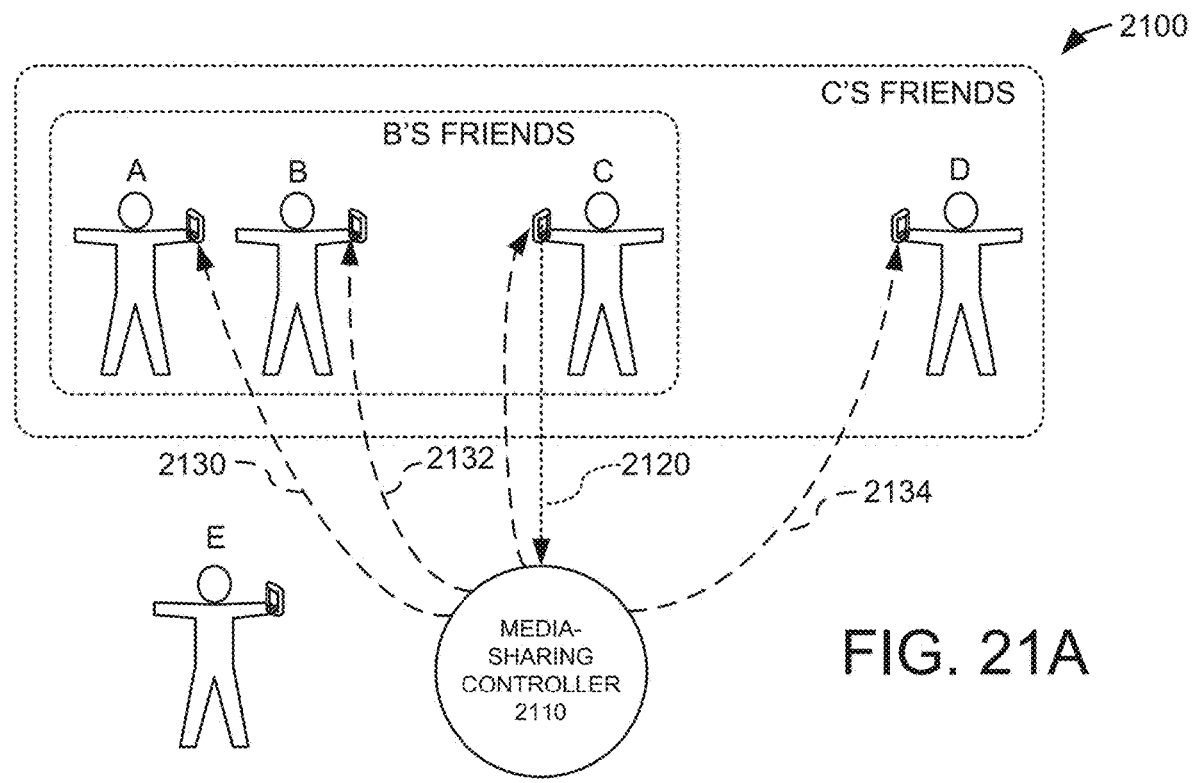
FIGS. 21A and 21B illustrate the sharing of media when two different users take a picture or capture video at the event in one example scenario.
Figure 21B:
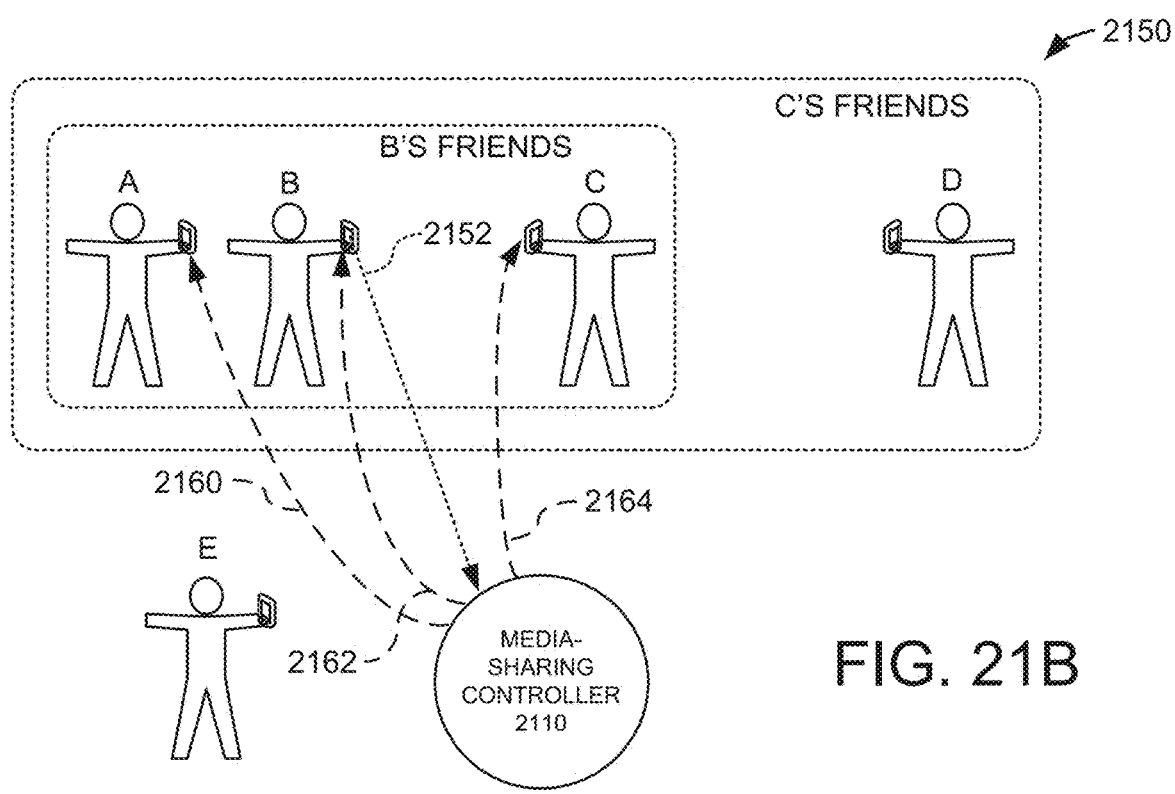

Using implementations of the sharing techniques described in this section in connection with the media-sharing method 700 shown in FIG. 7, media collections can be created (e.g., at 716 of FIG. 7) that are shared among multiple users but that also respect and conform to the media-sharing settings established by each user. As a result, the media collection generated at 716 of FIG. 7 for a first user may be different than the media collection generated for a second user, even though both the first user and the second user have indicated they wish to share media with one another. For example, FIGS. 21A and 21B are schematic block diagrams 2100 and 2150 illustrating two exemplary sharing and event-related clustering scenarios according to the disclosed technology. In both FIGS. 21A and 21B, users A-E are all assumed to be at the same event, and user C has selected to share his event-related media with friends A, B, and D, whereas user B has selected to share his event-related media with friends A and C (but not user D).

FIG. 21A illustrates the sharing of media when user C takes a picture or captures video at the event. The captured media is sent to the media-sharing controller 2110 (as shown by first dashed line 2120). The media-sharing controller 2110 can be implemented by a remote media-sharing server or locally by the mobile device operated by user C (or distributively among the mobile devices operated by the user C and a remote server). The media-sharing controller performs an embodiment of the disclosed media sharing techniques (e.g., an embodiment of method 700) and includes the user C media as part of the collection for each of friends A, B, and D (as shown by dashed lines 2130, 2132, 2134).

FIG. 21B, by contrast, illustrates the sharing of media when user B takes a picture or captures video at the event. The captured media is sent to the media-sharing controller 2110 (as shown by first dashed line 2152). The media-sharing controller 2110 can be implemented as in FIG. 21A. As shown in FIG. 21B, the media-sharing controller 2110 includes the user B media as part of the collection for each of friends A and C, but not user D (as shown by dashed lines 2160, 2162, 2164). Further, even though user E may also contribute media to the event, he does not receive media from user B or C because none of their sharing settings cause him to be added to the list of recipients. As a result of the sharing settings, then, the event collections that are created for users A-E (e.g., at 716 of FIG. 7) are potentially unique to the user. For instance, in the examples illustrated in FIGS. 21A-21B, the event collection for user A includes media from user B and from user C. By contrast, the event collection for user D includes media from user C but not from user B. Further, the event collection for user E does not include media from either user B or user C.

Figure 29:
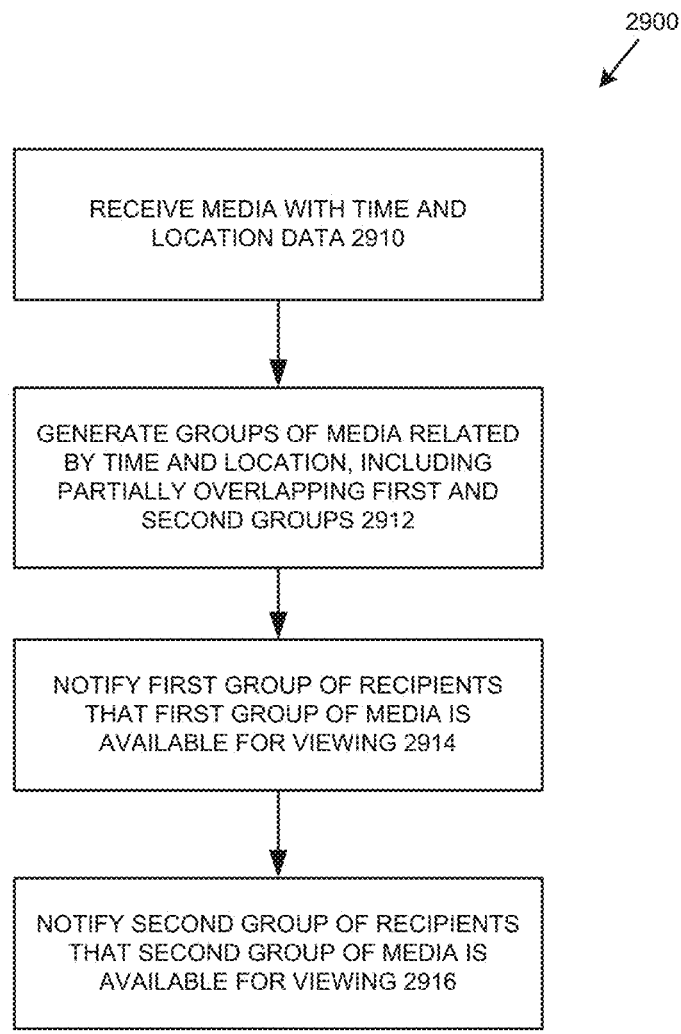
FIG. 29 is a flow chart of another exemplary method for performing media-sharing using aspects of the disclosed technology.

FIG. 29 is a flow chart of an exemplary method 2900 for performing media-sharing using aspects of the disclosed technology. The exemplary method 2900 can be performed by a media-sharing controller, which can be implemented in whole or in part locally at a user's mobile device or by a remotely located server. Any of the method acts can be performed alone or in any combination or subcombination with one another. Further, unless stated otherwise, method acts similar to those described above with respect to FIG. 7 can be performed in any of the manners described in connection with FIG. 7

At 2910, instances of digital media are received from a plurality of mobile device users. The media can be image data, video data, audio data, or other digital media data, and can be associated with a time and location data.

At 2912, groups of digital media related by time and location are automatically created from the received instances of digital media. In the illustrated method, the groups include a first group of digital media and a second group of digital media, where the first group of digital media is different than the second group of digital media. Further, the first group of digital media comprises one or more common instances of digital media. In other words, the first group of digital media and the second group of digital media include some overlapping digital media (e.g., as illustrated in the examples shown in FIGS. 21A and 21B). For example, any of the clustering techniques described above can be used and can conform to respective media-sharing settings set by and received from the users contributing the digital media.

At 2914, a first group of one or more recipients is notified that the first group of digital media is available for viewing. For example, a notification can be automatically generated and transmitted to the first group of recipients. The notification can indicate a web site where the first group of digital media can be viewed or can include data for viewing the first group of digital media (e.g., the first group digital media together with associated presentation data). The first group of recipients can be determined from respective media-sharing settings set by and received from the users contributing the digital media (e.g, any of the media-sharing setting described above).

At 2916, a second group of one or more recipients is notified that the second group of digital media is available for viewing. For example, a notification can be automatically generated and transmitted to the second group of recipients. The notification can indicate a web site where the second group of digital media can be viewed or can include data for viewing the second group of digital media (e.g., the second group digital media together with associated presentation data). The second group of recipients can be determined from respective media-sharing settings set by and received from the users contributing the digital media (e.g, any of the media-sharing setting described above).

D. Creating an Event Collection for Playback

Referring again to FIG. 7, at 718, playback data is generated for the recipient-specific clustered media. In general, the playback data defines the playback experience enjoyed by a recipient viewing the media. This section describes exemplary embodiments for creating a playback experience from an event-related collection of media (e.g., the event-related collection of media assembled at method act 716). The playback experience can be stored as a series of image, video, or audio files representing the media captured at the event along with supplemental data that include user's comments, theme data, and other information about the event along with playback presentation data that indicates how the media is to be played back to a user (e.g., information about titles, an order of the media, a slideshow speed, information about how and where to display the titles and/or commentary, information about fonts, background colors and shapes, information about background music, and other such presentation data). As part of the playback experience, the recipient-specific clustered media can be arranged and output as a series of images, video, and/or audio that are displayed one by one (e.g., with a pause of a predetermined length between images). Further, the media can be mixed (e.g., an image and audio can be played simultaneously) or the media can be arranged as homogenous collections (e.g., the audio files can be grouped together, the image files can be grouped together, and the video files can be grouped together).

In certain embodiments, the media-sharing controller also analyzes the media and selects media for inclusion in the collection of media to be presented to the user. This selection process can be performed according to a set of rules designed so that media with higher quality or more interesting content is prioritized over media with lower quality and less interesting content. In certain implementation, different rules are used for image, video, and voice and music media selection.

In particular implementations, images are handled as follows. Images from an event are first organized into groups of "moments" (or time periods), and one or more heuristics are applied to further organize (or cull) the resulting groups of image media. For example, the organization of the image media into moments can be performed by analyzing the times at which images in the collection are taken and grouping together images that are taken within a short period of time of one another (e.g., images taken within 1-10 minutes of each other can be grouped together). The granularity of the time period can depend, for example, on the number of images available (with shorter time periods being selected when more media is available) or can be set by a user. Further, in certain implementations, the grouping is additionally is based on a distance threshold between images (e.g., images taken with 1-100 feet of one another can be grouped together). The distance threshold can depend on the number of images available, the location (e.g., a home address, which would result in a smaller distance threshold, versus a stadium, which would result in a larger distance threshold).

Once organized according to moments, the image media can be prioritized and/or culled based on heuristics. The heuristics can be preset or selected by a user. For example, in one embodiment, one or more of the following heuristics can be used in selecting images. One exemplary heuristic is based on image quality. In particular, the quality of the images in each group can be analyzed (e.g., using image blur, noise, exposure, white balance, sharpness, and/or other such image quality measurements). An image having an image quality that fails to satisfy a threshold (e.g., a default threshold or user-selected threshold) can be discarded from the collection, or the lower quality images can be discarded or presented later in time. Another exemplary heuristic is based on identifying repetitive pictures. In particular, the images in a group can be analyzed to determine whether they are identical or nearly identical in content. If two or images are identified as being repetitive, then only one of the images can be included in the collection (e.g., the first-in-time image, the last-in-time image, or the image with the higher quality). Or, the repetitive images can be associated with presentation data that causes them to be displayed at a faster rate. Another exemplary heuristic is based on the content of the image. For instance, facial detection can be performed to determine the presence of one or more human subjects in a group of pictures. Images with the most people can be prioritized from a group of images such that only those images are shown or such that those images are shown before other images (or with a longer duration). The images can also be analyzed to detect the presence of animals (e.g., pets), children, or of significant objects, and the images can be accordingly prioritized. For instance, images having animals or children can be prioritized over images without animals or children such that only the images with animals or children are shown or such that the images with animals or children are shown before other images (or with a longer duration). In other embodiments, one or more of these heuristics are applied without first organizing the image media into moments.

In certain implementations, video files are handled as follows. The video files can be analyzed to determine if there is blur in the first few seconds (e.g., 1-5 seconds) of video. This type of blur is typically associated with undesired camera movement as the video camera is activated and first pointed at the intended subject. If so, then these frames can be automatically trimmed. The remainder of the video file can also be analyzed for frames with higher camera movement, and those frames can be removed. In certain implementations, the video can be trimmed to include only a desired subject. For example, the video file can be trimmed to include only portions where people are present in the video frames (e.g., using facial detection) or to include only portions where the audio is consistent with an identified voice (e.g., the user's voice) or with a dominant voice (e.g., indicating that the intended subject is likely speaking). Further, the audio associated with the video can be adjusted to improve the overall audio presentation. For example, the audio of the video files can be normalized so that it is consistent with the audio in other videos or media presented with the collection. Similarly, voice and music data from other media in the presentation can be normalized in order to create a consistent audio presentation during playback.

In any of the above cases, user interface elements can be presented to the user that allow the user to override or change the settings of any of these automated procedures. For instance, in the case of multiple repeated pictures of similar quality, the user can be prompted to pick his or her preferred image or images for the set.

Figure 30:
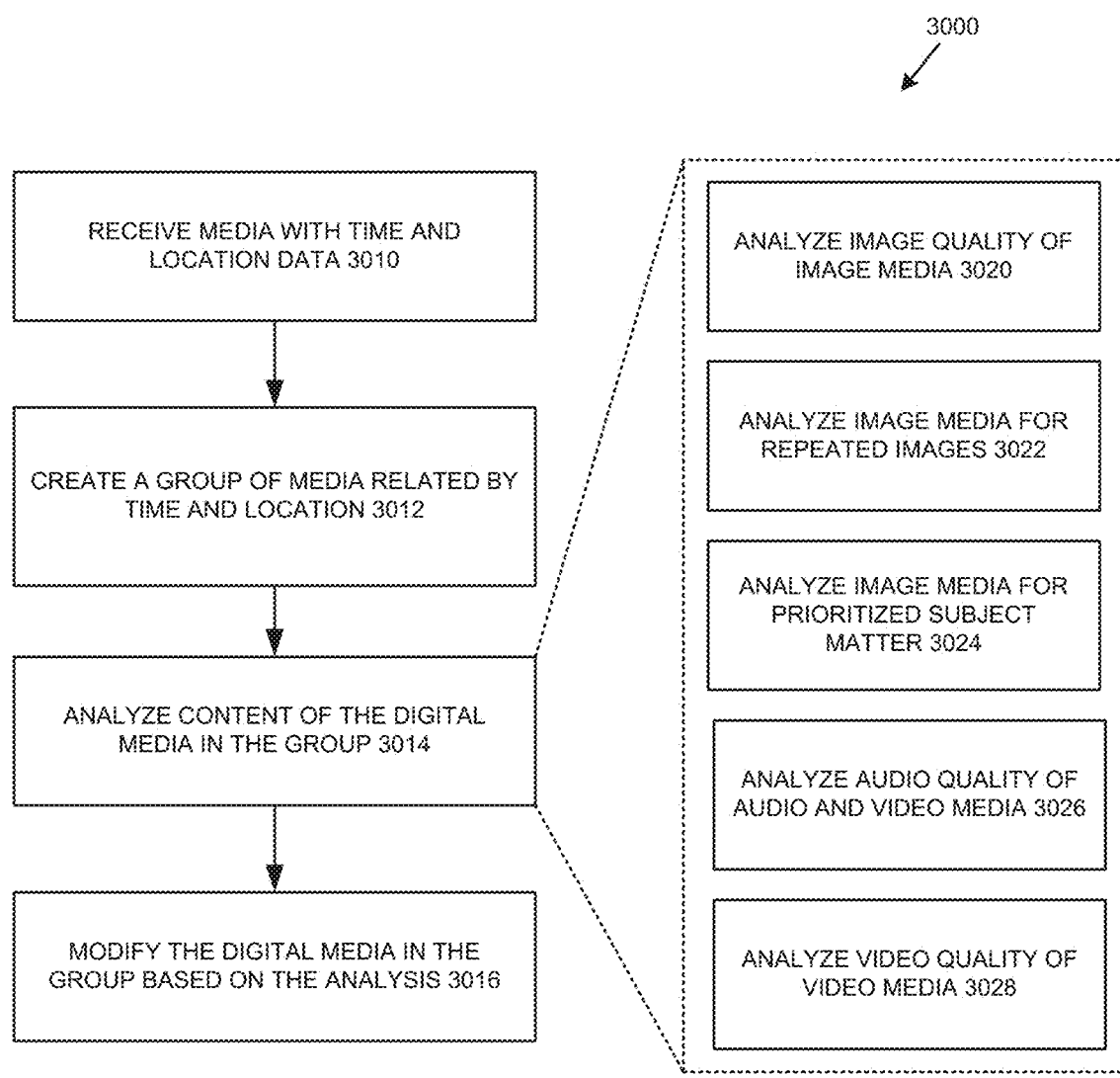
FIG. 30 is a flow chart of an exemplary method for analyzing media content in a group of event-related media and automatically modifying the media.

FIG. 30 is a flow chart of an exemplary method 3000 for analyzing media content in a group of event-related media and automatically modifying the media as a result of the analyzing using one or more of the above-described techniques. The exemplary method 3000 can be performed by a media-sharing controller, which can be implemented in whole or in part locally at a user's mobile device or by a remotely located server. Any of the method acts can be performed alone or in any combination or subcombination with one another.

At 3010, instances of digital media are received. The media can be image data, video data, audio data, or other digital media data, and can be associated with a time and location data. The one or more instances of digital media can be received from a single user or from a plurality of users (e.g., users executing a common media-sharing application).

At 3012, a group of digital media related by time and location is created from the received instances of digital media. For example, any of the media clustering embodiments described above can be used.

At 3014, the content of the digital media in the group is analyzed. Any one or more of the techniques and/or heuristics described above can be used. For instance, and as more fully explained above, an analysis 3020 of the images in the image media can be performed to identify frames having lower quality, an analysis 3022 of the images in the image media can be performed to identify frames that repeat and can be potentially deleted, an analysis 3024 of the subject matter in the images in the image media can be performed (e.g., using a facial recognition or object recognition technique) to identify images that are to be prioritized because they show items of higher interest to a viewer, an analysis 3026 of the audio quality in the audio and video media can be performed (e.g., in order to identify volume and audio quality differences among the media or long and unnecessary periods of silence); and/or an analysis 3028 of the video quality of video media illustrated (e.g., in order to identify sequences of blurry frames). The one or more analysis techniques applied at 3014 can be preset or can be manually selected by a user through a suitable settings screen.

At 3016, the group of digital media is modified based on the analyzing. The modifications can be performed automatically by the media-sharing controller. The modifications that are performed will depend on the results of the analysis and may result, for instance, in certain lower-quality images in image media being deleted or relocated to later in the presentation, repeated images being deleted, images with higher priority being relocated to an earlier position in a sequence of images presented in the presentation, volume and/or tone levels of the audio in the audio and video media being normalized, and/or one or more frames of video media being deleted or trimmed.

In certain embodiments, the event-related collection of media (e.g., the event-related collection of media assembled at method act 716) is associated with a theme. The collection can then be presented with graphics, and/or music (stored as presentation data) that is based on the theme (e.g., a video or image border representative of the theme, a background that is representative of the theme, or other such presentation media). In particular implementations, the event-related media is analyzed to determine a suitable theme. The theme can be determined from metadata associated with the event, or, in some implementations, from a mood associated with the collection. A particular mood can be inferred based on data available from the collection. For instance, a mood can be inferred using one or more of the following factors: (1) the type of people recognized as being in the media (e.g., kids, pets, adults); (2) the location at which the media was captured (e.g., a school, park, stadium, historical location, city, rural area, coastline, mountain, and the like); (3) the location and time at which the media was captured (e.g., at a football stadium between 6:00 p.m. and 10:00 p.m.); (4) objects in the media recognized using a object recognition service (e.g., cars, trees, and the like); (5) expressions on faces of people in the event (e.g., smiles, frowns, a crying baby, and the like); and/or (6) metadata associated with the media (e.g., names of people in the images, video, or audio; names of places where the media was captured; names of objects in the images or video; music that the user is playing or heard ambiently in the video or audio media; specific metadata that the user enters via a user interface (such as a specific event title)). The mood can be inferred using a weighted sum of these factors, or a heuristic that is based on a combination of these factors or that determines a hierarchy of these factors. The themes can be selected from one of multiple available themes, which can include a generic theme when no particular theme can be matched to the collection of media. Once a theme is identified and selected, the "visual package" associated with the theme can be used to create the playback experience for the collection of media. For example, the visual package associated with a theme includes a specific style of showing text (e.g., a particular font, font size, and font presentation), a specific manner of transitioning between media objects, a specific manner for showing multiple media elements in the same scene; and specific music. In certain implementations, themes can be modified (e.g., in real-time) as new content is added by reevaluating a theme in the context of the new media.

Figure 31:
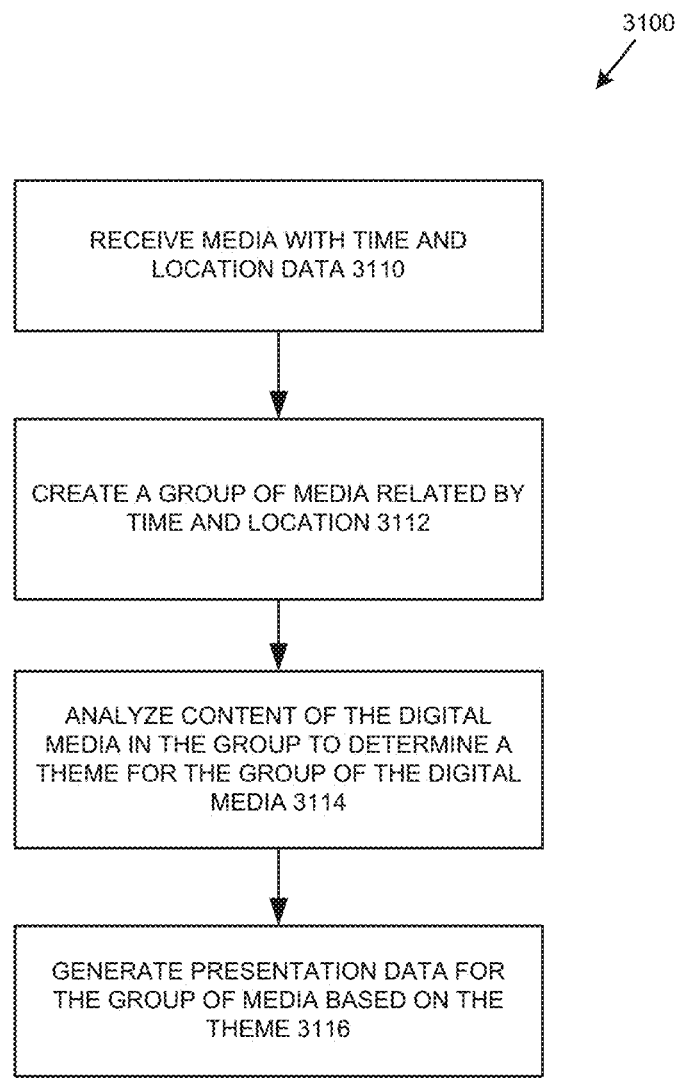
FIG. 31 is a flow chart of an exemplary method for associating a theme with media content in a group of event-related.

FIG. 31 is a flow chart of an exemplary method 3100 for associating a theme with media content in a group of event-related using one or more of the above-described techniques. The exemplary method 3100 can be performed by a media-sharing controller, which can be implemented in whole or in part locally at a user's mobile device or by a remotely located server. Any of the method acts can be performed alone or in any combination or subcombination with one another.

At 3110, instances of digital media are received. The media can be image data, video data, audio data, or other digital media data, and can be associated with a time and location data. The one or more instances of digital media can be received from a single user or from a plurality of users (e.g., users executing a common media-sharing application).

At 3112, a group of digital media related by time and location is created from the received instances of digital media. For example, any of the clustering techniques described can be used.

At 3114, the digital media in the group of digital media is analyzed to determine a theme for the group of the digital media. As explained above, the analysis can involve determine one or more of the type of people recognized as being in the media, the location at which the media was captured, the location and time at which the media was captured, objects in the media recognized using a object recognition service, expressions on faces of people in the event, and/or metadata associated with the media.

At 3116, presentation data using the determined theme is generated for use when the group of digital media is viewed by a user. For instance, the presentation data can include one or more of graphics data, font data, or audio data that is used when the group of digital media is viewed by a user and that is associated with the determined theme for the group of the digital media.

In some embodiments, a title page is automatically generated and associated with the collection of event-based media. For example, using metadata associated with the event (e.g., time, date, location, and people identified in the collection), a title page can be created that describes the event. For instance, if the media is captured at the Jefferson Memorial on Feb. 2, 2011 (as determined by location and date data available from the media in the event-based collection of media), a logical title for the collection can be inferred, such as "Feb. 2, 2011, visit to the Jefferson Memorial". Names of the users in the media can also be included in the title and can be determined using facial recognition (e.g., any of the facial recognition techniques described herein). Additionally, when the collection is shared on a social network or when facial recognition is performed using data form a social network, the social network may make available metadata like face tags or comments. This additional metadata can be added to the collection and can contribute to the title or result in the playback experience being augmented with the new data. Additional pages of metadata may be created as necessary. The event content can then be laid out as scenes that are displayed to the user. The scenes can be arranged in a variety of manners, such as by time or by the identity of individuals in the image. In some implementations, an "end credits" page is created that lists those individuals that are present in the collection, thus creating a more theatrical experience for the user.

Once the event-related collection of media and associated presentation data is generated for the playback experience, the playback experience data can be transmitted to the recipient, or can be made available for viewing by the recipient (e.g., at a web site associated with the media-sharing application, posted to a user's social network account, or via a media-sharing application that the recipient can execute on their computing device). A notification that the collection is ready for viewing or that the collection has been updated (e.g., when a new instance of media is added or when a new comment is added) can be sent to an authorized recipient.

In certain embodiments, the playback experience is continuously generated and updated as new media becomes available. Further, in certain embodiments, once the event-related collection of media is generated, it can be made available to the user for viewing.

Once the collection of event-based media is created, a representative tile or icon (e.g., a thumbnail image of one of the images, or a tile with the title of the collection) can be created with a playback icon. This tile or icon can be sent to the user or to an authorized recipient such that it appears on the user's device (e.g., as part of an auto-sharing application, as part of an icon for an auto-sharing application indicating that new media is available, or as an image or link sent via MMS indicating that a new media collection is available). A user can then select that the playback of the collection of media begin.

Figure 22:
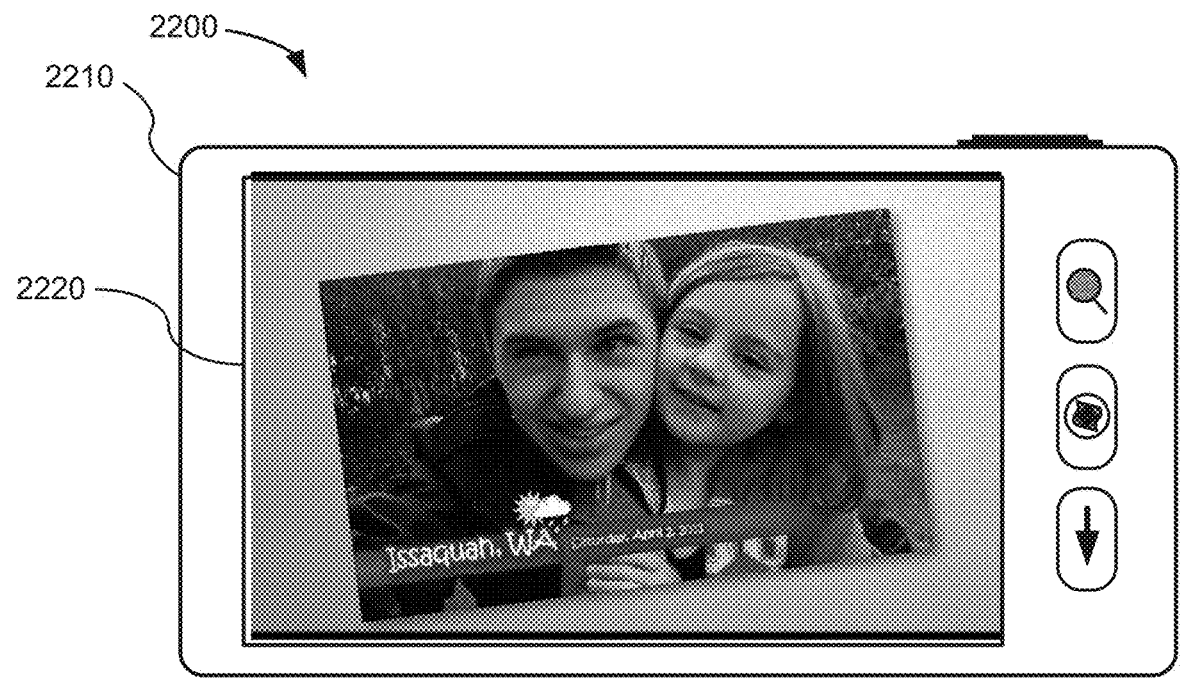
FIG. 22 is a schematic block diagram depicting an exemplary mobile device displaying an exemplary title screen for an event-related collection of media.

FIGS. 22-25 illustrate examples of screens that can appear as part of an exemplary playback experience assembled according to the disclosed technology. FIG. 22, for example, is a schematic block diagram 2200 depicting an exemplary mobile device 2210 displaying an exemplary title screen 2220 for an event-related collection of media. In the example illustrated, the screen 2220 includes an image from the collection along with a title inferred from supplemental data associated with the event. In particular, the title is "Issaquah, WA: Saturday, Apr. 2, 2011," which can be determined from location and time data associated with the image from the event. Further, in the illustrated example, the font selection and presentation is somewhat whimsical and cartoonish. For instance, the photo is tilted, the font is a rounded font giving the appearance of being hand written, the color scheme is colorful (e.g., purple), and the graphics selected are cartoonish and can be based on the weather forecast for that day (e.g., determined by accessing a suitable weather web site). This whimsical theme can be automatically selected after analyzing the collection and determining the primary subject(s) in the images, which in this example is a child.

Figure 23:
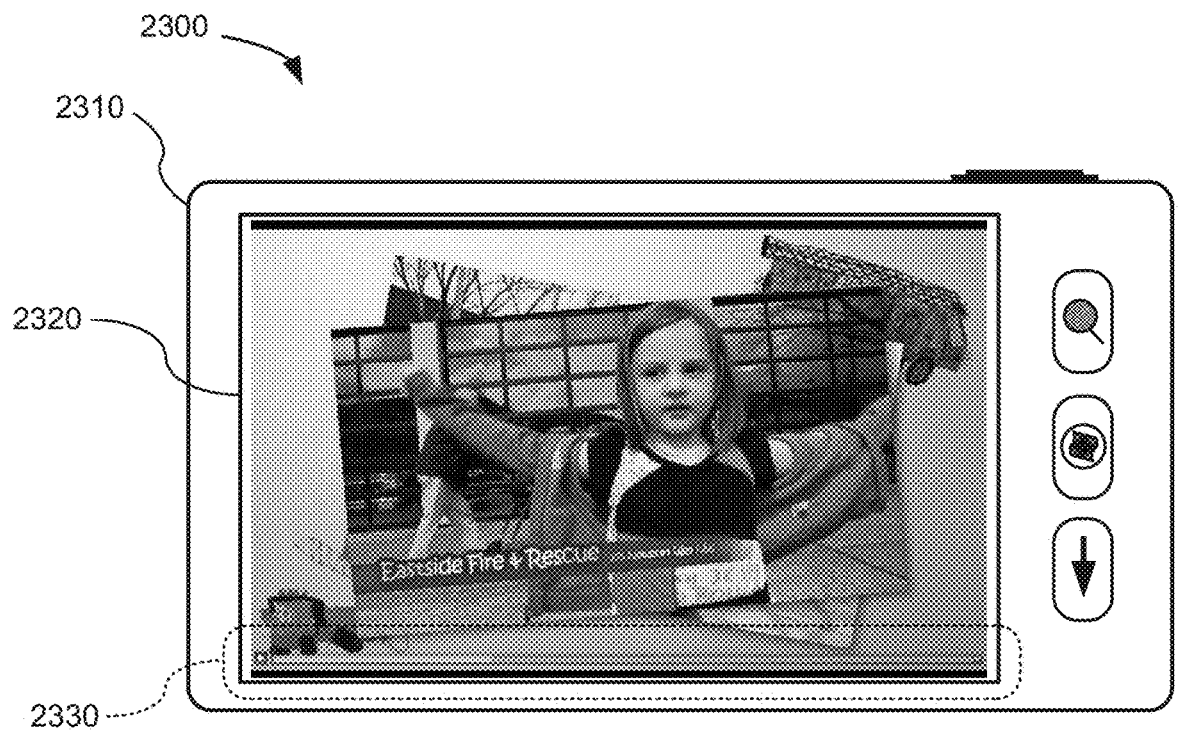
FIG. 23 is a schematic block diagram depicting an exemplary mobile device displaying an exemplary image display screen for the event-related collection of media.

FIG. 23 is a schematic block diagram 2300 depicting an exemplary mobile device 2310 displaying an exemplary image display screen 2320 for the event-related collection of media. In particular, the screen 2320 shows the subject at a particular location. Further, the screen 2320 shows how the location information from the image can be used to determine a name of the location, which can be presented as part of the playback experience. In particular, the screen 2320 shows the image as being entitled "Eastside Fire & Rescue, 175 Newport Way NW". further, in the screen 2320, a theme associated with the image is selected and displayed together with the image. In this case, because the location is determined to be a fire station and because the subject is determined to be a child, a hand-drawn fire-station theme is selected and presented as a border to the displayed image. Also shown in FIG. 23 is a playback bar 2330, which shows the progress of the playback experience. In certain embodiments, a user can tap the playback bar 2330 and move the current frame being played back to any time frame available on the playback bar 2330. Additionally, when the user selects the playback bar 2330, the user can select to pause or resume play of the playback experience as desired.

Figure 24:
FIG. 24 is a schematic block diagram depicting an exemplary mobile device displaying an exemplary image display screen for the event-related collection of media in which commentary from a recipient is added.

FIG. 24 is a schematic block diagram 2400 depicting an exemplary mobile device 2410 displaying an exemplary image display screen 2420 for the event-related collection of media in which commentary from a recipient is added. In particular, the screen 2420 shows an image of the subject and also shows a comment 2430 from one of the recipients with whom the media is shared. In particular, "Grandma" has commented on the image and stated: "Wow she's getting big!" In particular embodiments, this comment is received by the media-sharing controller, which identifies the image the comment was associated with and modifies the playback experience (if appropriate permissions are granted) to display the comment together with the image. Further, and as illustrated at 2430, the screen 2420 further includes a thumbnail image of the user making the comment. Additionally, the location of the image can be evaluated and an appropriate theme selected. In the illustrated example, for instance, the location data for the image indicates that the image was taken at a park. Accordingly, a park theme is selected and displayed as the boundary art for the image.

Figure 25:
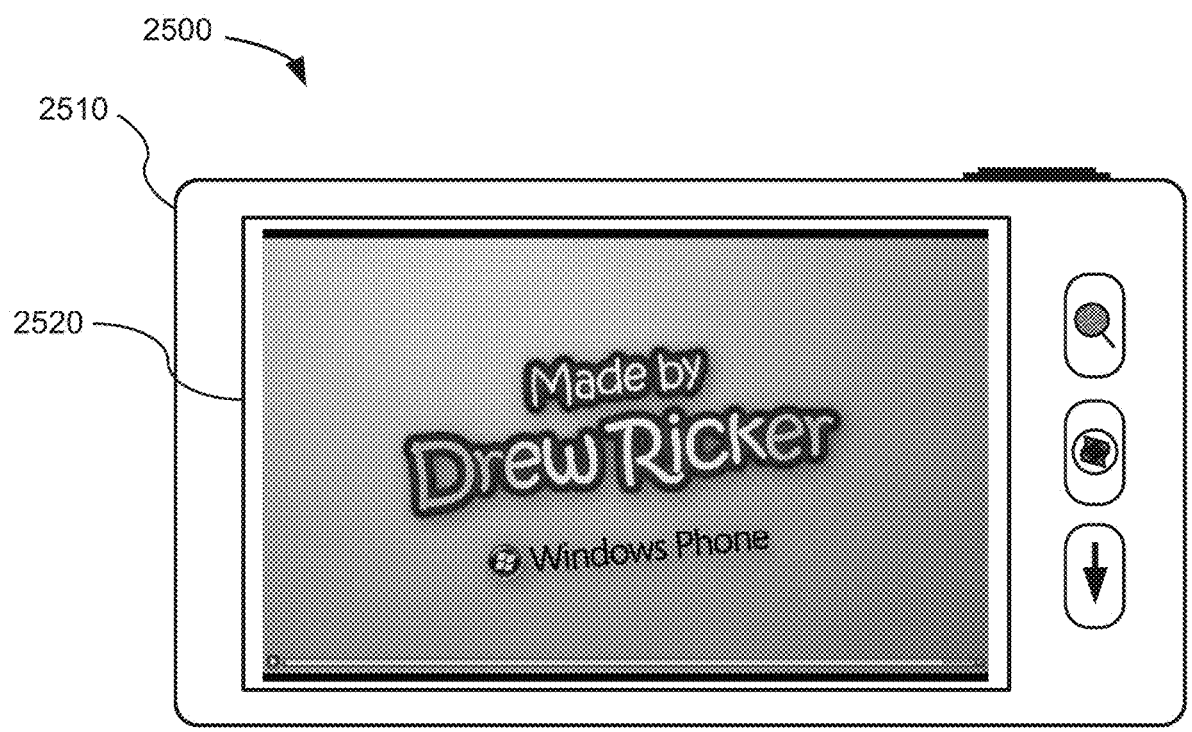
FIG. 25 is a schematic block diagram depicting an exemplary mobile device displaying an exemplary end credits screen for the event-related collection of media.

FIG. 25 is a schematic block diagram 2500 depicting an exemplary mobile device 2510 displaying an exemplary end credits screen 2520 for the event-related collection of media. For example, if the original media displayed in the collection of media is all from a single source, then a single name can be presented in the end credits screen 2520, as illustrated.

E. Play Back and Archiving

As described in the previous section, and according to certain embodiments of the disclosed technology the event-related collection of media can be assembled into a playback experience that combines the media in the collection with automatically generated presentation data (e.g., borders, graphics, music, and the like). As also described above, the data for the playback experience can be updated as each new item of media is created, resulting in the continuous creation and updating of the playback experience as media is captured and made available for use.

When the event-related collection of media is ready for viewing by a user (e.g., by the creator of the media or by a user with whom the collection of media is shared), the user may select to play the media. For example, in particular embodiments, an icon representing the collection of media can appear to the user along with a "play" icon. When the user selects the "play" icon, a linear playback experience commences. In particular implementations, the user can "pause" the playback at any time and enter a "browsing" mode. When the user is in browsing mode, the user can navigate to any point the collection. Further, in certain embodiments and as more fully explained above, a user may optionally add content (if given permission) at a selected point in the collection. For instance, in certain implementations, the user can enter a textual, graphical, audio, and/or video comment about the specific media element of the collection (e.g., by using a suitable comment addition screen, such as shown in FIG. 19). Further, by accessing the individual elements in the browse mode or the entire collections, users with the proper permissions may then "reply" to any commentary and thus generate further commentary. The comments and/or additional media can then be assimilated and included into the playback experience so that others viewing the collection of media will also view the updated media. In certain implementations, when playback is occurring, if the user who is viewing is determined to have permission to add commentary or other media to the event, the user can be prompted to add additional commentary or media, or the playback display can include a touchscreen for initiating an additional comment or media attachment.

In some embodiments, any recipient of the collection of media can optionally select to receive or not receive updates. Other users may optionally subscribe or unsubscribe from the collection. Further, when the user selects to play an updated collection, the media displayed can be: (1) the new, updated media (if the other media associated with the collection has already been viewed); (2) the entire playback experience with the updated media; and/or (3) the new, updated media together with one or more instances of the original media to provide context for the new media (e.g., the original media to which a comment was made). In this way, the media-sharing controller can update the playback experience continuously (e.g., in real time) as updates are received. Alternatively, the updates can be applied at periodic intervals (e.g., every 15-60 minutes). In some embodiments, updates sent by other friends can be first viewed and accepted by the original creator of the collection of media. The monitor runs as a web service that manages this synchronization and notification.

Figure 26:
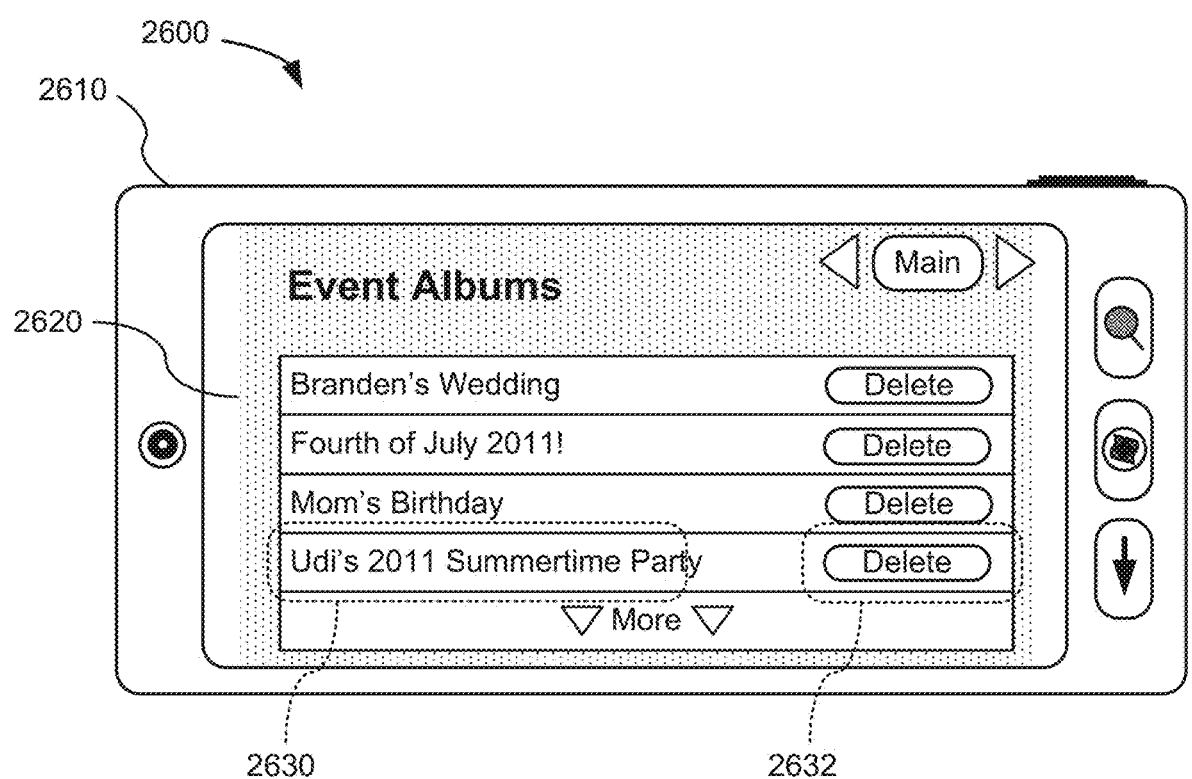
FIG. 26 is a schematic block diagram depicting an exemplary mobile device displaying an exemplary event collection archive screen.

In some embodiments, when the collection author (e.g., the user sharing the collection) feels that a collection of media needs to be "frozen", the author can select to do so. As a result, further media or commentary about the collection of media will not cause the collection of media to be further updated. Further, the event-sharing controller can send data for updating the distributed collection that indicate the "frozen" status and prevent further alteration of the media. The collection author can choose to archive the collection (e.g., by storing the collection in a suitable container format) for later viewing. The archived collections can be accessed by a user through a suitable user interface that displays the available collections. For example, FIG. 26 is a schematic block diagram 2600 depicting an exemplary mobile device 2610 displaying an exemplary event collection archive screen 2620. In the illustrated embodiment, an event-related collection (such as collection 2630) can be selected for viewing by a user or can be deleted (by selecting a delete selector such as selector 2632).

Having described and illustrated the principles of our innovations in the detailed description and accompanying drawings, it will be recognized that the various embodiments can be modified in arrangement and detail without departing from such principles. For example, any technologies described herein and used with still photos can be adapted for use with video images, audio files, or other media or multimedia files. Further, any technologies described herein can also be adapted for sharing other types of data or files as well. For example, in certain embodiments, the data that is received and shared comprises text data for a word-processing file (e.g., data for a single word-processing file or data from multiple users that is clustered together to form a word-processing file), spreadsheet data (e.g., data for a single spreadsheet file or data from multiple users that is clustered together to form a spread sheet file), and/or presentation data (e.g., data for a single presentation file or data from multiple users that is clustered together to form a spread sheet file). Further, although many of the embodiments described above perform clustering based on location data and time data that is included with the digital media, the time data used to determine the clustering can instead be time data that is created by the media-sharing controller based on when the digital media is received and processed by the media-sharing controller. Still further, the clustering can be performed based on location information alone such that all media from a particular location is grouped together over an extended period of time. For example, such functionality might be used to group media from a particular location over a period of years (e.g., a summer cabin, a vacation spot, a family member's home, or the like). In particular implementations, the user can select to remove the time limitation or select a time period having an extended duration (e.g., months, years, or other such relatively lengthy periods of time).

In view of the many possible embodiments to which the principles of the disclosed technology may be applied, it should be recognized that the illustrated embodiments are only preferred examples and should not be taken as limiting the scope of the disclosure. Rather, the scope of the disclosure is defined by the following claims and their equivalents. We therefore claim all that comes within the scope of these claims and their equivalents.

We claim:

1. A system, comprising:
    a memory or storage device storing a program;
    a processing unit operable to execute the program, wherein said execution of the program causes the processing unit to:
        receive instances of digital media, at least some of the instances of digital media comprising location and time data, wherein the digital media comprises digital audio data;
        create a group of digital media related by time and location from the received instances of digital media, wherein the group of digital media comprises multiple instances of digital audio data;
        analyze the multiple instances of digital audio data in the group of digital media to determine a theme for the group of the digital media, and wherein the analyzing comprises analyzing an audio volume in the multiple instances of digital audio data;
        automatically modify the group of digital media based at least in part on the analyzing, wherein the modifying comprises normalizing the audio volume in the multiple instances of digital audio data; and
        generate presentation data for use when the modified group of digital media is viewed by a user, the presentation data including data indicating an order for presenting the modified group of digital media individually in a one-by-one manner without other visually perceptive images or video data, wherein the presentation data for use when the modified group of digital media is viewed by the user further includes a slide show speed associated with the determined theme for the modified group of the digital media, the presentation data further including music data for the determined theme.

2. The system of claim 1, wherein the analyzing comprises:
    determining a name of a location at which one or more instances of the digital media were captured; and
    selecting a theme for the group of the digital media based at least in part on the name of the location.

3. The system of claim 2, wherein the determining the name of the location comprises requesting location name information from a location-based service for at least one instance of the one or more instances of the digital media.

4. The system of claim 1, wherein the analyzing comprises:
    performing facial recognition on one or more instances of the digital media; and
    selecting a theme for the group of the digital media based at least in part on results from the facial recognition.

5. The system of claim 4, wherein the facial recognition indicates that one or more instances of the digital media include children as subjects in the digital media; and wherein the selecting the theme comprises selecting a theme designed for children.

6. The system of claim 1, wherein the analyzing comprises:
    determining a name of a location at which one or more instances of the digital media were captured; and
    selecting a theme for the group of the digital media based at least in part on the name of the location.

7. The system of claim 1, wherein the analyzing comprises:
    performing object recognition on one or more instances of the digital media; and
    selecting a theme for the group of the digital media based at least in part on results from the object recognition.

8. The system of claim 1, wherein the analyzing comprises:
    determining a name of a location at which one or more instances of the digital media were captured; and
    generating a title screen based at least in part on the name of the location.

9. The system of claim 1, wherein said execution of the program further causes the processing unit to:
    output the modified group of digital media and the presentation data for viewing by one or more recipients.

10. The system of claim 9, wherein the one or more recipients are manually selected by a user or are selected based on one or more media-sharing settings that establish guidelines for automatically selecting the one or more recipients.

11. The system of claim 1, wherein the music data and voice data from other media in the presentation are normalized in order to create a consistent audio presentation during playback.

12. The system of claim 1, wherein the instances of digital media include instances of video data, and wherein the music data is music data from the instances of video data.

13. The system of claim 1, wherein the music data can be manually modified by a user.

14. The system of claim 1, wherein the presentation data is optionally shared with one or more contacts via a selection screen with multiple options, the multiple options including social media accounts or a custom list.

15. One or more computer-readable storage devices storing computer-executable instructions which when executed by a computer cause the computer to perform a method, the method comprising:
    receiving instances of digital media from a plurality of mobile device users, each of the instances of digital media comprising time and location data, wherein the digital media comprises digital audio data and digital image data;
    automatically creating a group of digital media related by time and location from the received instances of digital media, wherein the group of digital media comprises multiple instances of digital audio data and multiple instances of digital image data;
    analyzing content of the digital media in the group, wherein the analyzing comprises analyzing image content between the multiple instances of digital image data to determine two or more of the multiple instances of digital image data having identical or substantially identical content, and wherein the analyzing comprises analyzing an audio volume in the multiple instances of digital audio data;
    automatically modifying the group of digital media based on the analyzing, wherein the modifying comprises excluding one or more of the multiple instances of digital image data having identical or substantially identical content, and wherein the modifying comprises normalizing the audio volume in the multiple instances of digital audio data; and generating presentation data for use when the modified group of digital media is viewed by a user, the presentation data including data indicating an order for presenting the modified group of digital media individually in a one-by-one manner without other visually perceptive images or video, the presentation data further including music data.

16. The one or more computer-readable storage devices of claim 15, wherein the group of digital media comprises multiple instances of digital image data;

wherein the analyzing comprises analyzing image quality of the multiple instances of digital image data; and wherein the modifying comprises excluding one or more of the multiple instances of digital image data from the group of digital media based on the analyzing, the excluded one or more of the multiple instances of digital image data having lower image quality than a remainder of the multiple instances of digital image data.

17. The one or more computer-readable storage devices of claim 15, wherein the digital media comprises digital video data;

wherein the analyzing comprises analyzing image quality of frames in the digital video data; and wherein the modifying comprises automatically editing the digital video data to exclude one or more frames of the digital video data based on the analyzing, the excluded one or more frames having lower image quality than a remainder of the frames.

18. The one or more computer-readable storage devices of claim 17, wherein the analyzing the image quality of the frames comprises identifying frames where camera motion causes image blurring.

19. A system, comprising:
a memory or storage device storing a program;
an image capture device;
a processing unit operable to execute the program, wherein said execution of the program causes the processing unit to:
receive multiple instances of digital image media captured by the image capture device;
automatically create a group of digital media related by time and location from the received instances of digital image media;
evaluate content of the digital media in the group, comprising evaluating image quality of multiple instances of digital image data in the group of digital media;
automatically modify the group of digital media based on the evaluation, comprising excluding one or more of the multiple instances of digital image data from the group of digital media, the excluded one or more of the multiple instances of digital image data having lower image quality than a remainder of the multiple instances of digital image data;
generate presentation data for use when the modified group of digital media is viewed by a user, the presentation data including data indicating an order for presenting the modified group of digital media individually in a one-by-one manner without other visually perceptive images or video that is used when the modified group of digital media is viewed by the user, the presentation data further including music data that is played with the modified group of digital media is viewed by the user; and store the modified group of digital media and the presentation data.

20. The system of claim 19, wherein the storing comprises storing the modified group of digital media locally on the memory or storage device, or storing the modified group of digital media remotely on a remote storage device.

* * * * *